(12) United States Patent
Savage

(10) Patent No.: US 7,182,132 B2
(45) Date of Patent: *Feb. 27, 2007

(54) LINEARLY SCALABLE GEOTHERMIC FUEL CELLS

(75) Inventor: Marshall T. Savage, Hayden Lake, ID (US)

(73) Assignee: Independant Energy Partners, Inc., Englewood, CO (US)

( * ) Notice: Subject to any disclaimer, the term of this patent is extended or adjusted under 35 U.S.C. 154(b) by 403 days.

This patent is subject to a terminal disclaimer.

(21) Appl. No.: 10/687,264

(22) Filed: Oct. 15, 2003

(65) Prior Publication Data

US 2005/0016729 A1      Jan. 27, 2005

Related U.S. Application Data

(63) Continuation-in-part of application No. 10/053,207, filed on Jan. 15, 2002, now Pat. No. 6,684,948.

(51) Int. Cl.
*E21B 36/04* (2006.01)

(52) U.S. Cl. .......................... 166/248; 166/58; 166/60; 166/302

(58) Field of Classification Search ..................... None
See application file for complete search history.

(56) References Cited

U.S. PATENT DOCUMENTS

| | | | |
|---|---|---|---|
| 2,472,445 A | 6/1949 | Sprong | |
| 2,593,477 A | 4/1952 | Newman et al. | |
| 2,630,306 A | 3/1953 | Evans | |
| 2,630,307 A | 3/1953 | Martin | |
| 2,634,961 A | 4/1953 | Ljungstrom et al. | |
| 2,732,195 A | 1/1956 | Ljungstrom | |
| 2,780,449 A | 2/1957 | Fisher et al. | |
| 2,780,450 A | 2/1957 | Ljungstrom | |
| 2,801,089 A | 7/1957 | Scott, Jr. | |
| 2,841,375 A | 4/1958 | Salomonsson | |
| 2,874,777 A | 2/1959 | Tadema | |
| 2,906,337 A | 9/1959 | Hennig | |
| 2,914,309 A | 11/1959 | Saiomonsson et al. | |
| 2,923,535 A | 2/1960 | Ljungstrom et al. | |
| 3,017,168 A | 1/1962 | Carr | |

(Continued)

OTHER PUBLICATIONS

H.E. Linden, Production of Shale Oil In Sweden, Jul. 1948, pp. 29-34, 6 pages total.

*Primary Examiner*—Zakiya W. Bates
(74) *Attorney, Agent, or Firm*—Patent Law Offices of Rick Martin, PC

(57) ABSTRACT

A ceramic fuel cell(s) is supported in a heat conductive interconnect plate, and a plurality of plates form a conductive heater named a stack. Connecting a plurality of stacks forms a stick of fuel cells. By connecting a plurality of sticks end to end, a string of fuel cells is formed. The length of the string can be one thousand feet or more, sized to penetrate an underground resource layer, for example of oil. A preheater brings the string to an operating temperature exceeding 700° C., and then the fuel cells maintain that temperature via a plurality of conduits feeding the fuel cells fuel and an oxidant, and transferring exhaust gases to a planetary surface. A manifold can be used between the string and the planetary surface to continue the plurality of conduits and act as a heat exchanger between exhaust gases and oxidants/fuel.

44 Claims, 43 Drawing Sheets

U.S. PATENT DOCUMENTS

| | | |
|---|---|---|
| 3,024,013 A | 3/1962 | Rogers |
| 3,113,623 A | 12/1963 | Krueger |
| 3,241,611 A | 3/1966 | Dougan |
| 3,547,193 A | 12/1970 | Gill |
| 3,954,140 A | 5/1976 | Hendrick |
| 4,007,786 A | 2/1977 | Schlinger |
| 4,144,935 A | 3/1979 | Bridges et al. |
| 4,148,359 A | 4/1979 | Laumbach et al. |
| 4,199,025 A | 4/1980 | Carpenter |
| 4,375,302 A | 3/1983 | Kalmar |
| 4,401,162 A | 8/1983 | Osborne |
| 4,444,258 A | 4/1984 | Kalmar |
| 4,570,715 A | 2/1986 | Van Meurs et al. |
| 4,640,352 A | 2/1987 | Vanmeurs et al. |
| 4,694,907 A | 9/1987 | Stahl et al. |
| 4,817,711 A | 4/1989 | Jeambey |
| 4,886,118 A | 12/1989 | Van Meurs et al. |
| 5,011,329 A | 4/1991 | Nelson et al. |
| 5,082,055 A | 1/1992 | Hemsath |
| 5,193,934 A | 3/1993 | Johnson |
| 5,236,039 A | 8/1993 | Edelstein et al. |
| 5,255,742 A | 10/1993 | Mikus |
| 5,392,854 A | 2/1995 | Vinegar et al. |
| RE35,696 E | 12/1997 | Mikus |
| 5,770,326 A | 6/1998 | Limaye |
| 5,993,986 A | 11/1999 | Wallin et al. |
| 6,019,172 A | 2/2000 | Wellington et al. |
| 6,051,329 A | 4/2000 | Fasano et al. |
| 6,056,057 A | 5/2000 | Vinegar |
| 6,079,499 A | 6/2000 | Mikus et al. |
| 6,165,632 A | 12/2000 | Blum et al. |
| 6,183,896 B1 | 2/2001 | Horita |
| 6,187,465 B1 | 2/2001 | Galloway |
| 6,296,963 B1 | 10/2001 | Nanjo |
| 6,344,290 B1 | 2/2002 | Bossel |
| 6,372,372 B1 | 4/2002 | D'Aleo et al. |
| 6,500,578 B1 | 12/2002 | Ong et al. |
| 6,575,248 B2 * | 6/2003 | Zhang et al. ............ 166/338 |
| 6,581,684 B2 * | 6/2003 | Wellington et al. ......... 166/245 |
| 2002/0011335 A1 * | 1/2002 | Zhang et al. |

* cited by examiner perspective view

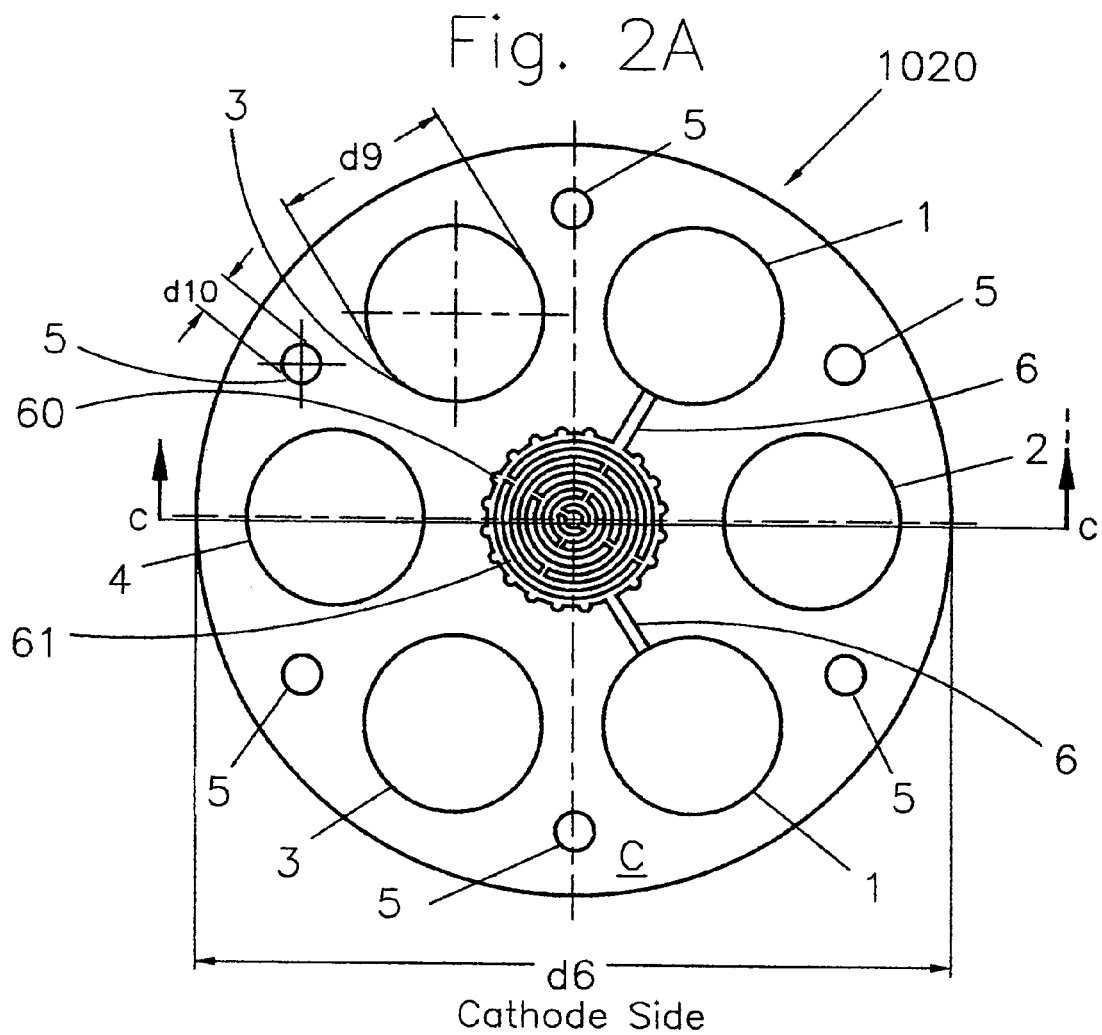
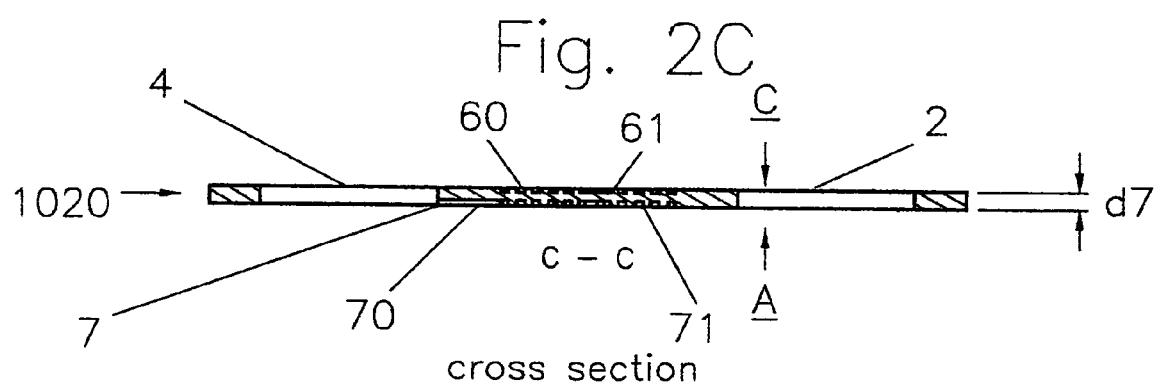

Anode Side

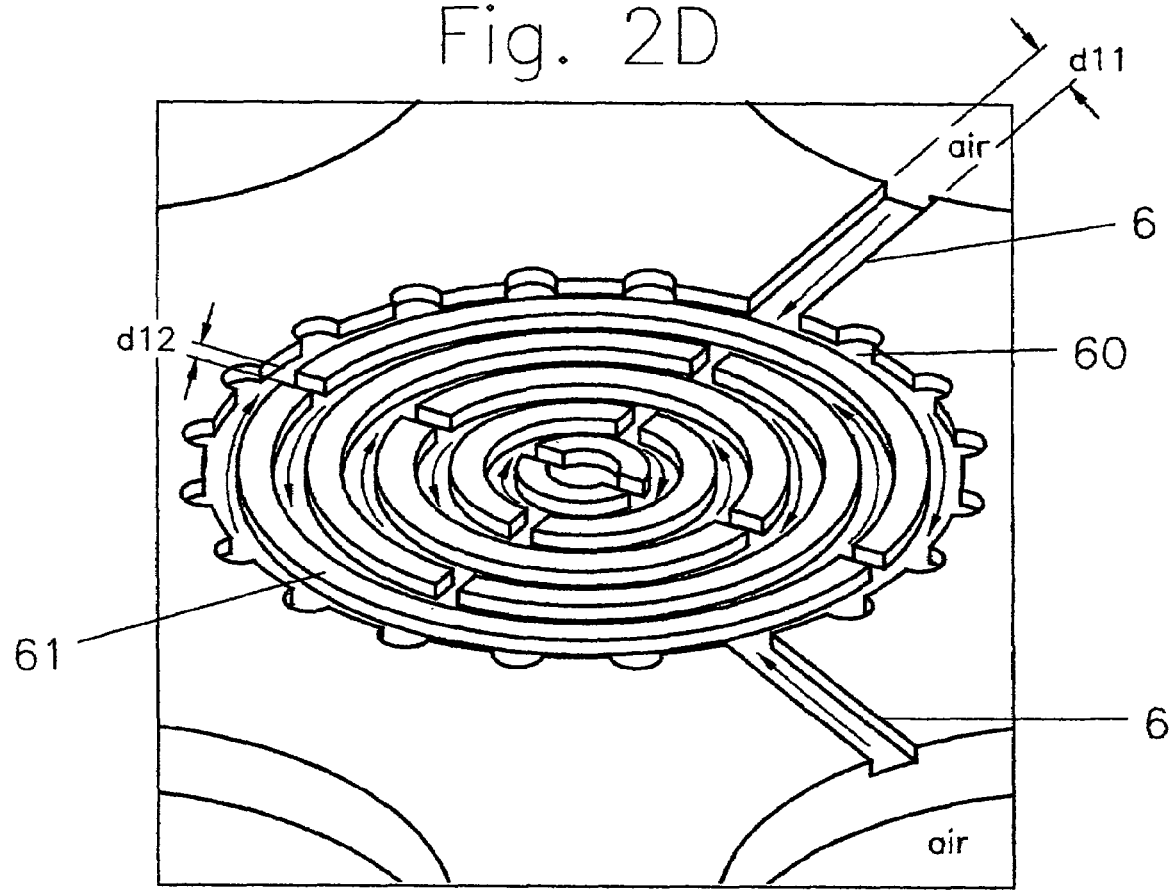
enlarged view

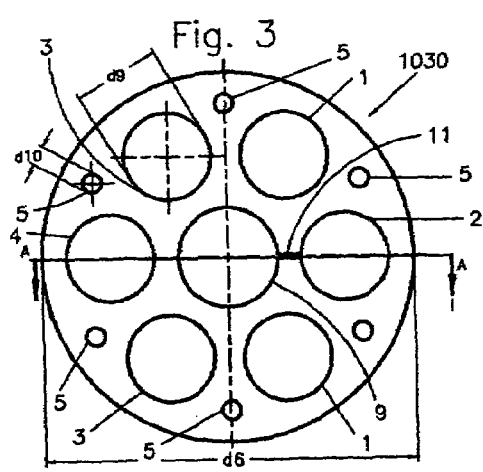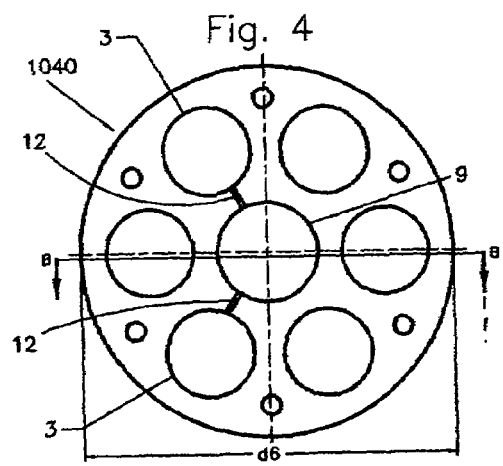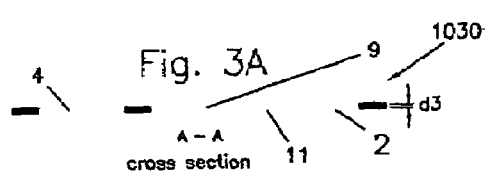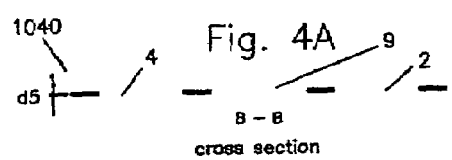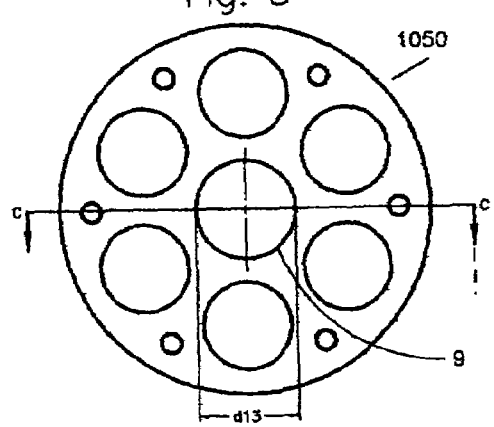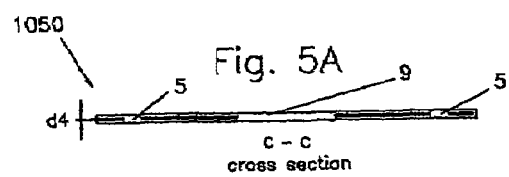

exploded view perspective view

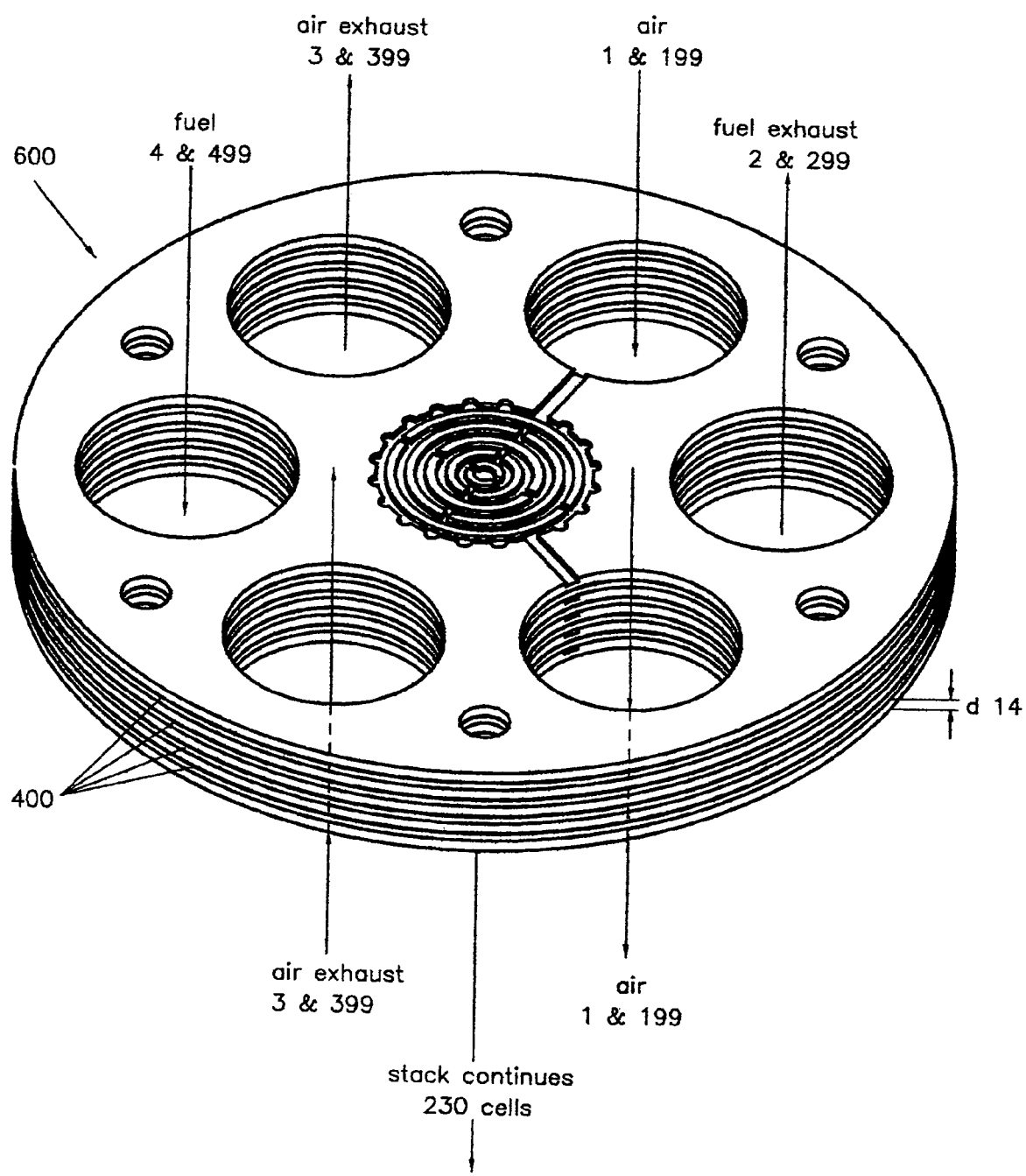

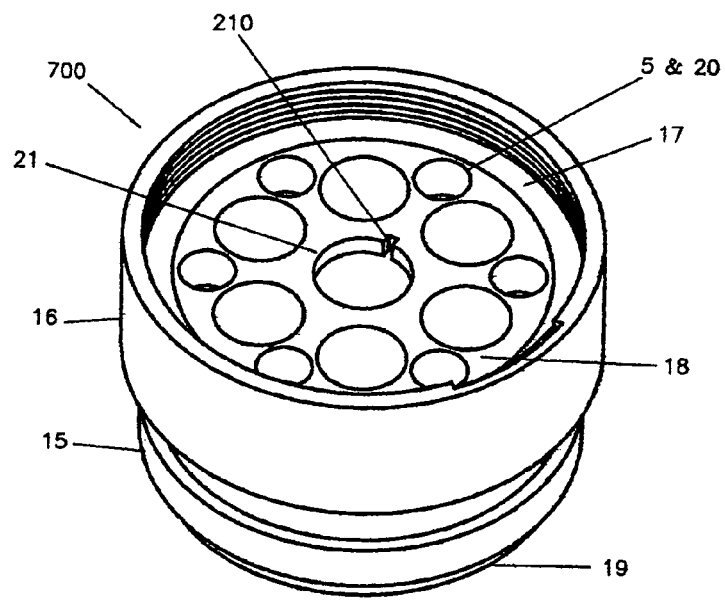
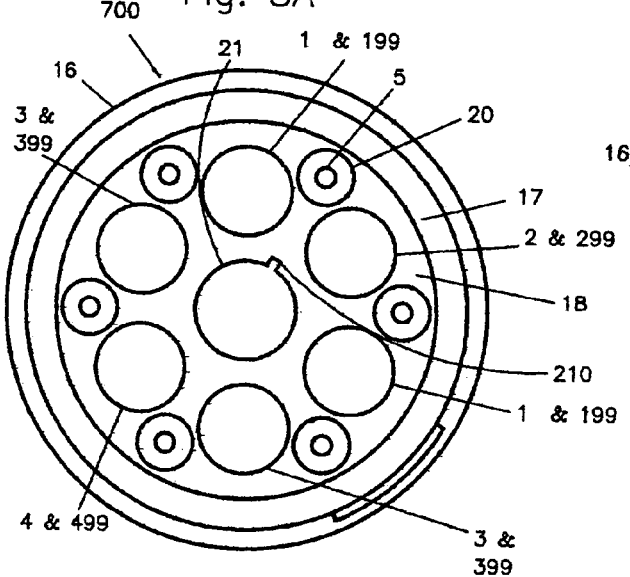
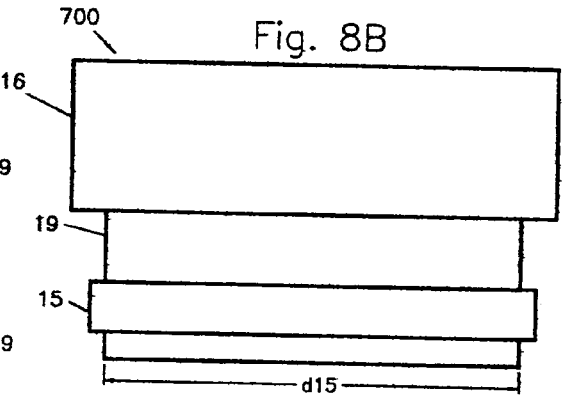

A — A
cross section

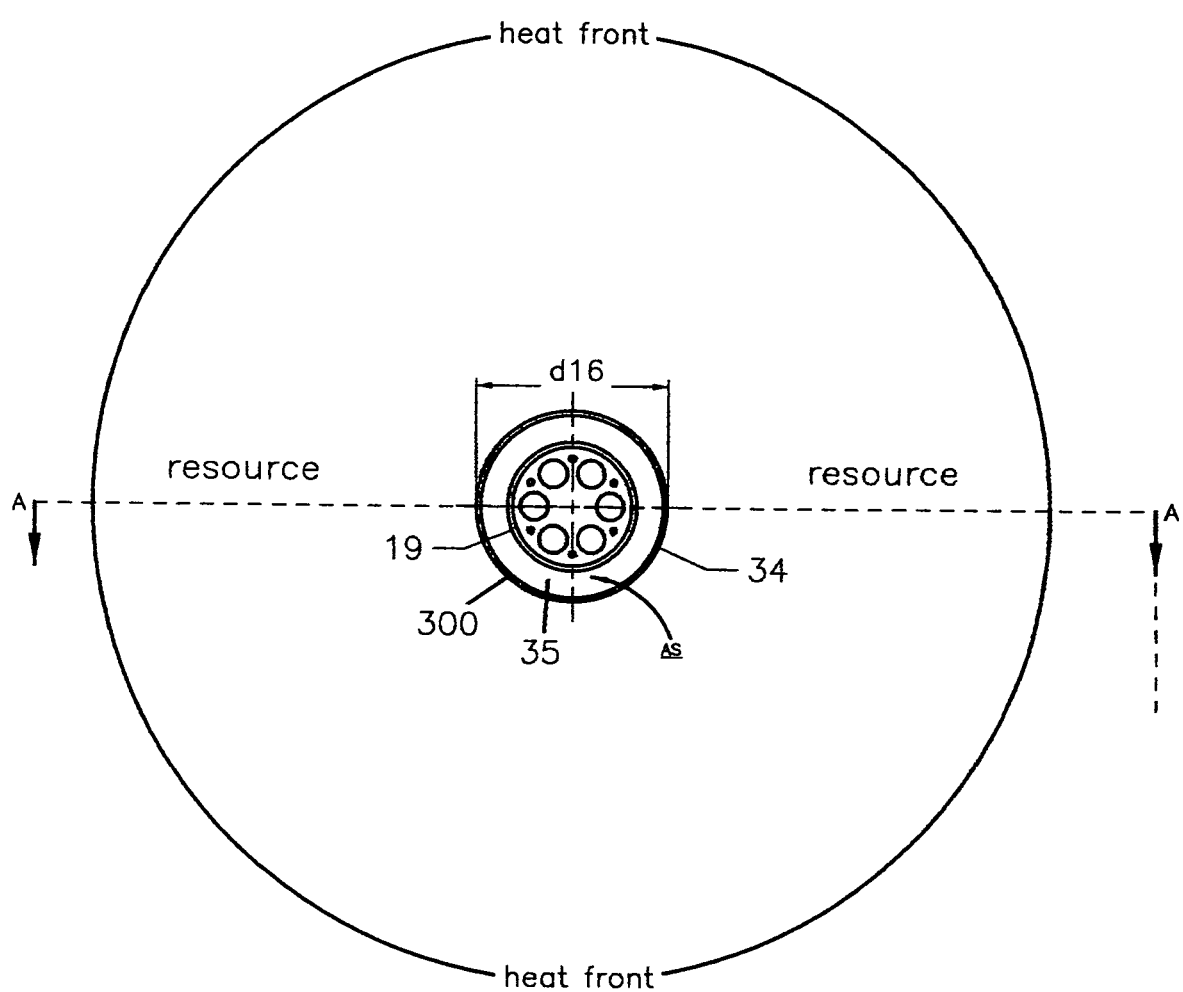

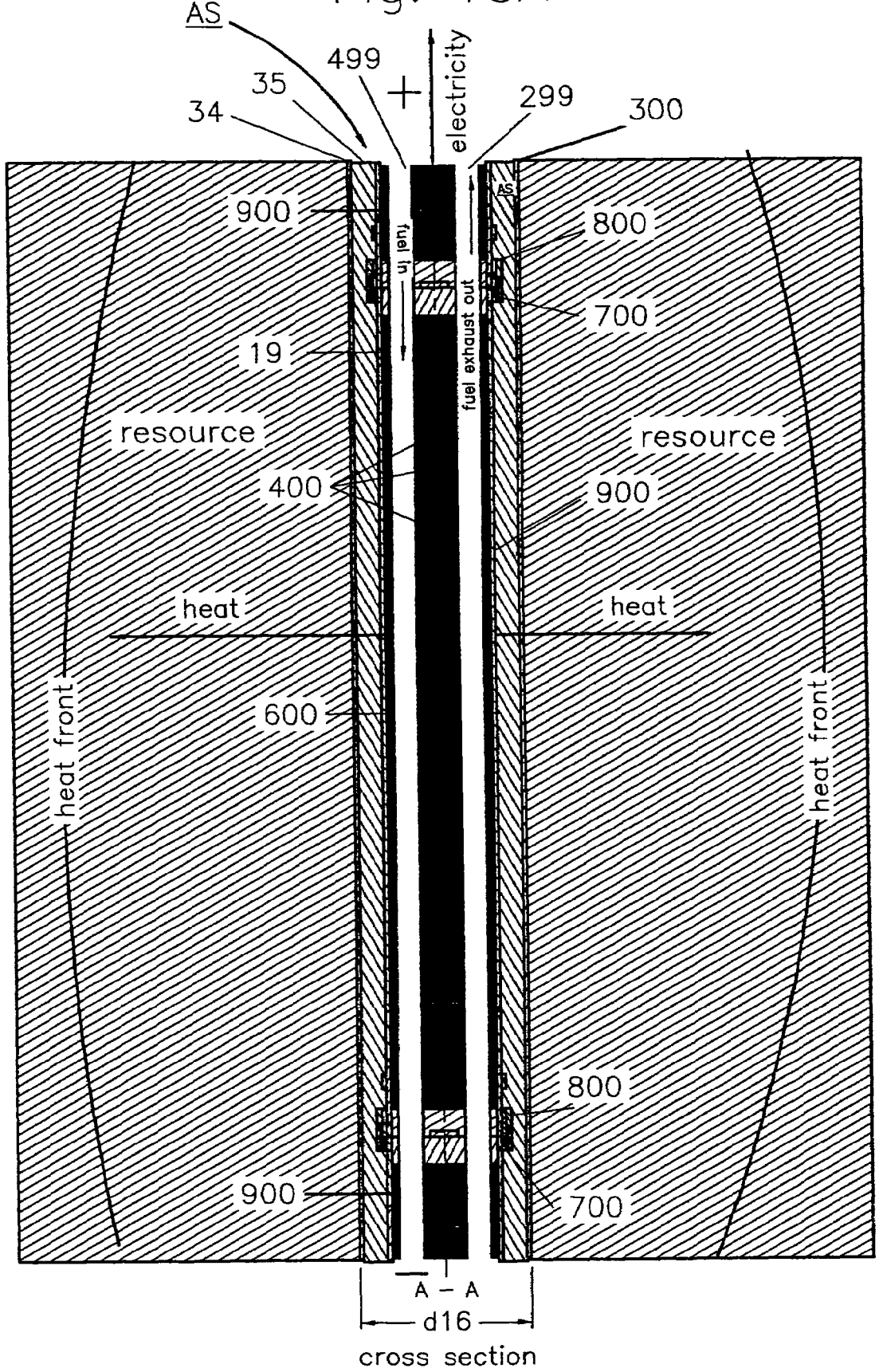

enlarged view

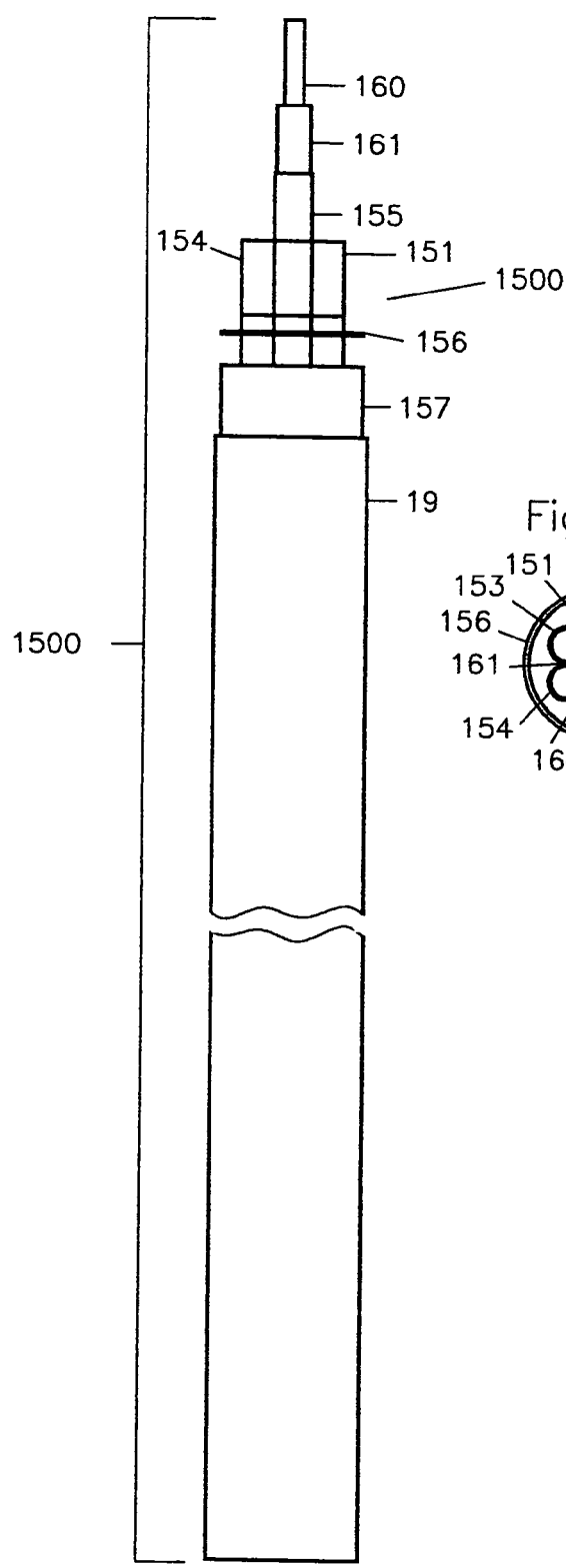
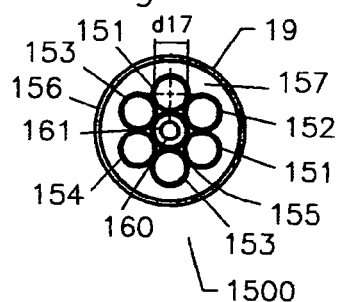
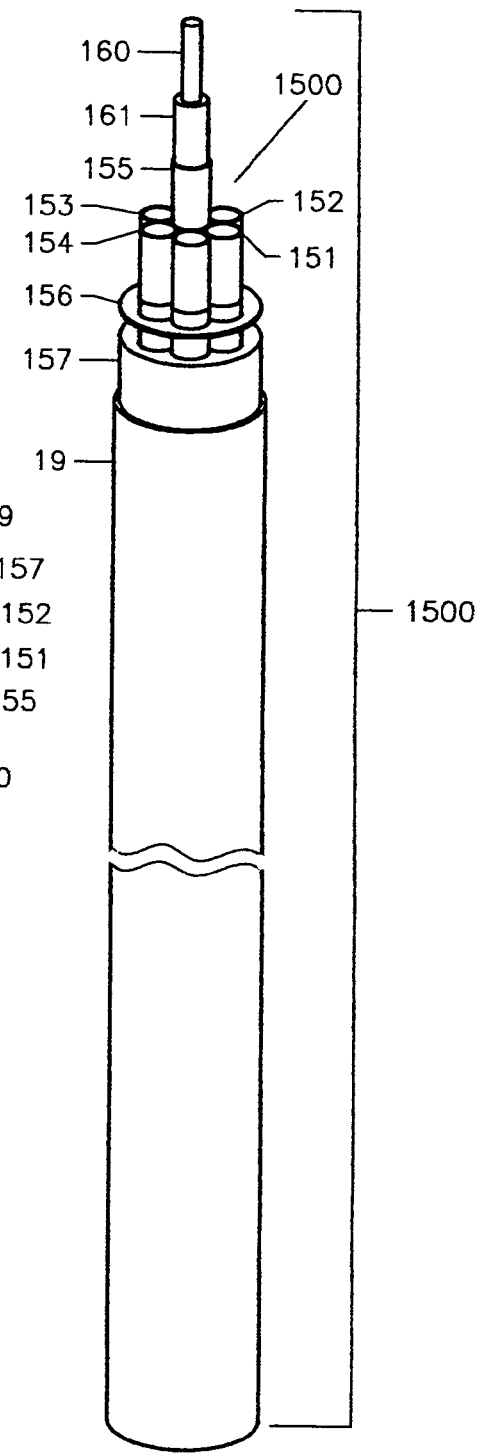

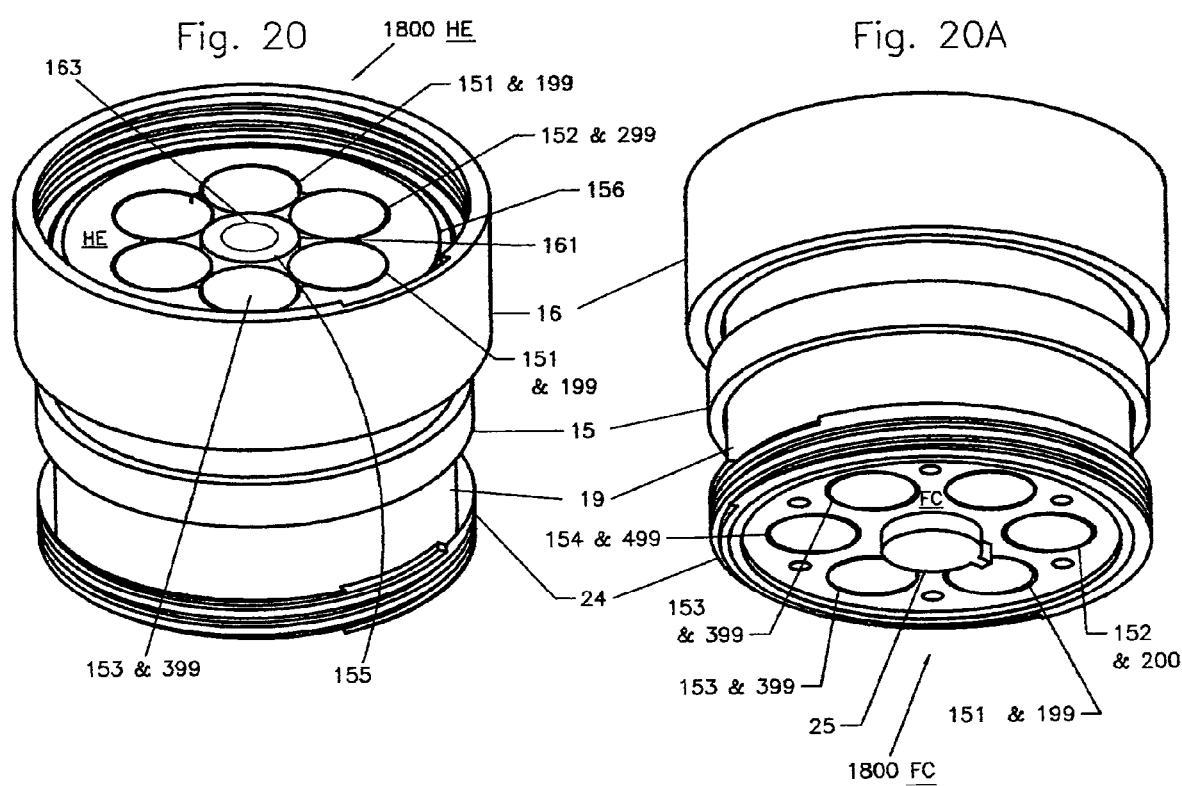

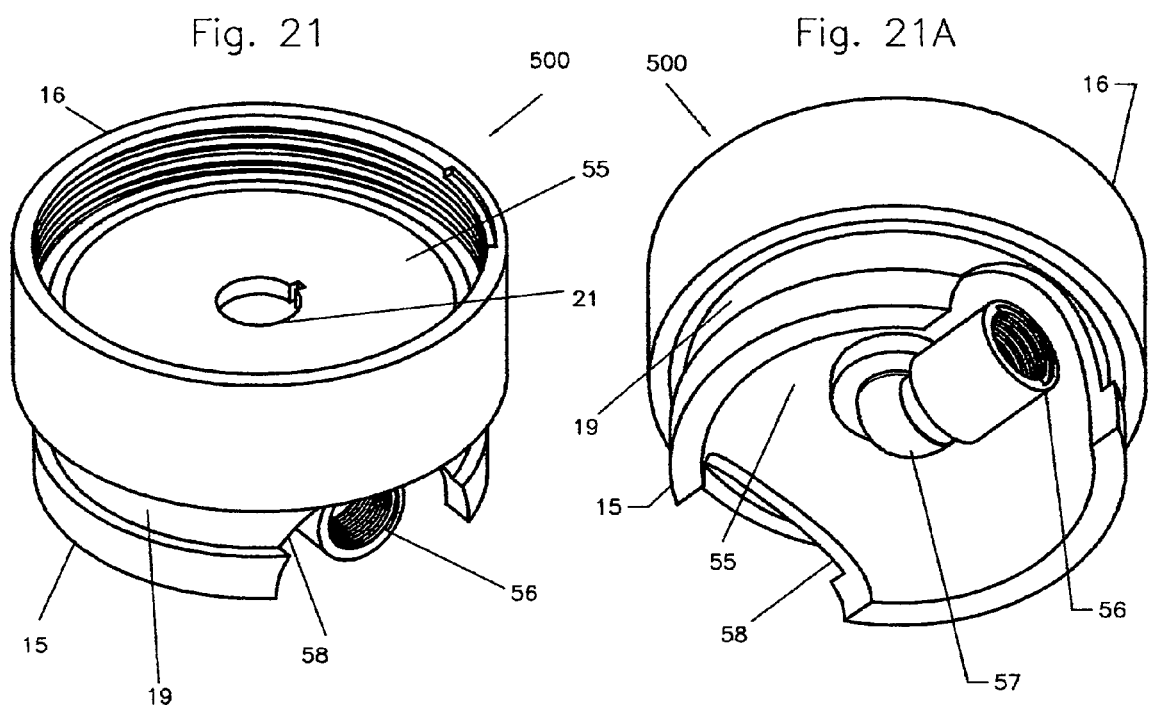

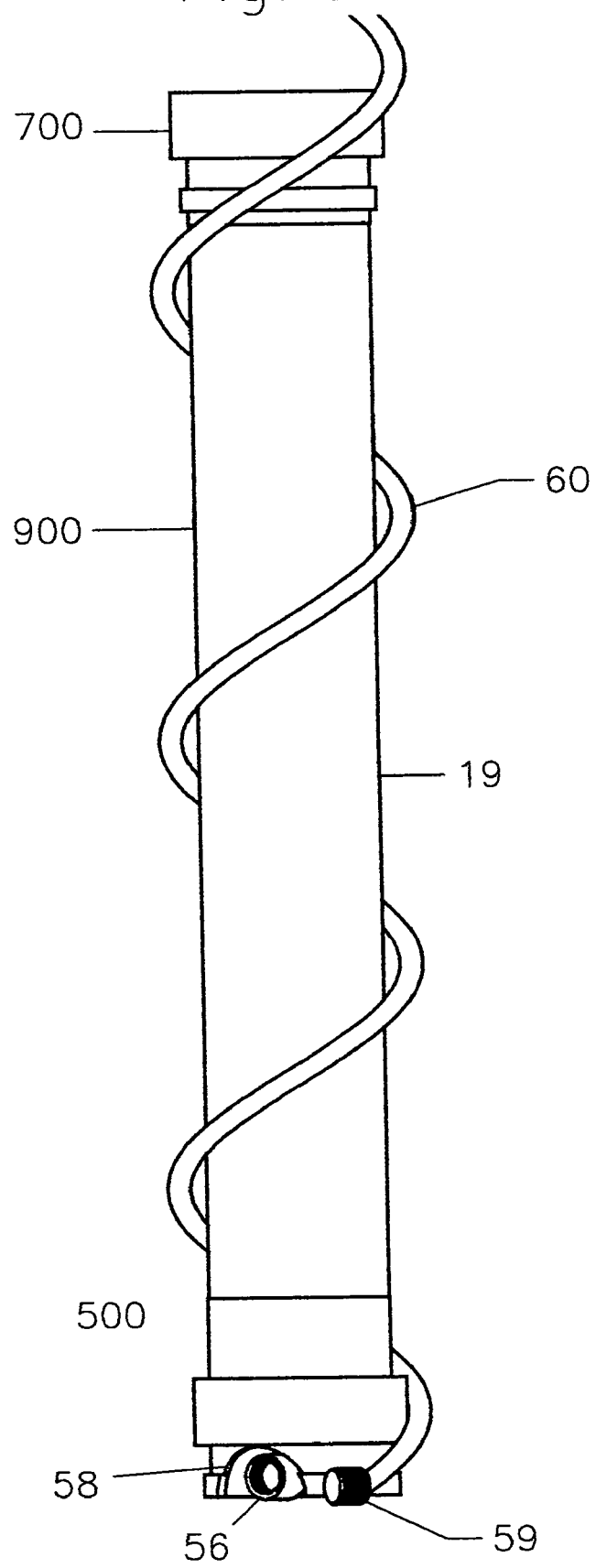

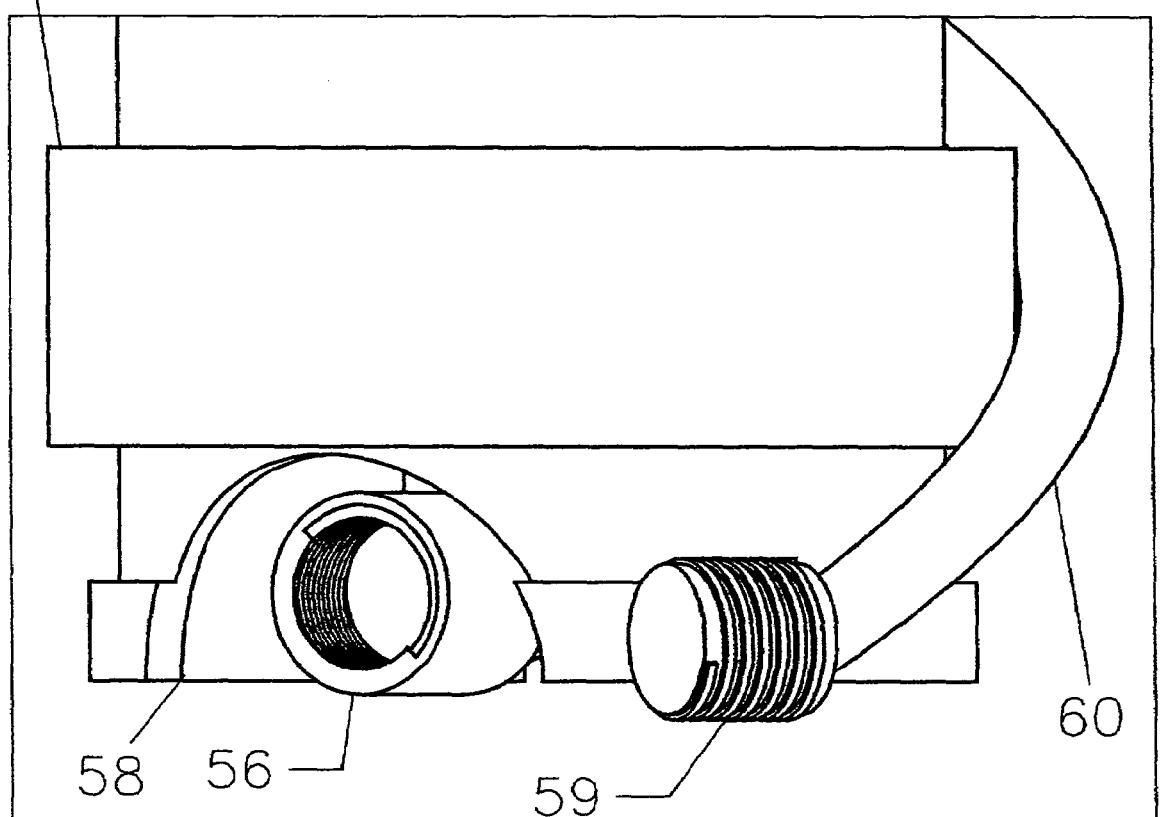

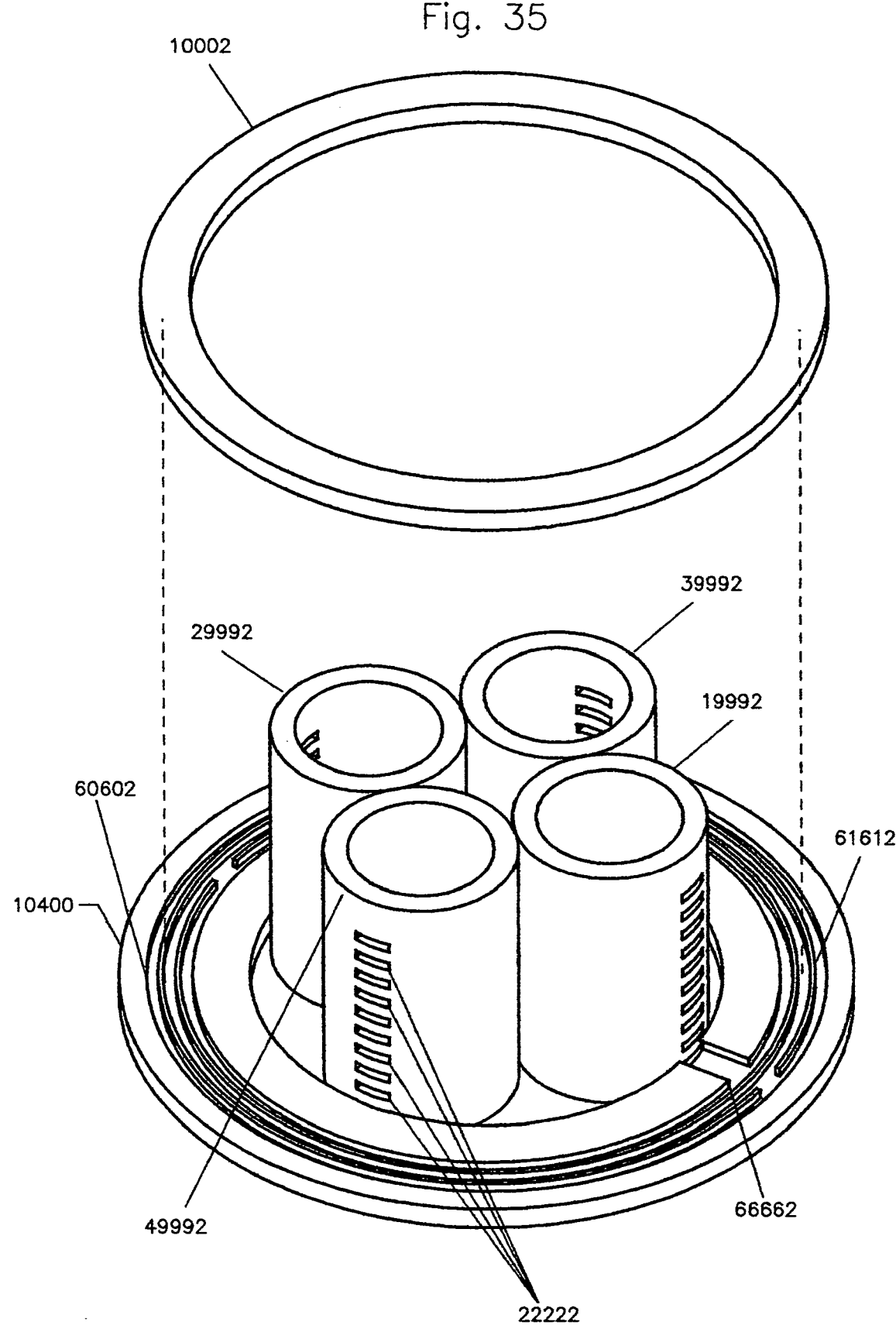

LINEARLY SCALABLE GEOTHERMIC FUEL CELLS

CROSS REFERENCE APPLICATIONS

This application is a continuation-in-part of utility U.S. application Ser. No. 10/053,207 filed on Jan. 15, 2002 which issued as U.S. Pat. No. 6,684,948.

FIELD OF INVENTION

The present invention relates to stacking fuel cells in variable densities thereby forming conduction heaters to heat resource layers for in situ mining of fluids including oil and gas.

BACKGROUND OF THE INVENTION

In situ mining of fluids by heating the resource layer of a geologic formation was done extensively by Sweden in World War II to acquire oil during a shortage. Electrical resistance heaters were placed in boreholes often in hexagonal patterns to surround a vapor borehole. The resource layer is heated successively by applying current to several rows of heating elements at a time. As soon as the gas is removed from a section corresponding to a row of heating resistors, the current is applied to the next row. During wartime, the energy efficiency was not an issue, since embedded shale could be made to produce oil by means of available hydroelectric power.

Modern fuel cells are used downhole, but the purpose of these fuel cells is to produce electricity for pump operations. In the prior art, fuel cell stacks were constructed in discreet modules of a size tailored to their electrical demand or dictated by the compressive and other forces at work inside the stack.

These short stacks were then typically connected in arrays, which in aggregate produce the desired quantity of electrical energy.

U.S. patent application Publication No. US2002/0011 335A1(2002) to Zhang et al. discloses the use of downhole fuel cells to generate electricity for mining operations. Zhang at paragraph 0065,mentions the use of heat generated by the fuel cell to power devices, which presumably could include a hot water heater, and an unspecified use in highly viscous, cool environments. There are no known teachings of specifically designing a fuel cell assembly to heat a resource layer in an in situ mining operation.

There is a need for a subterranean heater with greater efficiency in terms of net energy production and reduced energy cost for mineral extraction and other applications. The heater would preferably consume a gaseous fuel of the type generated by the subterranean formation being heated as a normal by-product of the operation being performed to avoid the need to import fuel.

Ideally, the heater would produce heat uniformly along its length, without risk of autocombustion and would heat a formation at a reduced net cost for fuel. The present invention incorporates all of these advantages.

U.S. patent Pub. No. 2002/0011335 (Zhang) teaches the operation of down-hole fuel cells from down-hole "fuel and oxidant vessels", page 2, ¶ 0038, (see Zhang, FIG. 1 , #12 & #14) also called "oxidant reservoirs" and "fuel reservoirs" page 7, ¶ 0083. According to Zhang, when said reservoirs "have exhausted their resources", they are replenished from "external sources" like "bottles/tanks", which are themselves types of reservoirs.

The present invention is unique, in part, in that the fuel cells, located in a borehole, are in physical communication with the planet surface through conduits. Said conduits serve as continuous passages for the movement of fluids-fuels, oxidants, and exhaust products—to and from the fuel cells.

The present invention is an improvement because fuel and oxidant can be supplied to the fuel cells continuously from the surface without the need to replenish down-hole reservoirs.

Geothermic Fuel Cells (GFC's) are unique in that they are designed to be linearly scalable. This is to say that GFC stacks are designed to be extensible, up to lengths of 1000 feet. This has been achieved by designing a fuel cell stack comprised of modular building blocks—modules that can be assembled end-to-end to create stacks of scalable length.

SUMMARY OF THE INVENTION

The operation of a fuel cell is well known in the art. Generally, a fuel cell converts fuel and oxygen to heat and electricity through an electrochemical reaction involving a cathode, anode, and an electrolyte. In many typical applications, fuel cells are used to generate electricity, and heat is a waste product. Candidate fuel cells of the planar solid oxide type are described in U.S. Pat. Nos. 6,296,963 and 5,993,986.

In the present invention, the cells are used to generate heat with electricity as a co-product. Part of the heat maintains the fuel cell at operating temperature, while the majority is transferred to the surrounding formation, raising its temperature. The electricity produced by the cells is conducted to the surface for use or sale/export.

Different applications of the heater and different formations being heated will have different thermal output requirements. Three general approaches to adapting the output of the heater are anticipated. The first is by altering the surface area of the individual fuel cells. Smaller cells will produce less heat, while larger cells produce more. Selecting different sizes when assembling the heater will result in different thermal output. A second approach is to introduce spacers between individual fuel cells or small groups of fuel cells. This results in lowered average output measured over a length of the heater having both fuel cells and spacers, since the spacers contribute no heat. A third approach is to stack standardized fuel cell modules into a chosen density to get a desired heat output.

In the preferred embodiment, some number of fuel cells will be assembled into a heater segment, in a workshop or factory environment. These segments will then be transported to the site where the heater is to be installed. The segments will be joined together to form the complete heater. Preferably a heat exchanger will link the fuel cell modules to the surface operations.

The present invention is a subterranean heater composed of fuel cells. In the preferred embodiment, the apparatus comprises a plurality of fuel cells assembled in a vertical stack via plates generally referred to in the art as "interconnect plates", or "bipolar plates". Conduits throughout the stack supply the cells with fuel and air or other oxidant, and remove exhaust gases. Preferably, the fuel cell stack is enclosed in a casing adapted for insertion into a well bore. An electrical connection is provided to the far end (typically bottom) of the stack to allow completion of an electric circuit.

The encased fuel cell stack is inserted into a wellbore, preferably vertically, but potentially horizontally or at some other orientation. Preferably, the encased stack is cemented into the borehole by a suitably heat conducting grout. Fuel and air are pumped into the stack through the incorporated conduits to the fuel cells. Within the fuel cells, electrochemical reactions take place to produce electricity and heat. The electricity passes out of the stack through an electric circuit. Fuel cells, of the solid oxide type, which are preferred, operate at temperatures in the 800 to 1000 degree Centigrade range. This is also the preferred temperature range for many subterranean heating applications. Heat passes from the fuel cell stack to the underground formation by thermal conduction. Thus, the operating fuel cell stack acts as a down-hole conduction heater of enormous magnitude, perhaps taking a year of operation to prepare a resource layer for in situ mining.

In the preferred embodiment of the invention, conduits for air, gaseous fuel, and exhaust are formed by aligning holes in the interconnect plates. Communication for circulation of these gases is provided by channels formed in the surface of the interconnect plates.

The size and activity of the fuel cells themselves care be modified to tailor the output of the thermal energy to the formation being developed. Alternatively, the fuel cells themselves may be standardized, to maximize production efficiency, while the thermal properties of the stack are varied by the insertion of spacers between active fuel cells. Ideally, standardized fuel cell assemblies are stacked to a desired density to adequately heat a particular resource layer.

A refinement of the invention may be to include a heat exchanger connecting the fuel cell stack to the surface. The heat exchanger may be insulated to minimize heating of overburden above the resource deposit. Further, the heat exchanger may serve as a heat exchanger between the exhaust gases leaving the fuel cell stack and the incoming streams of fuel and/or air. By this method, the maximum amount of thermal energy is retained within the target formation.

When the invention is used to produce hydrocarbonaceous resources, it is intended that the volatile gases, produced as the result of heating such deposits, should be used as fuel to power the fuel cells. By this method, the fuel cells will be self sustaining. Since the thermal process produces a fuel stream, and the fuel is first converted to electricity in the fuel cells, the production cycle is, therefore, being powered by that fraction of total energy that is otherwise usually wasted. The net result is an increase in the overall thermodynamic efficiency of the resource extraction system.

The fuel cell heater does double duty as both a heating element and a power generator, resulting in increased economic efficiency. The present invention overcomes many of the diseconomies of other subterranean heaters by reducing the cost of heat produced by the fuel cells. Although the fuel cells do require fuel, the cost of fuel is at least partially offset by the value of the electricity the cells produce.

The present invention combines the advantages of downhole combustion heaters with the advantages of electrical resistance heaters, while eliminating most of the disadvantages typical of subterranean heaters of the prior art. The present invention converts fuel to heat, like combustion heaters, avoiding the inefficiencies of electrical resistance heaters. The present invention produces heat uniformly over the length of the heater, like electrical resistance heaters, while avoiding the hot spots and uneven heating of combustion heaters. The present invention also eliminates the problems associated with mixing fuel and air in flameless combustor heaters by maintaining separation of these gases across the fuel cell electrolyte.

Like the prior art Geothermic Fuel Cells (GFC's) are also constructed in modules. Unlike the prior art, however, GFC modules are assembled end-to-end, by means of mating hardware and joined into "sticks" of multiple modules. Preferably GFC modules measure 5 feet from coupling to coupling, and each generates just over a kilowatt of electrical power and produces around 3700 BTU of thermal energy per hour. The "sticks" are 30 to 60 feet in length and comprise 6–12 modules. The sticks are assembled in the factory and are sealed for shipment to the field. The sticks are then installed into vertical boreholes by standard oil and gas drilling equipment. Sticks are joined together to form "strings". These strings of GFC modules can be up to 1000 feet in length. This enables GFC's to be assembled in lengths that match the thickness of the resource formations being heated, even if the formations are very thick. Oil shale deposits in the Piceance Creek Basin of Western Colorado for example are two thousand feet thick Of course, shorter GFC strings can be used to heat thinner formations.

There are many design features unique to GFC's that enable them to be scaled linearly so that the stacks can be made as long as desired. For example, perforations in the interconnect plates which form conduits for the transport of fuel and air into the fuel cell stack are a common feature of the prior art. (see FIG. 1A, U.S. Pat. No. 6,344,290). In GFC's however, these perforations and the conduits they form are disproportionately large compared to the size of the fuel cell ceramic they serve. In the prior art, each fuel cell electrode was served either by small internal conduits or in some cases external manifolds. (See FIG. 1, U.S. Pat. No. 6,500,578). In the prior art, these conduits and manifolds have been small in cross section, especially compared with the surface area of the solid oxide ceramic they were designed to serve. This has been universally the case in the prior art because the size of the stack served by any given set of conduits or manifolds has always been relatively short. In the prior art, each stack is served by its own set of conduits or manifolds, and they are, therefore, sized only to accommodate the amount of air and fuel needed by that particular stack. In the case of GFC's however, the stack is designed to be as much as a thousand feet long. The gas flow conduits serving the stack are correspondingly much larger in absolute terms and very much larger in proportional terms, which is to say in relation to the area of the ceramic wafer being served. The large sizes of the GFC conduits allow air, fuel, and exhaust streams to pass freely in and out of the stack over comparatively great lengths.

GFC stack modules are unique in that they are designed to be coupled together end-to-end. The modules have a male end which is oriented pointing down toward the bottom of the borehole, and female end which points up. The male end, is threaded and equipped with a keyed plug. This plug is inserted into a corresponding receptacle on the female end. The key on the plug fits a corresponding slot in the receptacle, forcing the modules to join in perfect alignment, maintaining the orientation of the conduits within the stack. The female end is fitted with a mating collar which screws onto the threads of the male end. When tightened, this collar forces the two modules together, forming a gas-tight seal between the module ends, thus allowing modules to be joined together to form uniquely long stacks.

Another unique feature of GFC modules is the arrangement of the compression bolts within the stack. The use of compression bolts or "tie rods" to maintain seals between interconnect plates in fuel cell stacks is a common feature of the art, see U.S. Pat. No. 6,372,372.The arrangement of compression bolts in GFC stacks is unique and is one of the features that allows the stacks to be assembled end to end. In GFC stacks, the compression bolts are contained within the body of the stack itself, rather than being external to the stack, which is a common feature of the prior art. This feature in combination with unique aspects of the stack end caps, enables the linear connection of GFC modules. Both the male and female module end caps, are constructed of metal or other suitable material thick enough so that holes for the compression rods can be counter-sunk into the end caps. Counter sinking the bolt holes enables the nut/washer assemblies at the end of each bolt to be tightened onto the cap and into the countersinks, thus leaving the end of the cap flush, so that it can butt up against the opposing cap and form a seal.

The above and other features and advantages of the present invention will become even clearer from the detailed description of a specific illustrative embodiment thereof, presented below in conjunction with the accompanying drawings.

BRIEF DESCRIPTION OF THE DRAWINGS

FIG. 2A is a plan view of the cathode side of the fuel cell interconnect plate.

FIG. 2C is a cross section of the fuel cell interconnect plate of FIG. 2A across the line C—C FIG. 2D is an enlarged perspective view of the air channels on the cathode side of the fuel cell interconnect plate.

FIG. 3 is a plan view of the anode gasket.

FIG. 3A is a cross sectional view of the anode gasket of FIG. 3 taken across line A—A.

FIG. 4 is a plan view of the cathode gasket.

FIG. 4A is a cross sectional view of the cathode gasket of FIG. 4 taken across line B—B.

FIG. 5 is a plan view of the electrolyte gasket.

FIG. 5A is a cross sectional view of the electrolyte gasket of FIG. 5 taken across line C—C.

FIG. 7 is a perspective view of a partial (6 cell) Geothermic Fuel Cell stack.

FIG. 8 is a perspective view of the female module coupling.

FIG. 8A is plan view of the female module coupling.

FIG. 8B is an elevation view of the female module coupling.

FIG. 13 is a plan view of Geothermic Fuel Cell Modules installed in a resource.

FIG. 13A is a cross-sectional view taken along line A—A of FIG. 13 of Geothermic Fuel Cell Modules installed in a resource.

FIG. 16 is an exploded elevation view of one end of the heat-exchange manifold assembly.

FIG. 16A is an exploded perspective view of one end of the heat-exchange manifold assembly.

FIG. 16B is a plan view of one end of the heat-exchange manifold.

FIG. 20 is a perspective view of the female/heat-exchange manifold end of the heat-exchange manifold to fuel cell stack transition coupling.

FIG. 20A is perspective view of the male/fuel cell stack end of the heat-exchange manifold to fuel cell stack transition coupling.

FIG. 21 is a perspective view of the bottom plug/current return coupling assembly.

FIG. 21A is a perspective view of the underside of the bottom plug/current return coupling assembly.

FIG. 22 is an elevation view of the end of a string module and current return cable.

FIG. 22A is an enlarged elevation view of the current return cable coupling.

FIG. 31A is an exploded perspective view of an alternative embodiment of the manifold.

FIG. 32A is a perspective view of another alternative embodiment of the present invention.

FIG. 35 is a perspective view of another alternative embodiment of a GFC interconnect plate.

DETAILED DESCRIPTION OF THE DRAWINGS

Here, and throughout, the term "fuel" is intended to comprehend any of those fluids—usually in gaseous phase—which might serve as a chemical energy source for the subject fuel cells. Said fuels include, but are not limited to: hydrogen, natural gas, methane, carbon-monoxide; hydrocarbons of various molecular weights—propane, butane, etc.; vaporized fuels that are normally liquid at room temperatures—gasoline, kerosene, etc.; mixtures of various gases like "refinery gas", "coal gas", "bio-gas", etc.; and novel substances and mixtures that are not normally considered to be fuels, like process off gases from destructive distillation of recycled tires, etc.

The term "air" is used here and throughout in its general sense as an oxidant fluid—almost universally in its gaseous phase—containing some fraction of the element oxygen. The oxygen fraction of air is variable, but is here intended to comprehend all fractions including 100% oxygen. Said oxidants may or may not contain fractions up to and including 100% of oxygen bearing chemical compounds like carbon dioxide, carbon monoxide, and others.

The term "planetary surface" or "surface" as used here means at or near the surface of the Earth or other planetary body including the subsurface up to depths typical of the installation of pipelines, tanks, and other infrastructure which is generally installed beneath the immediate surface of a planet and is not necessarily exactly congruent with the surface. The same applies to the space immediately above a planetary surface. So that the terms "planetary surface" and "surface" can be taken to mean anything within a hundred feet, more or less, below or above a planetary surface.

The term "electrode" or "ceramic electrode wafer" or "electrode wafer" as used here is intended to comprehend both the individual electrodes that typically comprise a fuel cell, namely the anode and the cathode, but also to comprehend the assembly of the electrodes together with the electrolyte that separates them.

Figure 1:
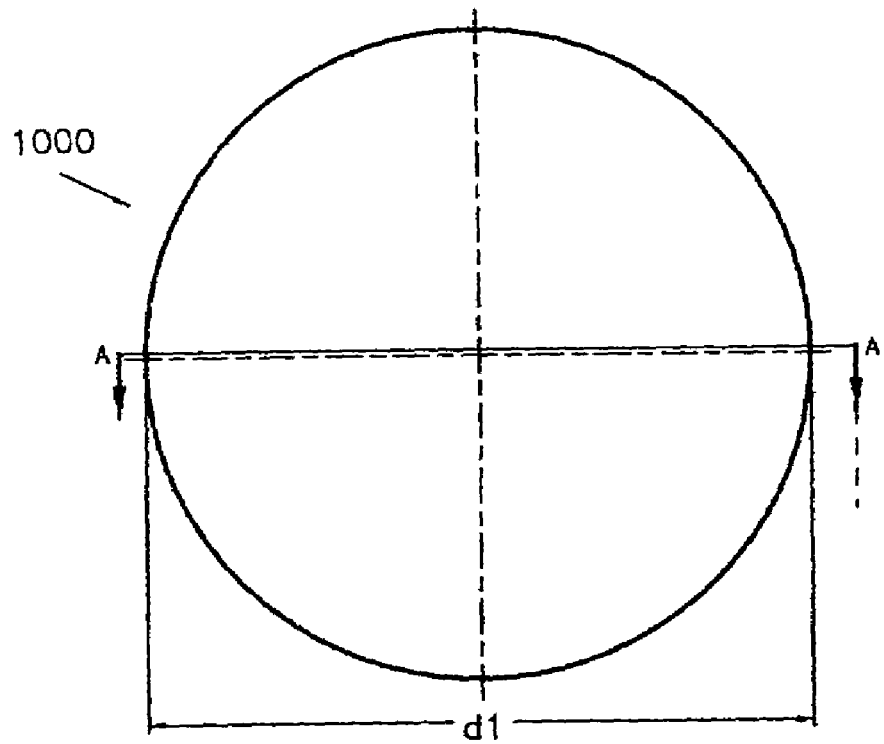
FIG. 1 is a plan view of the anode (positive) side of the ceramic electrode wafer.
Figure 1A:
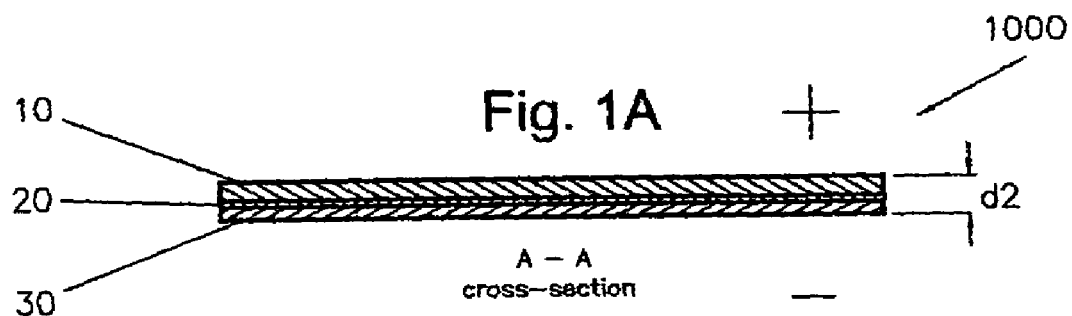
FIG. 1A is an elevation view of the ceramic electrode wafer.
Figure 1B:
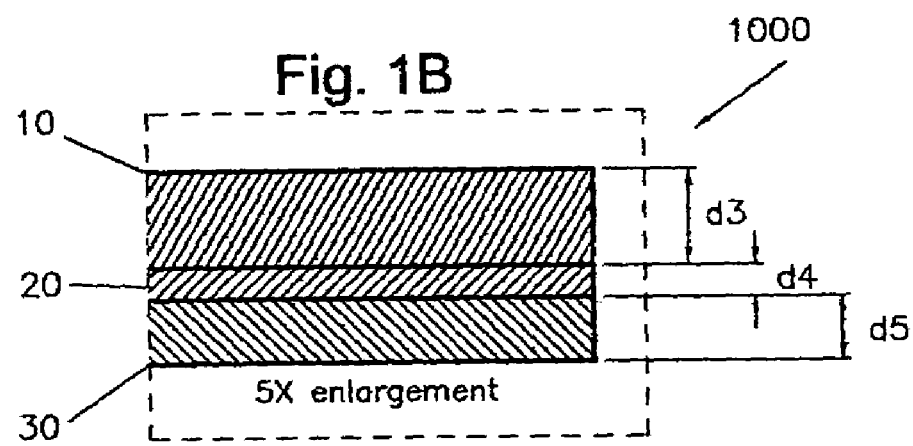
FIG. 1B is an enlarged elevation view of a portion of the ceramic electrode wafer.

FIGS. 1, 1A, 1B show the fuel cell ceramic 1000. This is a thin, round ceramic wafer with $d_1$ equal to approximately 2 inches, and $d_2 \approx 0.05$ to 0.1 inches. It is composed of three materials. The first layer 10 comprises the electrode's anode, + side, and is made of nickel-doped Yttria Stabilized Ziconia (YSZ) or other suitable material. The anode layer is porous (20–40%) and thin—$d_3 \approx 0.025$ to 0.075 inches. The middle layer 20, comprises the electrolyte layer; it is made of impermeable YSZ or other suitable material, and is thinner than the anode—$d_4 \approx 0.001$ to 0.01 inches. The third layer 30 is the cathode, − side, made of Strontium-doped Lanthanum Magnetite or some other suitable material, and is typically thinner than the anode—$d_5 \approx 0.02$ to 0.05 inches. Such ceramic composites are a feature common to solid oxide fuel cells and are well known in the art, see U.S. Pat. No. 6,051,329. Many different compositions and thicknesses are viable alternatives for Geothermic Fuel Cells, and those specified here are intended only to be representative and not particular. See James Larminie and Andrew Dicks, *Fuel Cell Systems Explained*, (New York: John Wiley & Sons Ltd., 2000) p.164–168. When operating, the fuel cell wafer 1000 will preferably exhibit a power density of 0.1 to 1 Watts/cm$^2$, and a power output of 5 Watts. The term "wafer" as used herein refers to a dual electrode device-anode electrolyte cathode-as depicted in FIG. 1.

Figure 2:
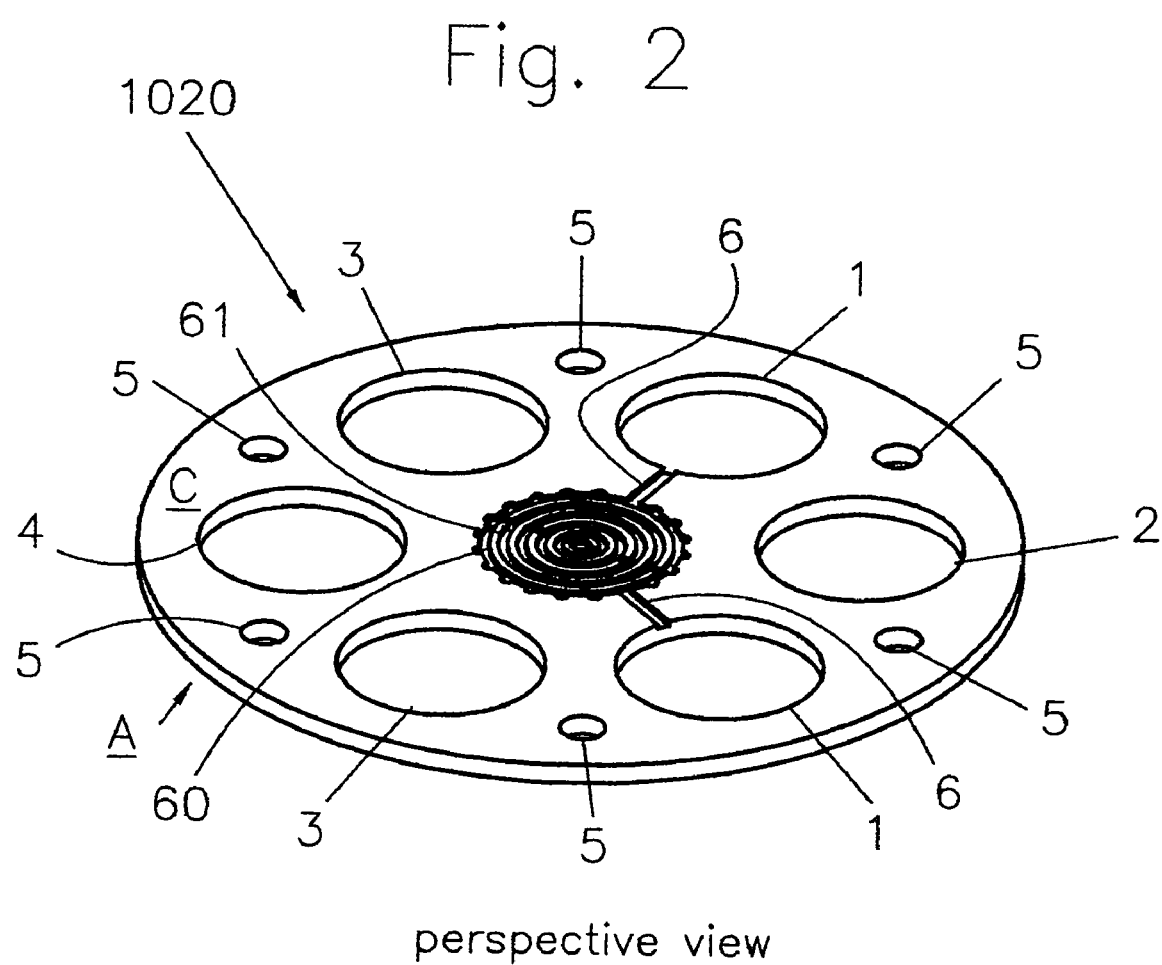
FIG. 2 is a perspective view of the cathode side of the fuel cell interconnect plate.
Figure 2B:
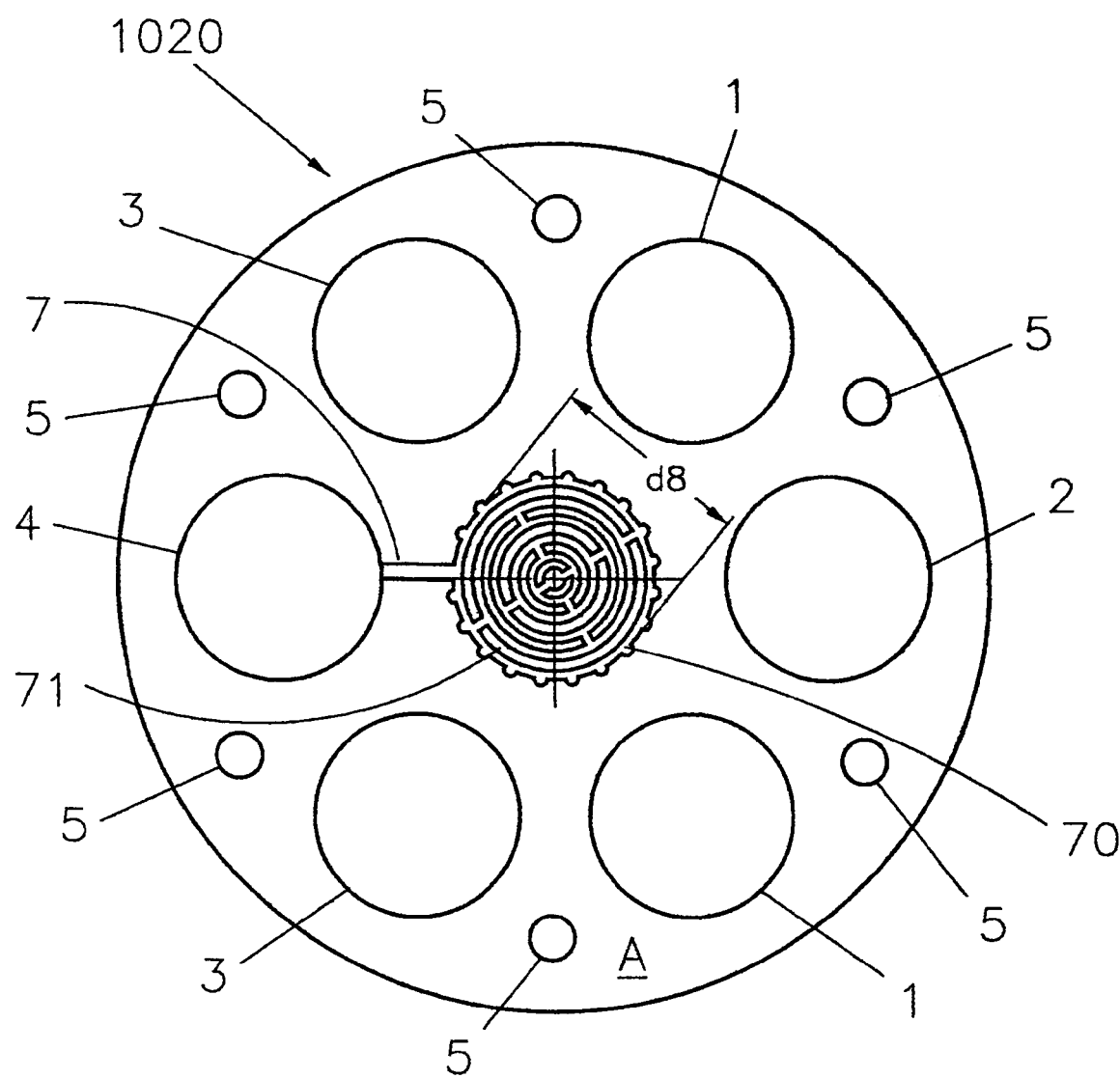
FIG. 2B is a plan view of the anode side of the fuel cell interconnect plate.

FIGS. 2–2D show the interconnect plate 1020. The interconnect plate 1020 serves a number of purposes: It is the substrate on which the ceramic electrode wafer 1000 rests, and the plate 1020 provides electrical contact to both sides of the fuel cell wafer 1000. The interconnect plates, when stacked up as shown in FIG. 7, also form the conduits for fuel, air, and exhaust that must be communicated to and from the electrode wafers 1000. Holes, 1 through 4, measuring from one to two inches in diameter, $d_9=1.7$ in., pass completely through the interconnect plates 1020, to form said conduits, when properly aligned. Each plate 1020 has two holes 1 for the air conduits, one hole 2 for the fuel exhaust conduit, two holes 3 for the air exhaust conduits, and one hole 4 for the fuel conduit. (Gaseous fuel passing through the fuel conduit can be natural gas, methane, "refinery gases" such as butane, propane, etc., suitable off-gases harvested from the heated resource formations, or other suitable gaseous fuel.) Note that there are two conduits each for air intake and air exhaust, due to the larger relative quantities of air compared to fuel required to sustain power output by the fuel cells. There are a further six, smaller, holes 5 for the stack compression bolts (see FIG. 10) $d_{10}=0.4$ in. Each plate 1020 has two sides: the cathode side C and the anode side A, corresponding to the sides of the electrode wafer 1000 contacted by the plates. Two channels 6 etched in the surface of the cathode side C of the interconnect plate 1020 allow air from the air conduits to reach a network of channels 60. This network of air channels 60 (see enlargement FIG. 2D) forces the circulating air to follow a circuitous route across the plate, thereby feeding air to every part of the cathode 30. This area of etched channels 60 measures $d_8=1.7$ in., slightly smaller than the diameter of the electrode wafer 1000. The channels are of width, $d_{11}=0.1$ in. and depth, $d_{12}=0.03$ in. The cathode side 30 of the wafer 1000 is in contact with those parts of the plate that have not been etched 61 to form air channels 60. These unetched areas, ridges 61, support the electrode wafer 1000 and provide electrical contact with the cathode side of the wafer. On the anode side A of the plate 1020, see FIG. 2B, a single channel 7 allows fuel to pass from the fuel conduit 4 to a network of fuel channels 70. The gaseous fuel is forced by the channels 70 to follow a long route which brings the fuel into contact with all areas of the anode 10. As on the cathode side, the unetched areas, ridges 71, form the areas of contact between the interconnect plate 1020 and the anode side of the wafer 1000. The plates 1020 are approximately 7.5 inches in diameter, $d_6$=7.5 in., and are approx. 0.18 in. thick, $d_7$=0.18 in. The plates 1020 can be made of steel or ceramic or other suitable material having the desired characteristics of heat resistance and electrical conductivity.

FIGS. 3, 3A show the anode gasket 1030. The gasket 1030 is the same diameter as the interconnect plate 1020, $d_6$=7.5 in., and the same thickness as the ceramic anode, $d_3 \approx 0.025$ to 0.075 inches. The anode gasket 1030, together with the other gaskets of the fuel cell assembly, 1040 & 1050, (see FIGS. 4–5) provides gas-tight seals and electrical insulation between the interconnect plates 1020. The anode gasket and the other gaskets have holes 1–5 in common with the holes in the interconnect plates 1020. In addition, the anode gasket has a hole in the center 9, $d_{13}$=2 in., to accommodate the anode side 10 of the fuel cell ceramic 1000. The anode gasket also provides a route of egress for spent fuel from the anode. Fuel exhaust leaves the anode by way of a gap 11 in the gasket 1030, which provides communication between the anode and the hole for the fuel exhaust conduit 2. The gaskets maintain their seals by means of compressive forces applied to the fuel cell stack by bolts passing through holes 5 (see FIG. 10). Accordingly, the gaskets are made of ceramic, glass, mica, or other suitably insulative material which remains solid at the operating temperatures, 750–1000° C., of the stack.

FIGS. 4, 4A show the cathode gasket 1040. The cathode gasket is the same diameter as the anode gasket and the same thickness as the cathode layer 30 of the fuel cell ceramic 1000, $d_5 \approx 0.02$ to 0.05 inches. The cathode gasket 1040 has holes 1–5 in common with the anode gasket 1030 and interconnect plates 1020, and hole 9 in common with the anode gasket 1030. The cathode gasket provides a route of egress for air exhausted from the cathode. Air exhaust leaves the cathode by way of two gaps 12 in the gasket 1040, which provide communication between the cathode 30 and the holes for the air exhaust conduits 3.

FIGS. 5, 5A show the electrolyte gasket 1050. The electrolyte gasket has holes 1–5 and 9 in common with the other gaskets, but has no gaps. The electrolyte gasket is the same thickness as the electrolyte layer of the fuel cell ceramic, $d_4 \approx 0.001$ to 0.01 inches.

Figure 6:
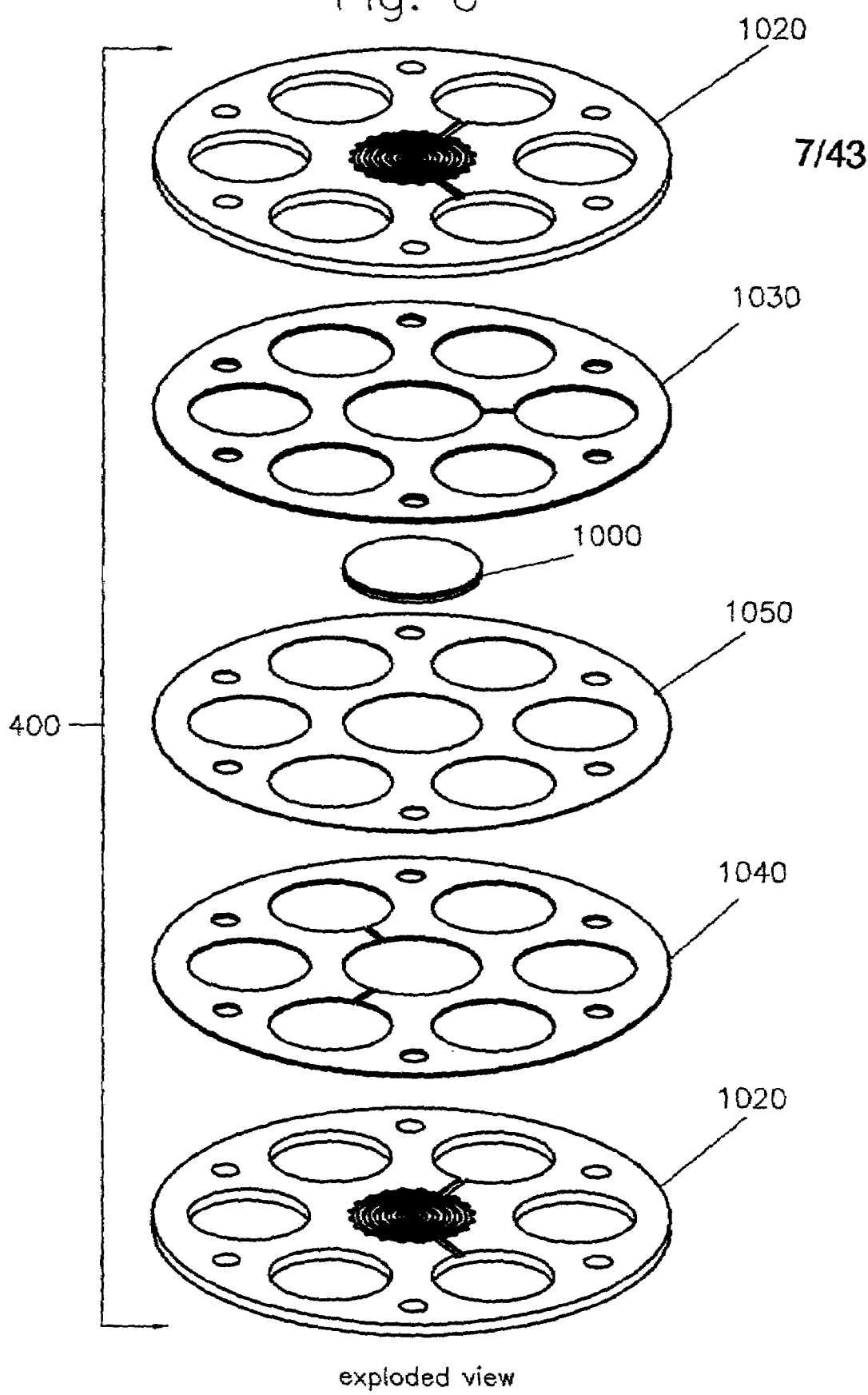
FIG. 6 is an exploded perspective view of a Geothermic Fuel Cell assembly.
Figure 6A:
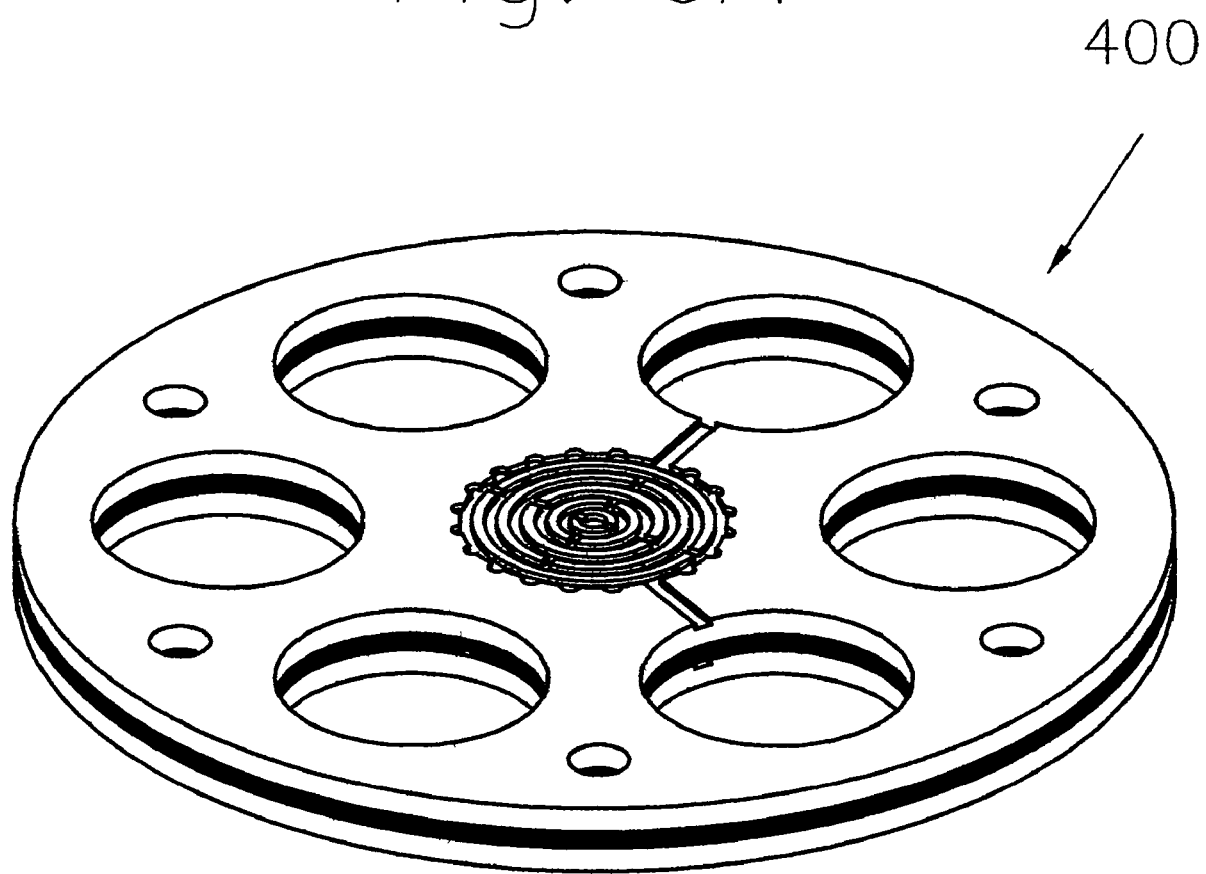
FIG. 6A is a perspective view of a Geothermic Fuel Cell.

FIGS. 6, 6A show one complete cell assembly 400. FIG. 6 shows an exploded view of a one-cell assembly 400. The assembly consists of two interconnect plates 1020; three sealing gaskets: the anode gasket 1030, the cathode gasket 1040, and the electrolyte gasket 1050; and the ceramic wafer 1000. The ceramic wafer 1000 sits in the hole at the center of the middle gasket 1050, and the gaskets are sandwiched between the interconnect plates 1020 forming a complete single fuel cell 400.

FIG. 7 shows a number of individual cells 400 assembled and aligned to form the beginning of a fuel cell stack 600. It can be seen how the holes in the plates and gaskets, 1 through 4, when aligned, begin to form conduits 199—air conduits, 299—fuel exhaust conduit, 399—air exhaust conduits, & 499—fuel conduit, for the passage of gases in and out of the fuel cell stack. Note that each interconnect plate 1020 acts as the top of one cell and the bottom of the next cell in the stack. The stack "pitch", which is to say the number of cells per vertical inch of stack, is approximately 3.8 cells per inch, or 46 cells per foot of stack. Nominal thickness of the cells is $d_{14} \approx 0.26$ in. In completed Geothermic Fuel Cell Modules (see FIG. 10, 900) useful in the field, the stack 600 will be about five feet high, more or less, and will comprise about 230 cells.

FIGS. 8, 8A, 8B show the female end coupling 700 for the Geothermic Fuel Cell (GFC) Module 900. Each end of each GFC module 900 is mounted with a fitting that enables the modules 900 to be coupled together end-to-end. The female end coupling 700 comprises a plate 18 that has holes 1–5 in common with the fuel cell assemblies 400, forming continuations of the stack conduits 199, 299, 399, and 499. The coupling plate 18 is sufficiently thick so that countersunk holes 20 can be drilled into the face of the plate allowing clearance for nuts and washers mounted on compression bolts installed in holes 5 (see FIG. 10). The thickness of the plate also allows the creation of a counter-sunk receptacle 21. This receptacle receives a corresponding contact plug 25 mounted on the male coupling 800 (see FIG. 9). The receptacle 21 is grooved 210 to receive an aligning key 250 on the male plug. Surrounding the coupling plate 18 is a coupling flange 17 that retains a threaded mating collar 16, while allowing the mating collar to turn freely. The mating collar 16 is retained at the female end of the module by a fixed retaining ring 15. A section of casing 19 abuts the middle section of the fuel cell stack casing. The casing is $d_{15}$=8 in, and the wall thickness is 0.25 in, more or less.

Figure 9:
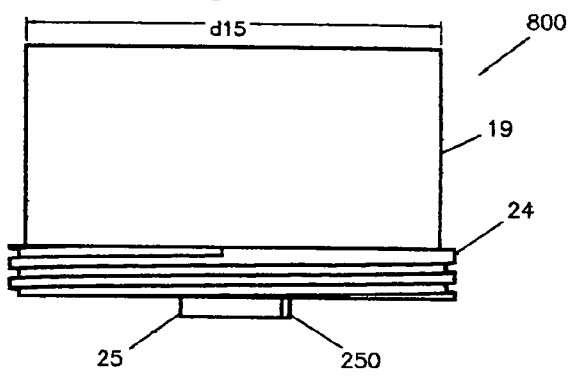
FIG. 9 is an elevation view of the male module coupling.
Figure 9B:
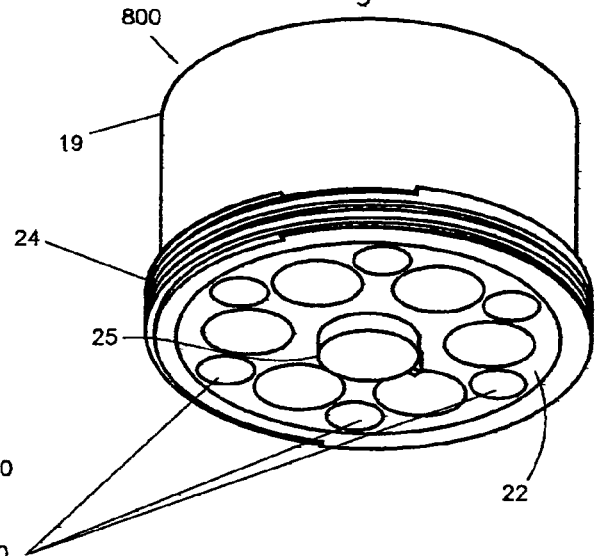
FIG. 9B is a perspective view of the male module coupling.
Figure 9A:
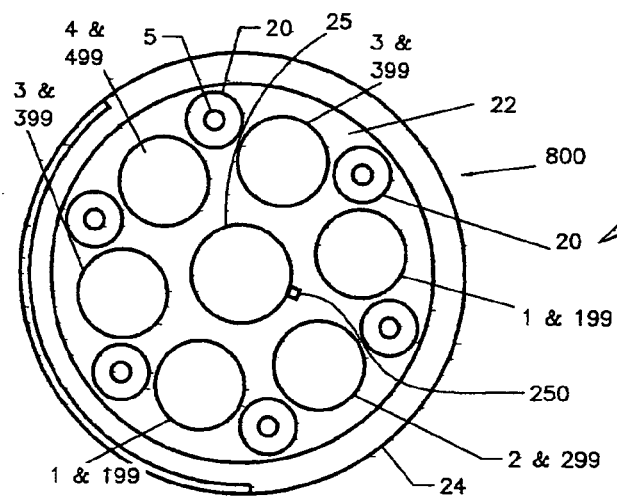
FIG. 9A is a plan view of the male module coupling.

FIGS. 9, 9A, 9B show the male end coupling 800 for the Geothermic Fuel Cell module. Like the female end coupling 700, the male coupling has a plate 22 with countersunk holes 20 & 5 for compression bolts, and holes, 1–4, for the gas conduits 199, 299, 399, & 499. The male end coupling 800 is threaded 24 to join to the female end mating collar 16 (see FIG. 8). There is a raised contact plug 25 that is keyed 250 to join the receptacle 21 on the female end and maintain alignment of the modules. The key 251 fits the groove 210 in the female receptacle, insuring proper alignment. The keyed plug 25 is electrically conductive and provides electrical contact between modules. The male coupling threads 24 are mounted to a section of casing 19 that butts to the middle section of the stack module casing (see FIG. 10). Nominal diameter of the casing is the same as on the female coupling, $d_{15}$=8 in. and wall thickness is the same, 0.25 in.

Figure 10:
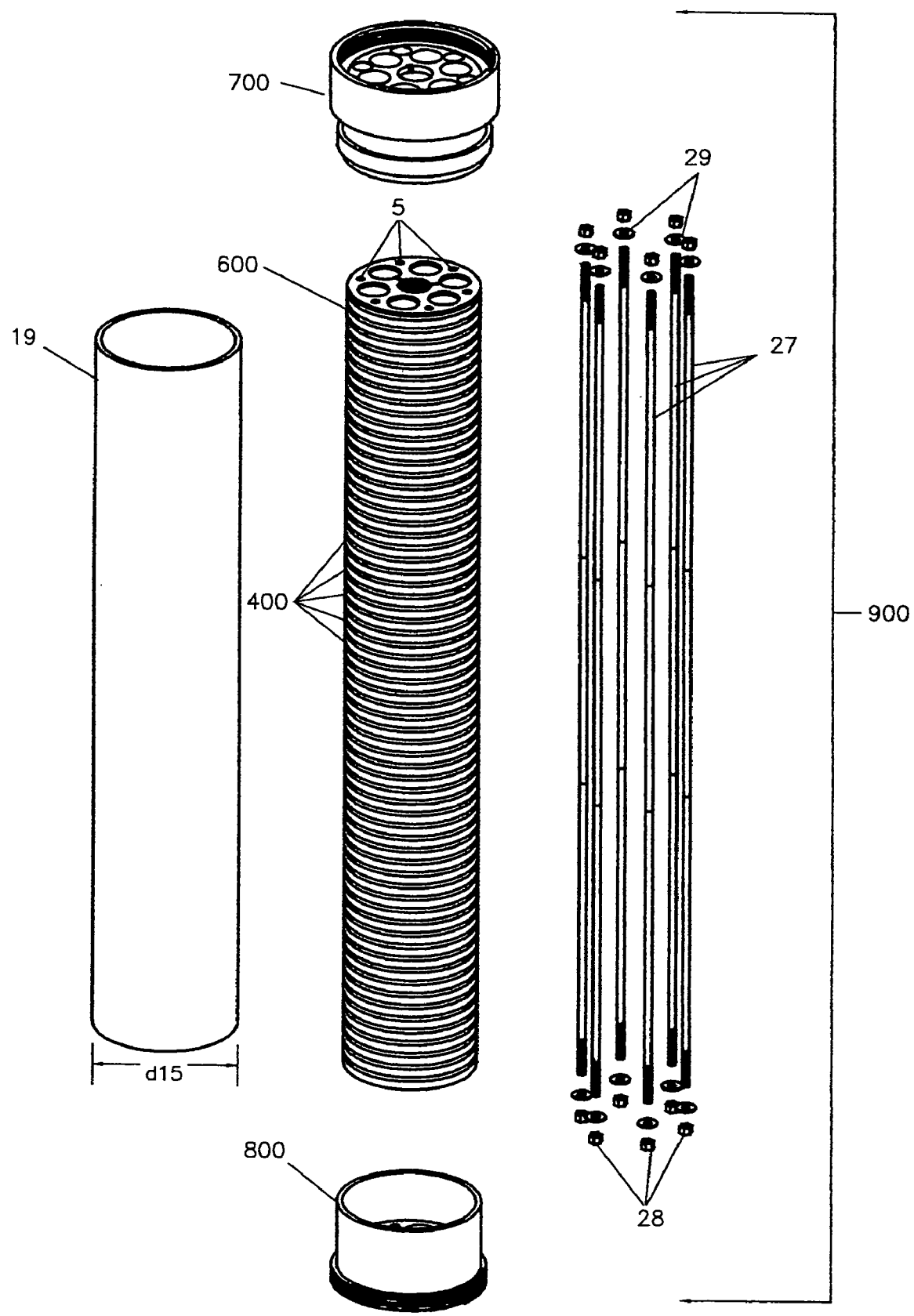
FIG. 10 is an exploded perspective view of a Geothermic Fuel Cell Module assembly.
Figure 10A:
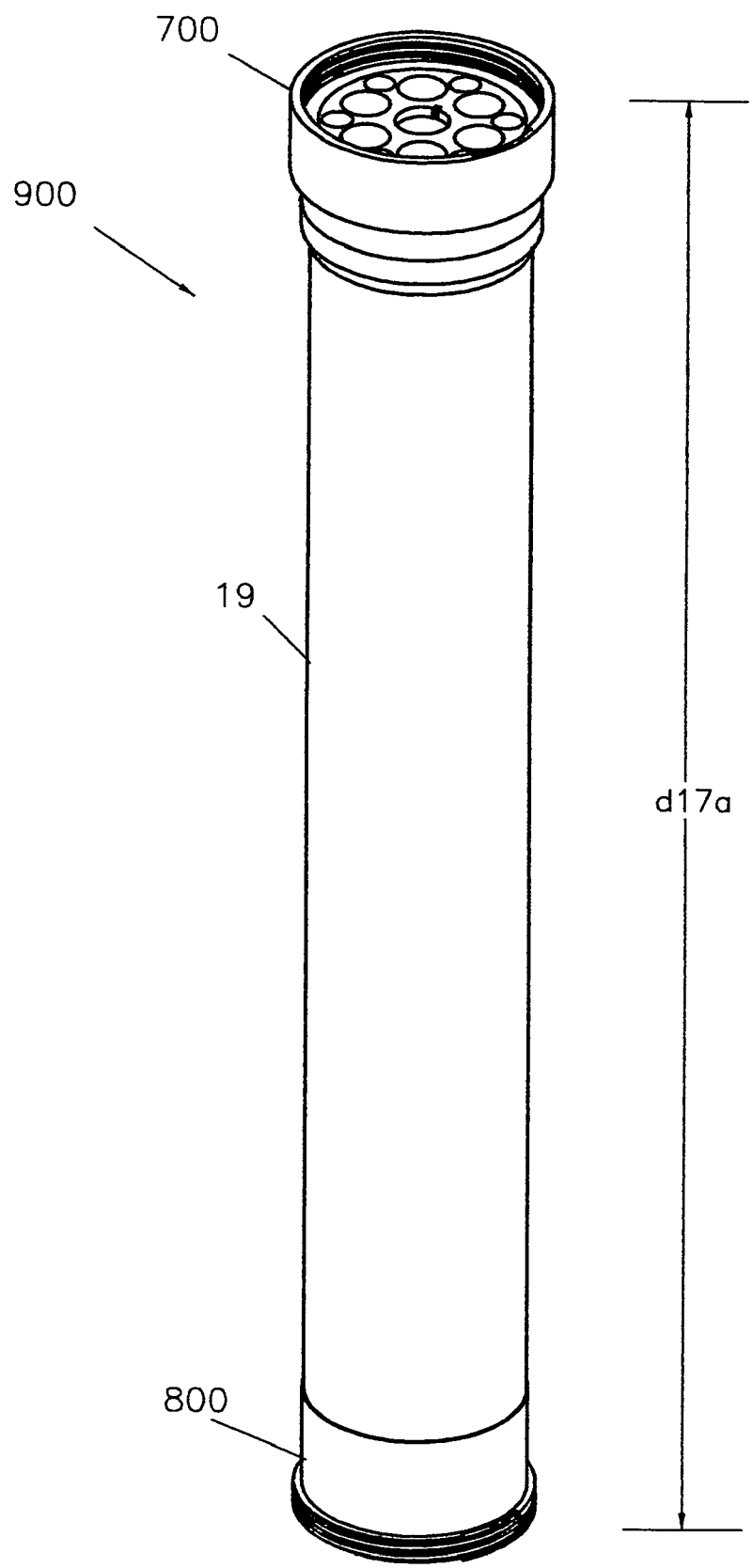
FIG. 10A is a perspective view of a Geothermic Fuel Cell Module.

FIGS. 10, 10A show a complete Geothermic Fuel Cell module 900. FIG. 10 is an exploded view of the module components. The fuel cell stack 600 comprises 200 too 250 individual fuel cells 400, and measures around five feet in height, $d_{17a} \approx 60$ in. A section of tubular casing 19 surrounds the fuel cell stack 600. The casing 19 is made of steel, ceramic, or other suitable material and may be lined with electrical insulation if necessary. The stack casing 19 serves a number of functions: first, it protects the stack 600 when the otherwise fragile assembly is lowered into the ground; second, it helps maintain sealing around the edges of the stack; third it helps maintain compressive force on the interconnect plates within the stack by restricting their ability to creep horizontally; and finally the casing 19 improves the module's physical rigidity and capacity to bear loads while being installed in the borehole. The casing 19 is of the same dimensions as the sections of casing on the female coupling and the male coupling, $d_{15}$=8 in. and wall thickness=0.25 in. The female coupling 700 and the male coupling 800 go at their respective ends of the stack 600. Oriented relative to a vertical borehole, the male coupling 800 points down, toward the bottom of the hole, and the female coupling 700 points up. There are six compression bolts 27 which are installed in holes 5 and pass through the couplings and the stack from end to end. The bolts 27 are insulated by a coating of suitable insulation or alternatively are inserted in sleeves 2701 (see FIGS. 10B & 10C) of ceramic or other suitably insulating material. The ends of the compression bolts, also referred to in the art as "tie rods", are threaded and receive nuts 28 and washers 29. The washers 29 are made of ceramic or other suitably insulating material. The nuts 28 are tightened on the bolts 27 until they are countersunk at least flush with the ends of the coupling plates 18 & 22. When assembling the modules, additional insulating material in the form of glass paste and/or ceramic sleeves may be put in place around the nuts and threads to further isolate them electrically from the stacks. The bolts 27 compress the components of the module together, creating gas-tight seals between the fuel cells 400 and binding the module into a single cohesive unit, the Geothermic Fuel Cell module 900.

In this configuration the GFC Module is suitable for heating ground formations which can absorb up to 750 BTU/ft./hr. from a hole approximately one foot in diameter. It is known in the art (see U.S. Pat. No. 4,886,118) that oil shale, for example can be heated at the rate of 785 BTU/ft./hr., (230 Watts/ft.). The exemplary GFC stack shown here will produce useful thermal energy at that rate when operated at the appropriate temperature, between 750 and 1000° C., for example.

Fuel cells of the preferred type, solid oxides, do not require the noble metal or other catalysts that other fuel cell types often require. However, solid oxide fuel cells will only operate at temperatures sufficiently high to render the electrolyte conductive to oxygen ions, typically 800° C. or higher. (see Larminie & Dicks, p. 164.) Therefore, it is necessary to pre-heat the GFC stack 600, prior to commencing operation of the fuel cells. In the preferred pre-heating method, the GFC stack 600 is brought up to operating temperature by pre-heating air (or other fluids) in a surface burner and communicating the resulting hot fluids to the stack 600 through the manifold sections 1500. The hot fluids are then circulated through the stack 600, raising its temperature. In an alternative method, the stack is pre-heated by means of running electrical current through the stack via the external electrical circuit (see FIG. 33). By increasing the strength of the electrical current, amperage, the resistance of the stack will cause the stack to heat. Once operating temperature has been achieved, the external flow of current will be terminated.

Once the stack has reached the desired temperature, between 750 and 1000° C., fuel is then supplied to the cell anodes via conduit 499. The fuel cells 400 in the stack 600 then operate in the manner well established in the art, producing electricity and heat. The electricity is a co-product which leaves the stack via electrical conduction through interconnect plates and conductive couplers and additional conductors (see FIGS. 16, 18 & 33). The heat is absorbed by the ground via solid-to-solid thermal conduction (see FIGS. 13, 26 and 28).

Figure 11:
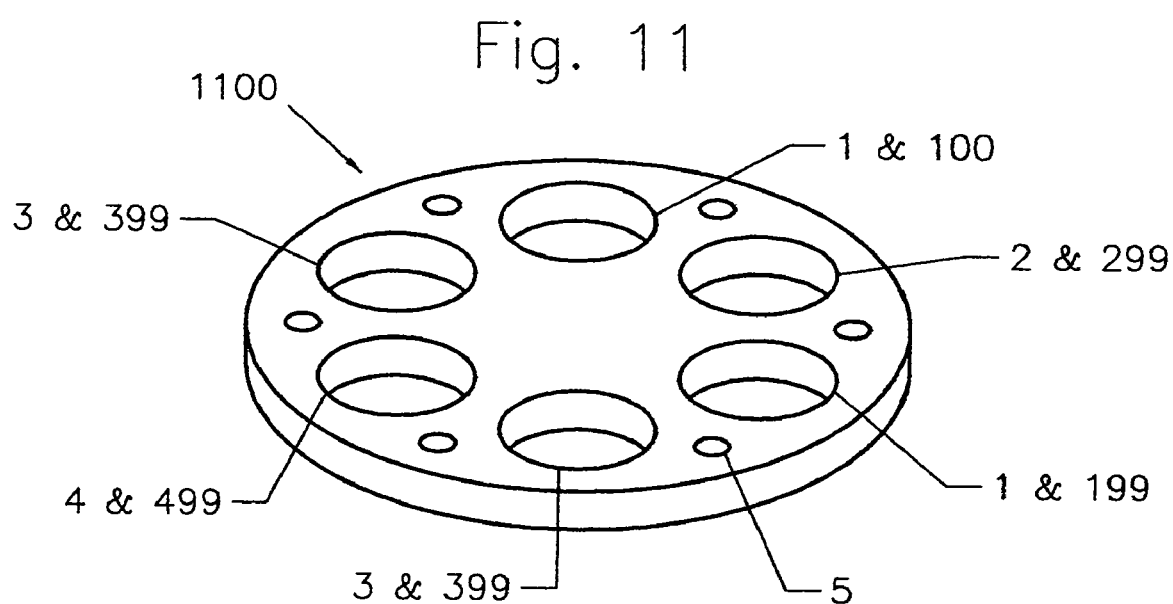
FIG. 11 is a perspective view of Geothermic Fuel Cell Spacer.
Figure 11A:
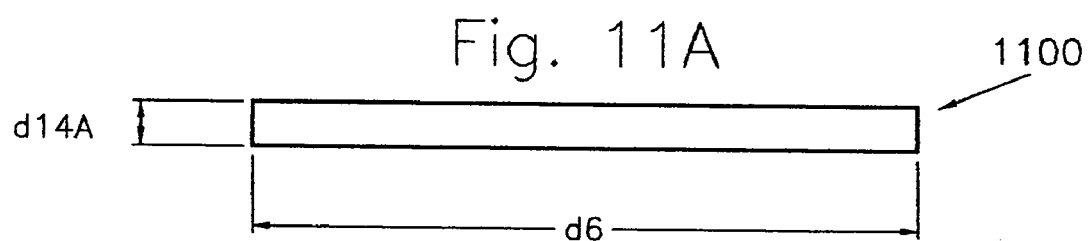
FIG. 11A is an elevation view of a Geothermic Fuel Cell Spacer.

FIGS. 11, 11A show a spacer plate 1100. The spacer plate is placed in the stack to replace one or more interconnect plates 1020. If the formation to be heated cannot absorb the amount of thermal energy produced by a nominal stack 600, then spacer plates, $d_{16} \approx 0.5$ in., can be introduced to the stack at the time of manufacture. The spacer plates have holes 1–5 in common with the interconnect plates 1020, but otherwise none of those features necessary to accommodate a fuel cell wafer 1000. In this respect the spacer plate is an inert component of the stack and serves to reduce the stack's power density, and accordingly its thermal output. The spacers allow GFC stacks to be specifically tailored to produce heat in quantities and in vertical profiles that closely match the characteristics of a given resource. For example, yields of oil by Fischer Assay vary considerably over thick horizons of oil shale. Oil shale at a depth of 1200 feet might assay at a yield of 40 gallons per ton, while oil shale at 1220 feet might only assay at 5 gallons per ton. With the spacers in the stack it will be possible to tailor the stack so that it produces more heat in richer zones while producing relatively little or no heat in barren zones. It may be feasible to directly correlate data on the resource from cuttings or rock cores obtained when boreholes (see FIG. 23) are drilled, with assembly of the fuel cell stacks 600 at the factory, thereby tailoring each stack to the specific depth of the particular borehole where it will be installed. Since the spacers and the fuel cells 400 are both standardized in their construction, and therefore can be mass produced at lower unit costs, this ability to tailor the stack by means of standard spacers allows GFCs to take advantage of economies of scale in cell production, while still producing tailored stacks.

GFCs are unique among fuel cells in that they are designed from the ceramic wafer 1000 outward, through the interconnect plates 1020 and their self contained exhaust circulatory conduits 199, 299, 399, 499 to the casing 19, to function as both electric generators and as heaters. The power densities of GFCs, for example, even without the addition of spacers 1100, as above, are typically very low as compared with the power densities of most fuel cell stacks described in the art. An exemplary GFC stack 600, as configured here for oil shale production, has a power density of somewhat less than 190 Watts/ft$^3$. Compared to fuel cells for mobile applications, which exhibit stack-only power densities of 5 to 15 kilo Watts/ft$^3$, it can be seen that GFCs are uniquely configured for other purposes—specifically heating the ground.

Figure 12:
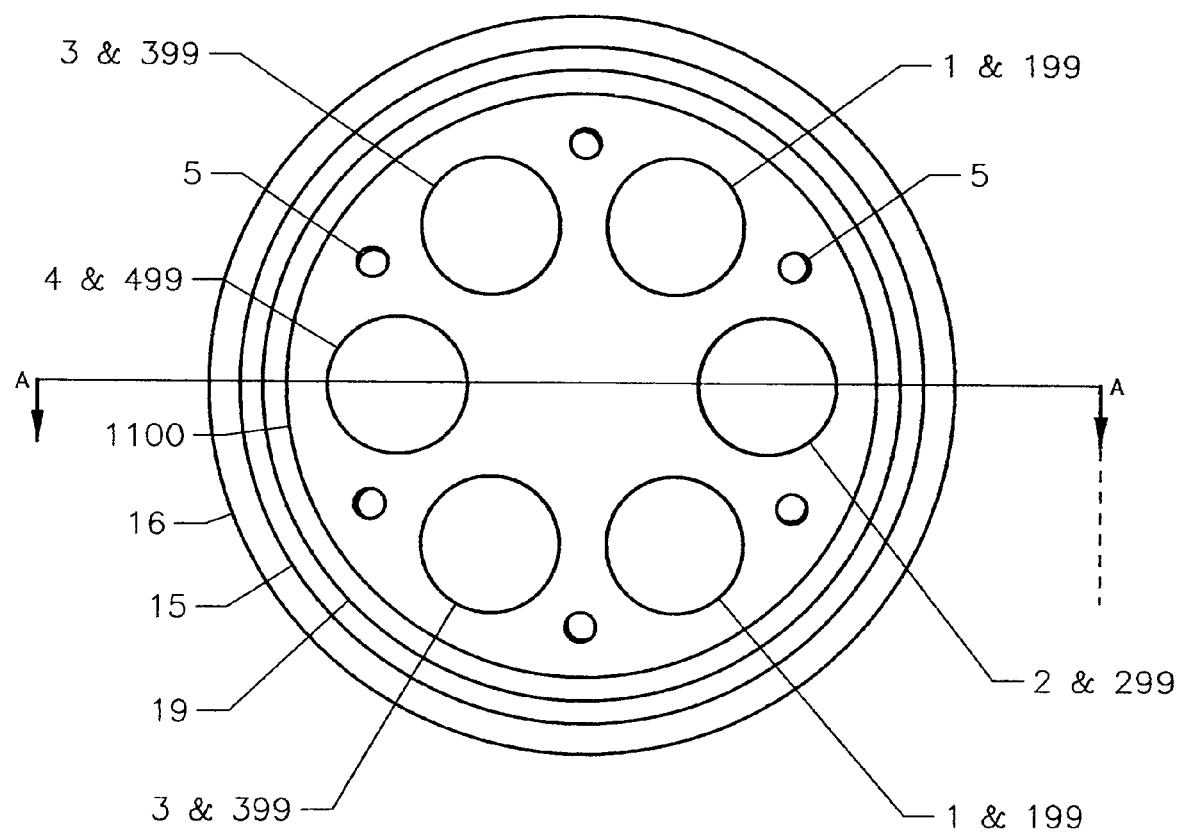
FIG. 12 is a plan view of two mated Geothermic Fuel Cell Modules.
Figure 12A:
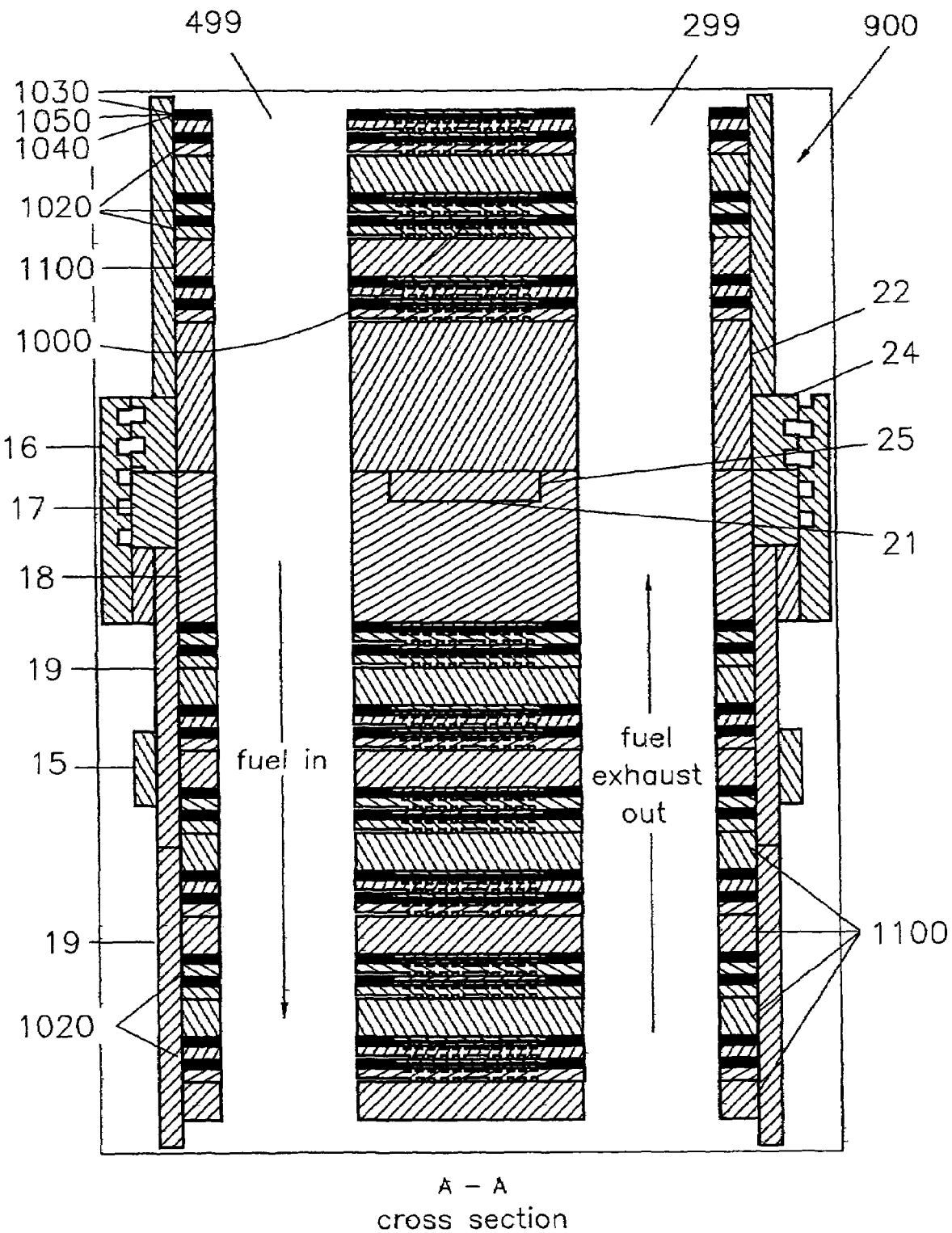
FIG. 12A is a cross-sectional view taken along line A—A of FIG. 12, of a section of two mated Geothermic Fuel Cell Modules.

FIGS. 12, 12A show an example of a section of GFC stack with spacer's 1100 integrated to tailor the stack's heat production to match the characteristics of the formation in which the stack is installed. FIG. 12A is a cross section of a portion of two assembled GFC Modules 900, coupled together by the female coupling 700 and the male coupling 800. The male conducting plug 25 fits in the female receptacle 21. The mating ring 16, which is kept on the female coupler 700 by the fixed retaining ring 15, screws onto the threads 24 of the male coupler 800 and when tightened pulls the two modules 900 together, forming a gas-tight seal between the modules so that gases can pass along the conduits 299 and 499. The casing 19 surrounds the fuel cell stack 600. The stack 600 is here comprised of fuel cells 400, composed of gaskets 1030, 1040, 1050; the ceramic wafers 1000; interconnect plates 1020; and spacers 1100. The proportion of spacers to fuel cells may be varied as desired to match the thermal characteristics of any given target resource formation.

FIGS. 13, 13A show a Geothermic Fuel Cell module (also called a "segment" 900 installed in a resource formation. FIG. 13A is a cross section showing the borehole 300 (see FIG. 23) lined with borehole casing 34, and containing the vertically oriented Geothermic Fuel Cell module 900. (Note that other orientations of GFC modules, including horizontal installations, are both feasible and contemplated.) The well casing 34 is of the type typically found in oil and natural gas wells. The casing here supports a borehole 300 nominally a foot or so in diameter, $d_{15A}=12$ inches. The borehole has been drilled through overlying barren rock formations, "overburden", (see FIG. 23). Typically the oil yielding and other formations of interest for treatment with Geothermic Fuel Cells 900 are between 100 and 1000 feet beneath the surface. Some overburden is desirable in order to prevent heat from reaching the surface. Resources under more than a 1000 feet of overburden may not be economical. The casing 19 of the modules 900 and the casing 34 of the borehole form between them an annular space AS. This space is filled with a suitable grout 35 possessing the desired properties of strength, thermal conductivity, and electrical insulation. A single Geothermic Fuel Cell module 900 is shown coupled to modules above and below it, partially shown. The male coupling 800 and female coupling 700 are threaded together to join the modules 900. Fuel passes into the fuel cell stack 600 through the fuel conduit 499, fuel exhaust passes out of the stack via conduit 299.

Electrochemical reactions of the fuel on the anodes of the fuel cell wafers 1000 liberate energy in the forms of free electrons and heat. These reactions are well known in the art. Energy in the form of electricity, flowing along the path of continuous conductivity established by the interconnect plates 1020 of the stack 600 and the coupling hardware 700 and 800 creates a useful current (see FIG. 33) that is utilized in some economically beneficial manner, e.g., sold onto the power grid, used on site for some industrial purpose, or sent to electrical resistance heaters which may be used to further heat the ground. The heat produced by the fuel cells 400 is absorbed by the ground, thereby increasing in temperature. Solid-to-solid thermal conduction provides a path for heat migration into the ground. Thermal energy produced at the anodes 10 heats the interconnect plates 1020 which heat the module casing 19 which heats the conductive grout 35 which then heats the well casing 34. The hot well casing 34 heats the ground. As heat flows from the stack 600 to the ground the temperature of the stack and the surrounding shale or sand or other formation comes into equilibrium with the stack. Since the stack operates at a temperature of between 750 and 1000° C., the temperature of the resource formation immediately adjacent to the wellbore casing 34, is also raised to that temperature. As heat continues to be produced in the fuel cells, a heated zone expands around the borehole. The maximum temperature of the resource is of course the same as the temperature of the fuel cell stack 600, which is to say 750 to 1000° C. This isotherm of maximum heat, "heat front", moves slowly into the formation at rates determined by the thermal conductivity and specific heat of the ground, and other factors. Ground heating by solid conduction, a process referred to here as "geothermics", is known in the art. Particular rates of formation heating are dependent on a number of factors but an example calculated from field testing data is given in U.S. Pat. No. 4,886,118, FIG. 8: Heaters, 10 feet apart, operated at 230 Watts/ft. (785 BTU/hr./ft.) moved the 300° isotherm ("heat front") 10 feet in three months.

Figure 14:
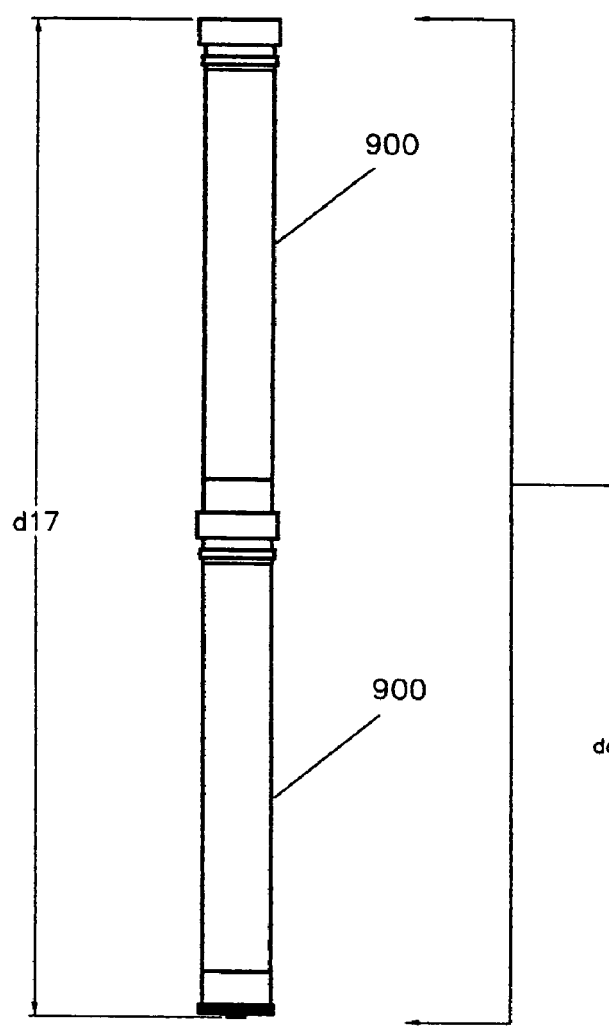
FIG. 14 is an elevation view of a two-module stick of mated Geothermic Fuel Cell Modules.
Figure 14A:
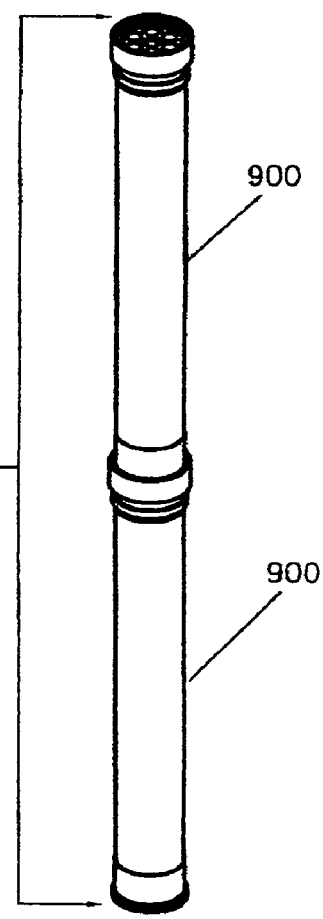
FIG. 14A is a perspective view of a two-module stick of mated Geothermic Fuel Cell Modules.

FIGS. 14, 14A show two Geothermic Fuel Cell modules 900 joined together, $d_{17} \approx 10$ ft. Multiple joined modules constitute a "stick" of modules 2000. A "stick" of pipe, in drilling parlance, is a number of sections of drill stem preassembled and put in the rack of a drilling rig. Normally sticks on most drill rigs are around 60' in length. It is contemplated that 30' is around the optimum length for sticks of geothermic fuel cells due to their heavier weight compared to normal drilling pipe. Such a 30 foot stick would be constituted of six modules (see FIG. 14B). It is anticipated that 30 foot sticks will be preassembled in the factory and then will be sealed and shipped to the field where they will be mated with other sticks and installed into boreholes. The object being to automate assembly to the greatest extent possible and to make installation feasible with conventional oil and gas drilling equipment. In the field, it is anticipated that sticks will be joined together, forming "strings" 9000 (see FIG. 14C) of modules up to 500–1000 feet in length. A 500 foot string would comprise 16 preassembled sticks made up of 100 modules 900. Such an installation would generate about 100 kilowatts of electric power and would have a useful thermal output on the order of 375,000 BTU/hr.

Figure 14B:
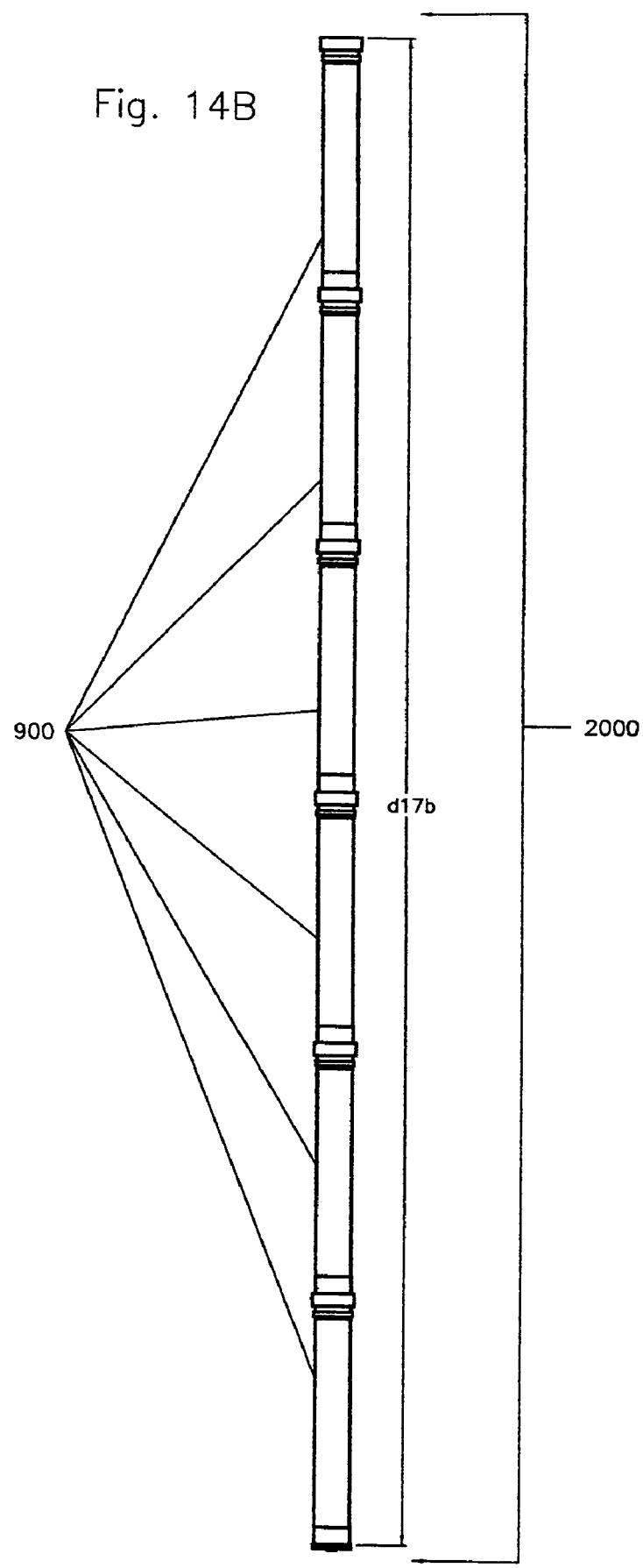
FIG. 14B is an elevation view of a six-module stick of mated Geothermic Fuel Cell Modules.

FIG. 14B shows an elevation view of six GFC modules 900 assembled into one pre-fabricated "stick" 2000, $d_{17b} \approx 30$ ft.

Figure 14C:
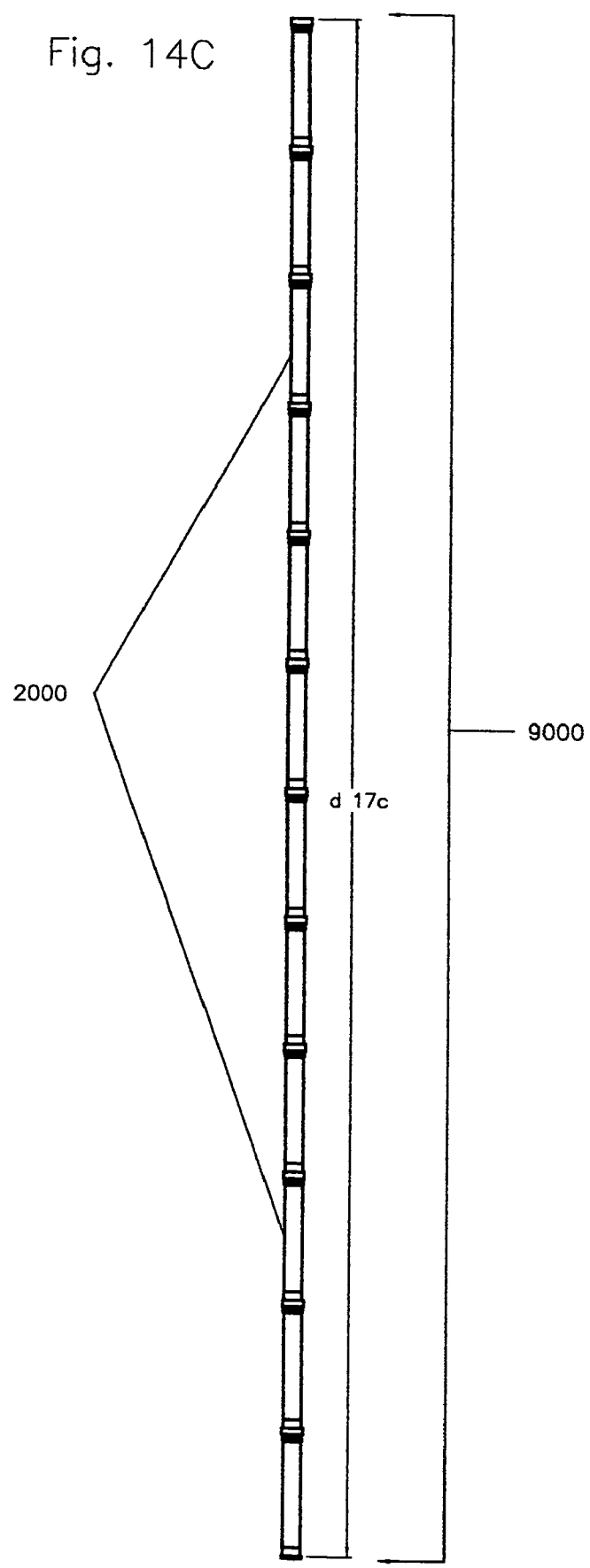
FIG. 14C is an elevation view of a two-stick string of GFC Modules.

FIG. 14C shows an elevation view of two six-module sticks 2000 joined to create a 12 module "string" 9000, $d_{17c} 60$ ft. Strings of GFC modules can be scaled up to lengths as great as 1000 feet by adding additional sticks.

Figure 15:
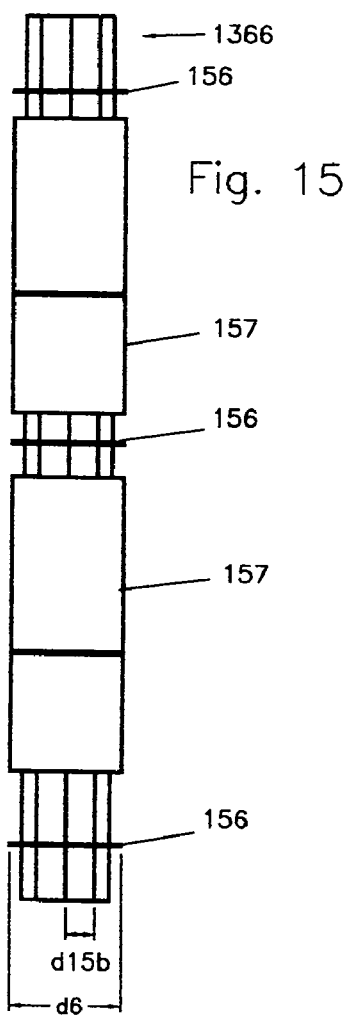
FIG. 15 is an elevation view of the internal components of the heat-exchange manifold.
Figure 15A:
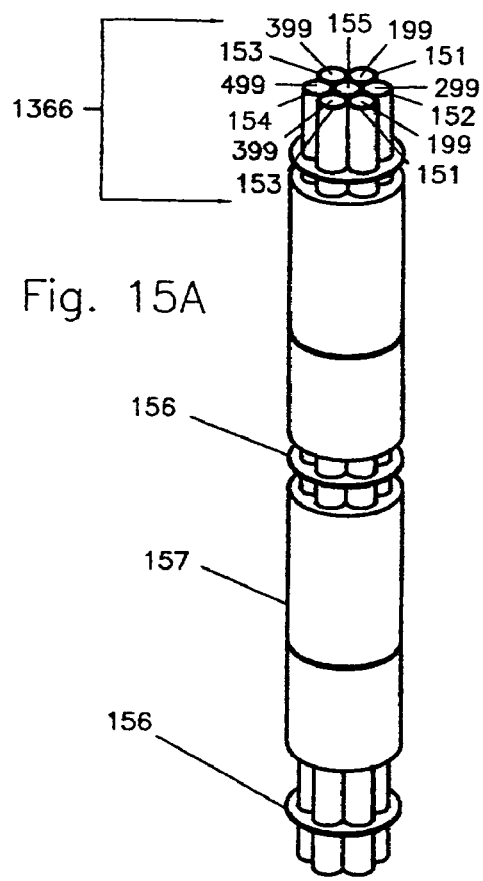
FIG. 15A is a perspective view of the internal components of the heat-exchange manifold.
Figure 15B:
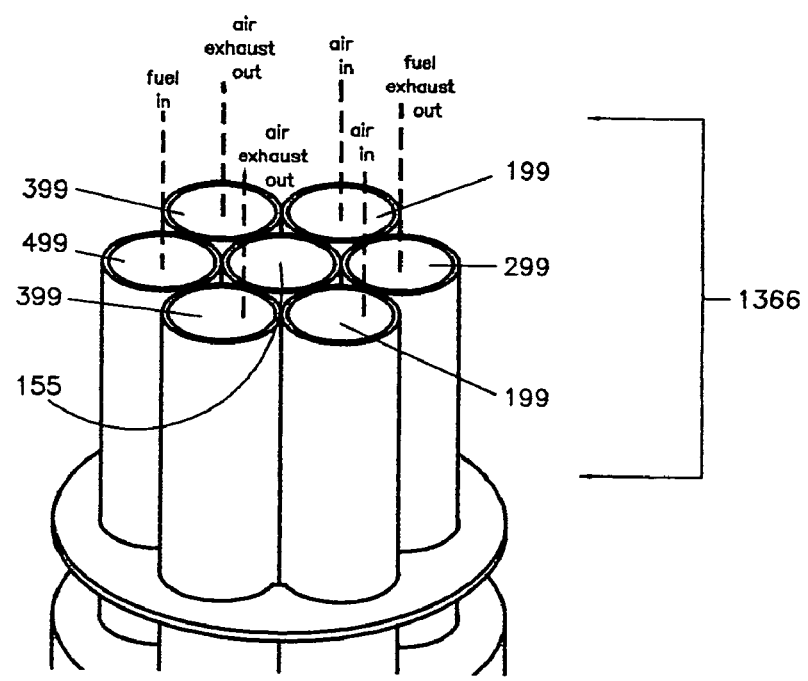
FIG. 15B is an enlarged perspective view of the conduit bundle at one end of the heat exchange manifold.
Figure 19:
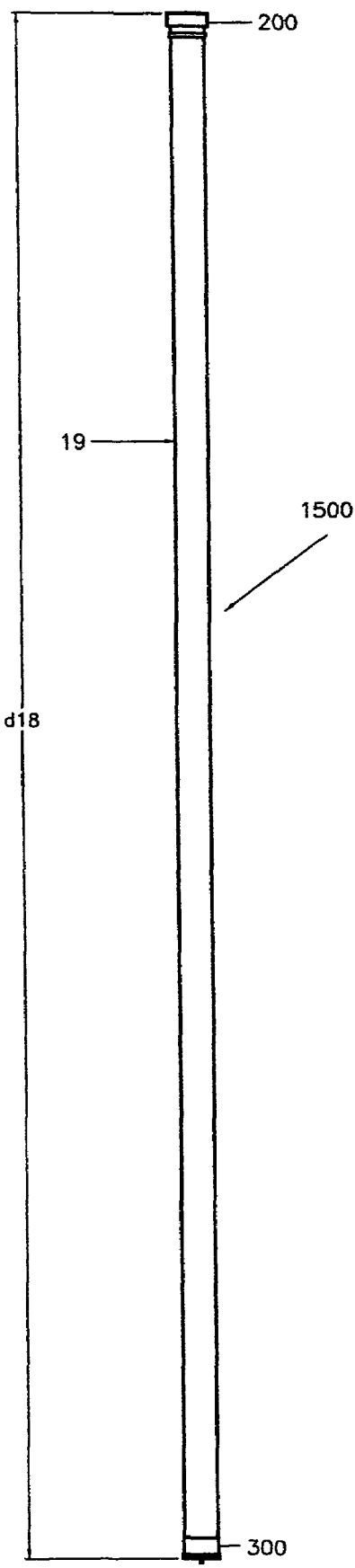
FIG. 19 is an elevation view of one heat-exchange manifold module.

FIGS. 15, 15A, 15B show internal components of the manifold, also referred to as the "heat exchanger", or the "heat exchange section" 1500 (see FIG. 19). The manifold, is composed of a number of conduits, which form passages for the movement of fluids between the fuel cell stack 600 and the planetary surface. In the preferred embodiment, depicted here without any casing 19, the conduits comprise a bundle of tubes 1366. Here, these tubes are shown as 151 through 154, forming continuations of the conduits 199, 299, 399, and 499, running through the fuel cell stacks 600. In addition to these gas flow conduits, there is an additional conduit 155 in the manifold which serves as a passage for an insulated electrical line 160 (see FIG. 16).

The primary function of the manifold is to provide communication between the down-hole fuel cell stack 600 and the surface, and in the preferred embodiment, the manifold also functions as a heat-exchanger. The tubes 151–155 are made of steel, copper, or some other suitable heat conducting material. The tubes are nominally 2 in. in diameter, $d_{15b} = 2$ in. The tubes are in physical contact, thereby facilitating heat exchange between the gases traveling in the various tubes. The tubes are positioned and held in place by round brackets 156 that are installed at regular intervals along the length of the manifold. The counter-flow of these gases in alternating tubes (FIG. 15B) facilitates the exchange of heat between them so that outgoing gasses are cooled and incoming gasses are warmed as they pass through the heat exchange section. The heat exchanger tubes 151–155 and the conduits in the fuel cell stacks 199, 299, 399, & 499 are so arranged that there is an alternate flow of cool and hot gases in each adjacent conduit. For example, air from the surface flows through conduits 199, which are on either side of conduit 299 through which flows the hot fuel exhaust from the anode. In the heat exchanger, these conduit tubes are in physical contact, and residual heat from the fuel exhaust, on its way out, warms the air on its way in. A similar arrangement prevails between the air exhaust conduits 399 and the fuel conduit 499. Depending on the resource, the heat exchange section (FIG. 19, 1500) may be from 100 to 1000 feet in length. It is anticipated that in shallow formations, or due to other process constraints, it may be necessary to pass the hot exhaust gases through additional heat exchangers located on the surface. Thermal insulation 157 is installed around the cluster of tubes 1366 to prevent heat loss to the ground in the heat-exchange section. The heat exchanger 1500 makes it possible to minimize loss of thermal energy from the target formation through the exhaust streams. Heat that would otherwise leave the ground with exiting air and fuel exhaust is returned to the formation. This increases the process' thermal efficiency. See FIG. 24 to view the relative installation of the heat exchanger 1500 above the string 9000 of fuel cell modules.

Figure 31:
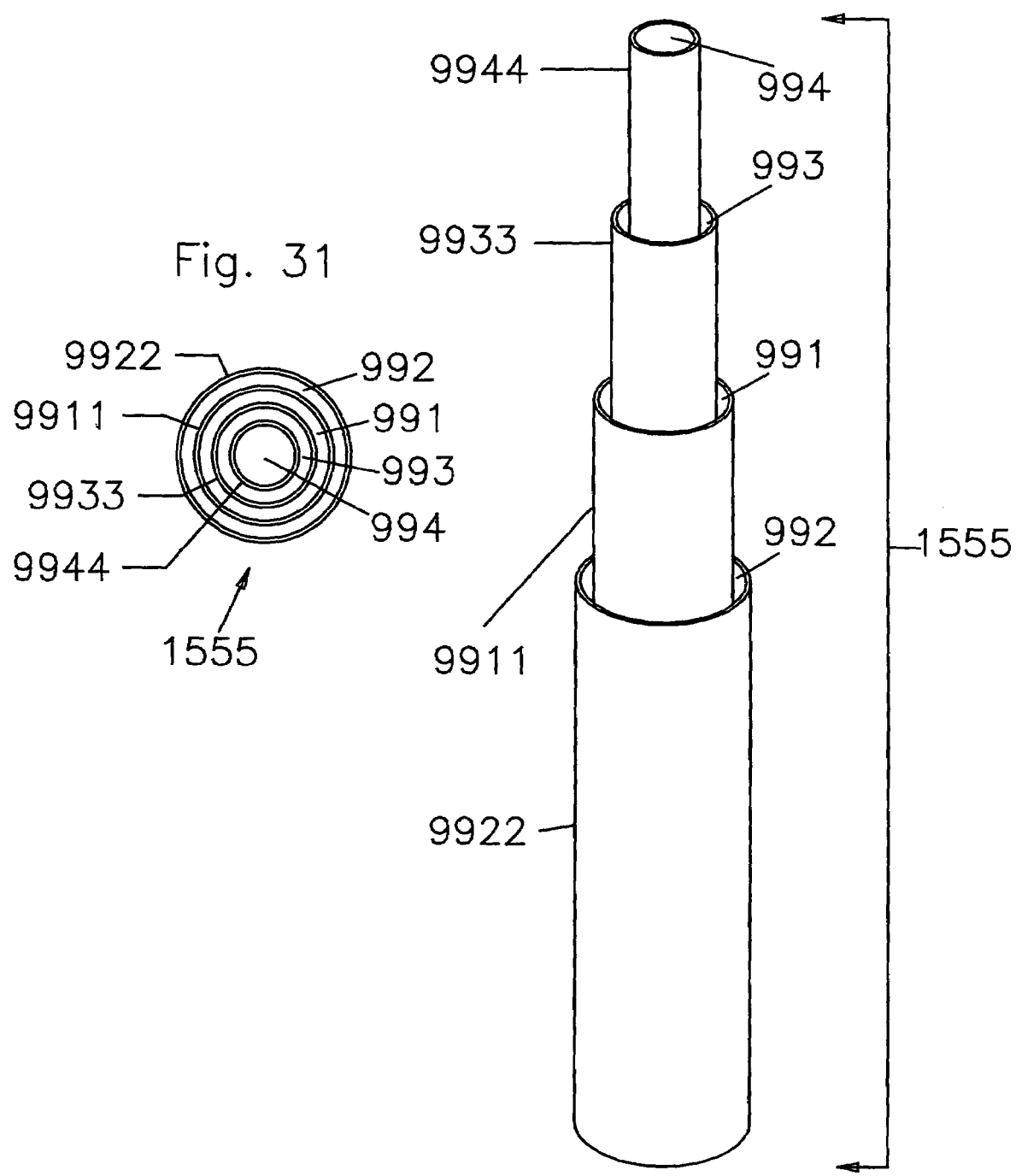
FIG. 31 is a plan view of an alternative embodiment of the manifold.

Alternative configurations of the manifold are anticipated, both with and without heat exchange functions. One such alternative is depicted in FIGS. 31 and 31A.

FIGS. 16, 16A, 16B show exploded views of the manifold/heat exchanger assembly 1500. In the center of the middle tube 155 is an electrical conductor 160 and electrical insulation 161. The conductor, which is made of copper, aluminum, or other suitable conductive material, provides the path for the outgoing leg of the cells' electrical circuit (see FIG. 33). The conductor 160 is of sufficient cross section to accommodate the flow of electrical current leaving the fuel cells 400. Surrounding the conductor conduit 155 is a bundle of gas conduits, 151, 152, 153, and 154 carrying air, fuel, and exhaust into and out of the fuel cell stack. Surrounding the bundle of tubes 1366 is a layer of thermal insulation 157. Circular brackets 156 maintain alignment and positioning of the tubes and hold the insulation in place. The entire heat exchanger assembly 1500 is contained within a tubular casing 19.

Figure 17:
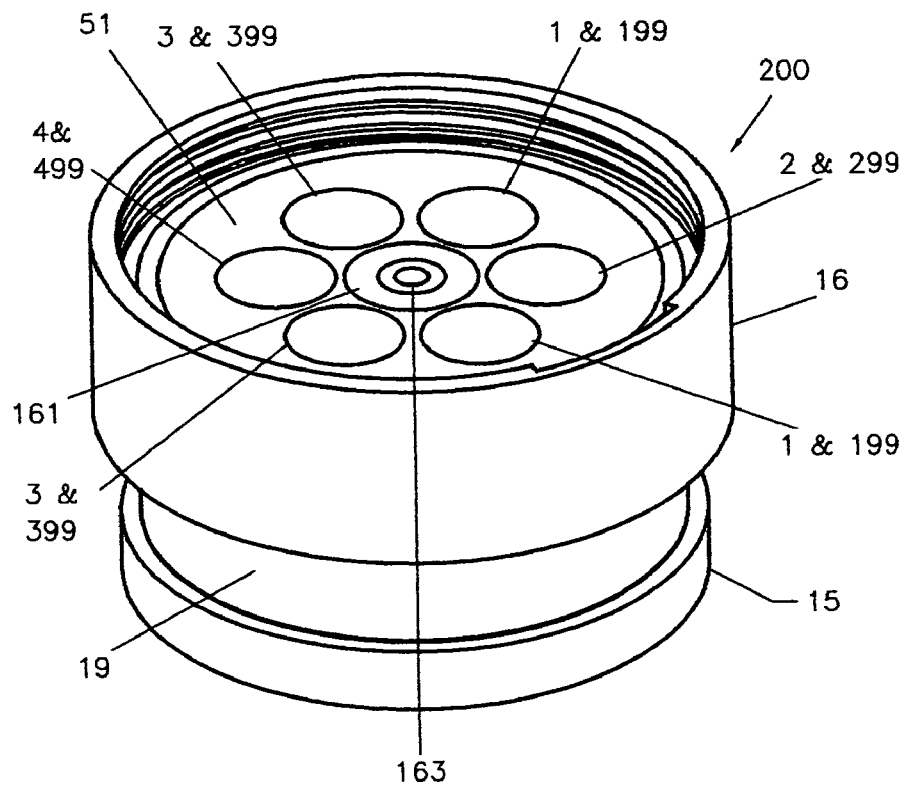
FIG. 17 is a perspective view of the female heat-exchange manifold coupling.
Figure 18:
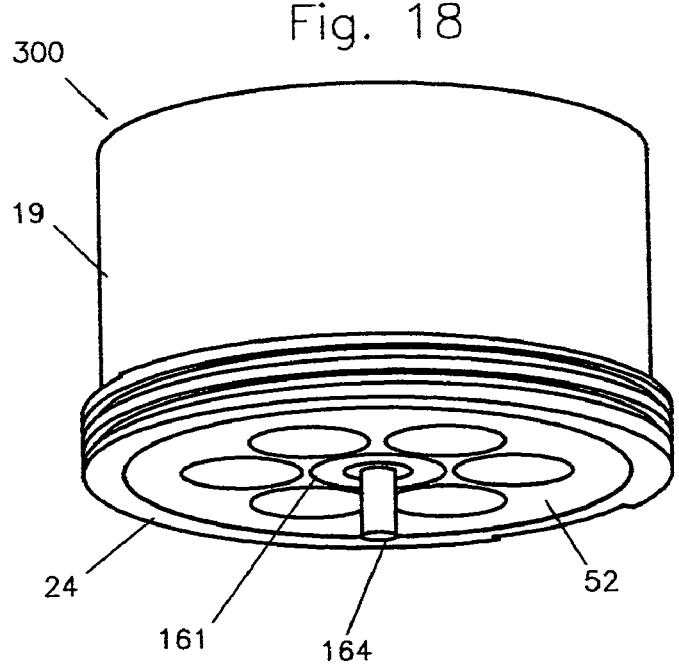
FIG. 18 is a perspective view of the male heat-exchange manifold coupling.

FIG. 17 shows the female coupling 200 for the heat exchanger. The female coupling includes a manifold plate 51 that has holes 1–4 in common with the fuel cell interconnect plates 1020, forming continuations of the air, gas, and exhaust conduits 199, 299, 399 and 499. Like the female fuel cell module coupling 700, the female heat exchange coupling 200 has a threaded mating collar 16. As on the fuel cell modules, the collar 16 turns freely and matches the threads 24 on the male heat exchange coupling (FIG. 18, 300). The male and female couplings are threaded together and tightened to provide a gas tight seal between heat exchanger sections 1500. The center of the manifold plate 51 is filled by a ring of electrical insulation 161 and a conductive receptacle 163. The receptacle 163 is sized to accept the conductive plug 164 on the end of the male coupling 300 (FIG. 18). When mated, the receptacle 163 and plug 164 provide an electrical connection between heat exchanger sections 1500 (FIG. 19). The female coupling is plugged onto an extension of the heat exchanger conductor 160 which fits into the lower half of the receptacle 163. The under side of the manifold plate 51 butts against the conduit tubes 151, 152, 153, and 154 (FIG. 15), and the whole coupling is welded to the heat exchanger casing 19.

FIG. 18 shows the male heat exchanger coupling 300. The male coupling 300 is threaded 24 to accommodate the mating collar 16 on the female coupling. The male coupling has a conductive plug 164 which fits into the corresponding receptacle 163 on the female coupling. On the underside of the plug 164 is a receptacle 163 that accommodates an extension of the conductor rod 161. The male coupling is plugged onto the conductor rod, and the casing 19 welded in place in the same manner as the female coupling.

FIG. 19, shows a complete manifold/heat exchanger assembly 1500 with mating collars 200, 300 in place, forming a ready to install heat exchanger section. Heat exchanger assemblies 1500 can be constructed in sections up to 60 feet long (30 foot section, $d_{18}$=30 ft., shown) and then will be joined together into strings and installed in the bore holes (see FIG. 24).

Figure 20B:
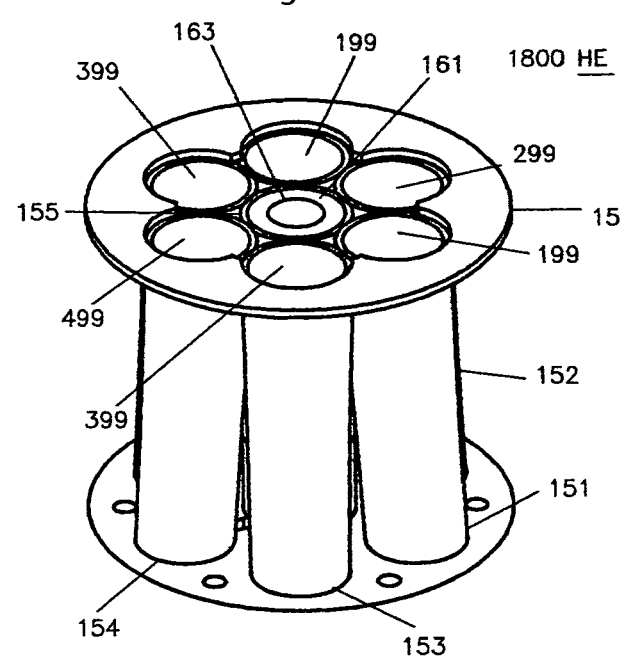
FIG. 20B is a perspective view of the internal components of the heat-exchange manifold end of the heat-exchange manifold to fuel cell stack transition manifold.
Figure 20C:
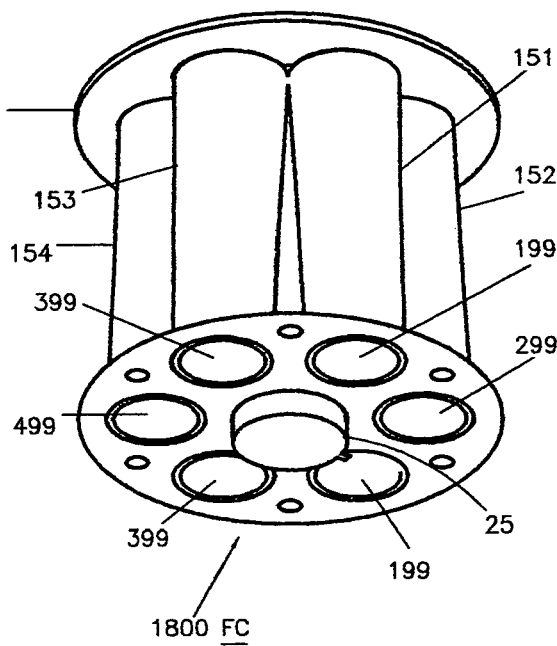
FIG. 20C is a perspective view of the internal components of the fuel cell stack end of the heat-exchange manifold to fuel cell stack transition manifold.
Figure 24:
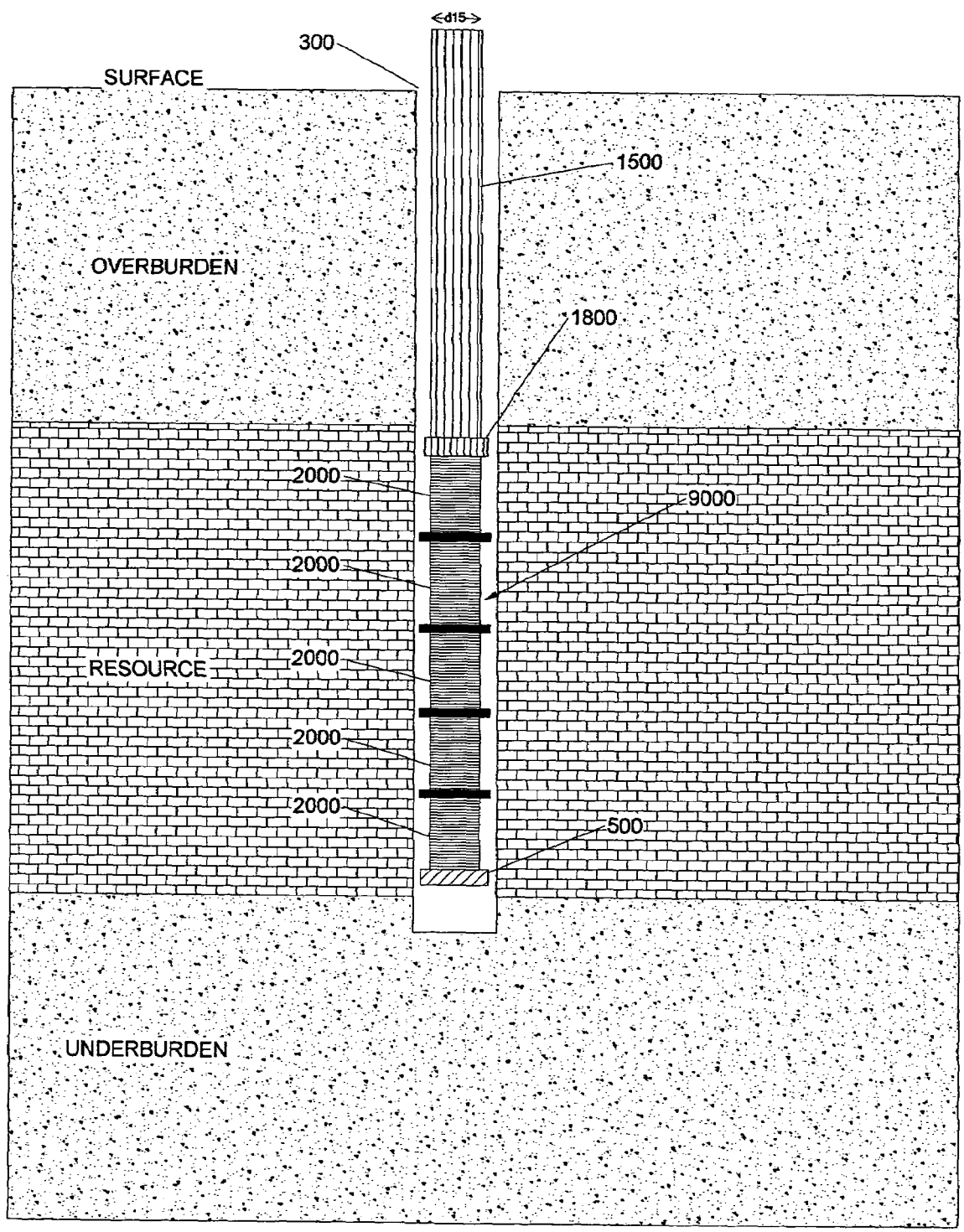
FIG. 24 is a cross sectional view of a borehole with a schematic representation of a Geothermic Fuel Cell installation.

FIGS. 20, 20A show the mating manifold section 1800, which mates the uppermost fuel cell stack module 900 to the lowest heat exchanger section 1500 as shown in FIG. 24. FIG. 20 shows the heat exchanger side HE of the mating manifold 1800HE. FIG. 18A shows the fuel cell side FC. The fuel cell side FC of the transition manifold 1800 FC is fitted with a conductive male plug 25 which is inserted in the corresponding receptacle 21 on the upper most female fuel cell module coupling 700 (FIG. 8). Tubes, 151–154 form continuations of the air, fuel and exhaust conduits 199, 299, 399, and 499 from the fuel cell stack 600. This allows the flow of gases unimpeded from the uppermost fuel cell stack 600 into the lowest heat exchanger section 1500 and vice versa. Note that the tubes in the manifold section converge (see FIGS. 20B & 20C) until they cluster together around the electric conductor conduit 155. This arrangement allows the tubes to make the transition from their dispersed configuration in the fuel cells stacks 900 to their clustered configuration in the heat exchanger section. Clustering the tubes facilitates heat transfer between the counter-flowing gases in the heat exchanger and also increases the amount of volume available for insulation 157 (see FIGS. 15 & 16), which minimizes heat loss to the overburden. Positioning of the tubes is maintained with circular brackets 156. A mating collar 16 screws onto the threads 24 on male coupling 300 at the bottom of the first heat exchange section 1500. An extension of the electrical conductor 160 plugs into a female receptacle 163 in the mating manifold. This provides an electrical connection between the fuel cell stacks 600 and the heat exchange section 1500.

FIGS. 20B & 20C show the heat exchanger transition manifold without casing 19 or couplers 200 & 300. With the casing removed it is possible to see the convergance of the conduits 151–154 as they pass from the fuel cell side of the manifold 1800 FC to the heat exchanger side 1800 HE.

FIGS. 21, 21A show the current return cable/bottom plug assembly 500. This assembly is installed at the lower, male, end of the first GFC module 900 that is emplaced. The bottom plug 500 has plate 55 that has no holes. The plug assembly 500 is screwed onto the first GFC module forming a gas-tight seal to the lower end of the fuel cell stack 600. Plate 55 is thick enough to accommodate a countersunk receptacle 21 which receives the corresponding male plug 25 on the male module coupling 800 (FIG. 9). An insulated conductor 57 is bonded to the bottom of plate 55 (FIG. 21A). The conductor 57 is fitted with a threaded mating collar 56 that is so arranged as to turn freely. There are cut-outs 58 in the bottom assembly casing 19 to accommodate connection of an electrical cable 60 (FIG. 22) to the conductor by means of the mating collar 56.

FIGS. 22, 22A show the electrical current return cable 60. In order for a fuel cell stack to operate, it is necessary to create an electric circuit along which the current may travel (see FIG. 33). Therefore, there must be an electrical connection to the bottom of the fuel cell stack. This is effectuated by an insulated current return cable 60. The current return cable 60 is attached to the bottom of the stack by means of a threaded plug 59. The plug screws into the mating collar 56 (shown unplugged here for clarity) to form an electrical connection between the cable 60 and the fuel cell module 900. As modules are installed in the borehole, the cable 60 is wound around the module casing 19. The cable 60 can, if necessary, be sheathed inside a flexible armored conduit which can then be spot welded to the exterior of the module casing or attached by other means.

Figure 23:
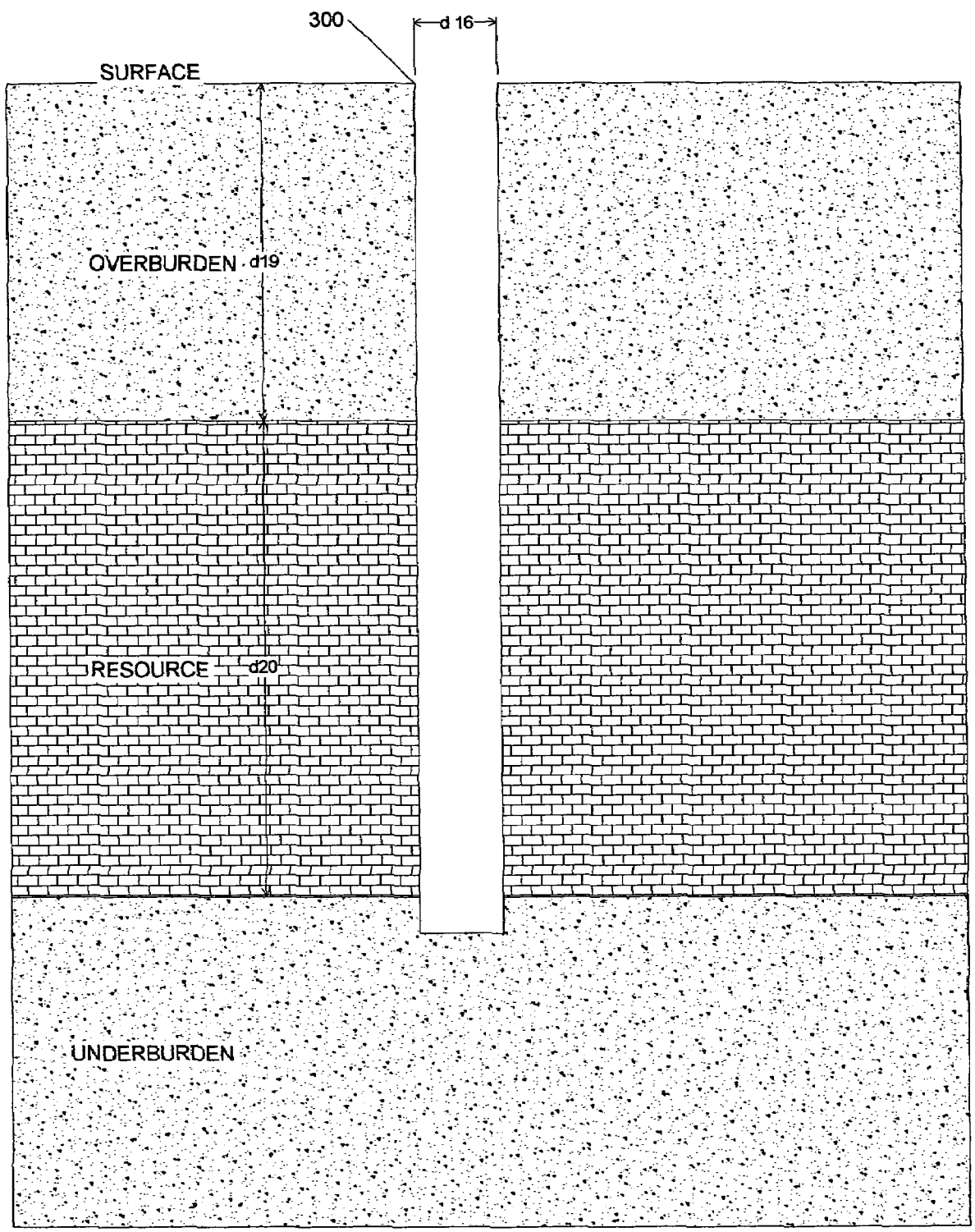
FIG. 23 is a cross sectional view of a borehole drilled into a resource formation.

FIG. 23 shows a cross section of the earth with a borehole 300, roughly a foot or so in diameter, $d_{16}$=12 in. The "Resource" layer contains oil/gas or other volatiles to be extracted. Resources as thin as five or ten feet $D_{20}$≈5–1000 feet can be heated with GFC modules, and heating resource beds up to 500 to 1000 feet thick is anticipated. Below the resource layer is the "Underburden", and above this layer is the "Overburden" $D_{19}$≈100–1000 feet. The borehole 300 starts at the "Planetary Surface" and usually continues somewhat into the Underburden layer.

FIG. 24 shows the fuel cell string 9000 installed in the borehole 300, and positioned so that the stack terminates somewhat above the bottom of the Resource layer that is to be heated. The manifold/heat exchanger 1500 passes through the Overburden layer. The heat exchanger section 1500 is joined to the fuel cell string 9000 by the transition manifold 1800. The fuel cell string 9000 is terminated by the current return bottom plug 500.

Figure 25:
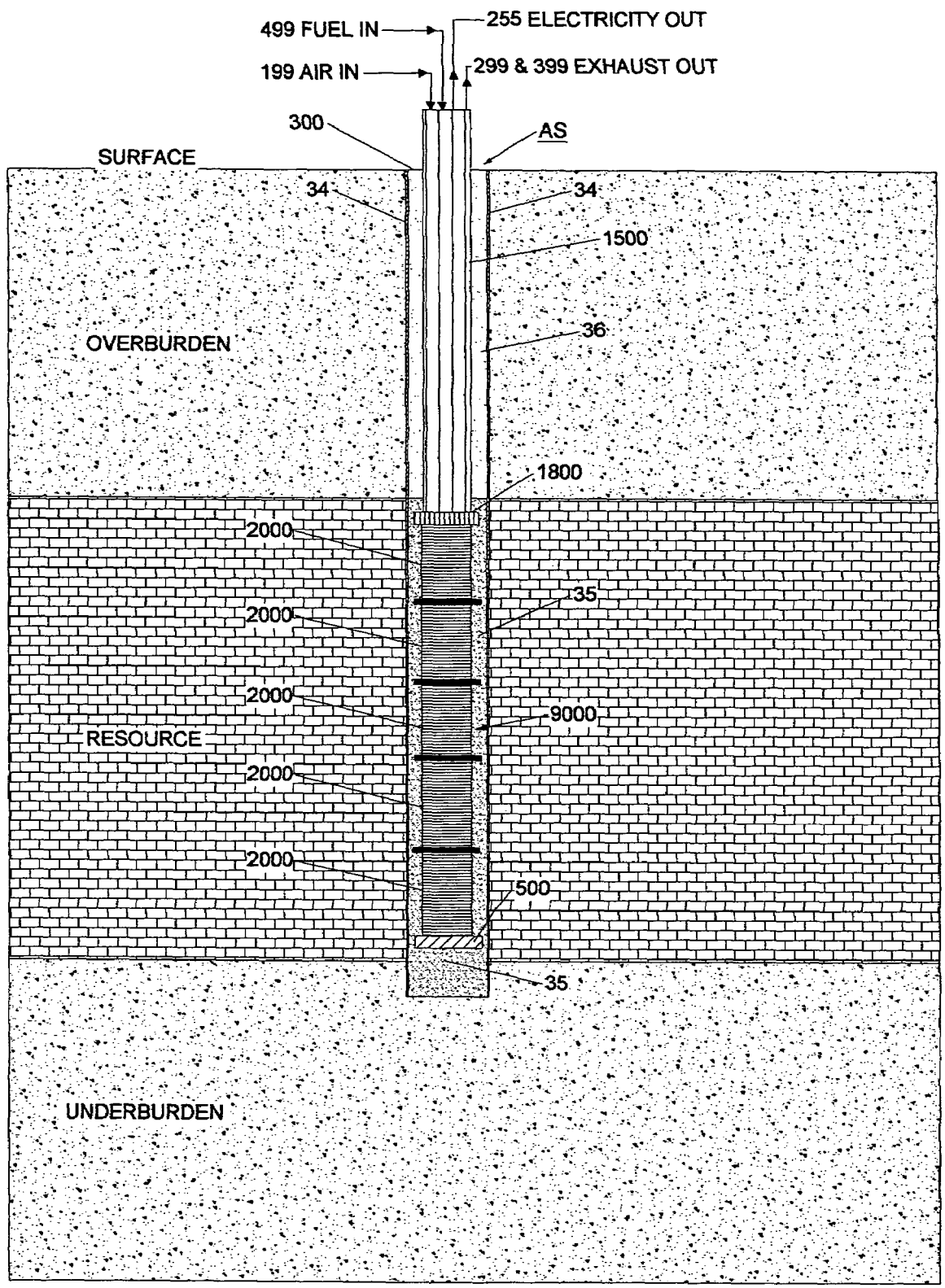
FIG. 25 is a cross sectional view of a borehole with a schematic representation of the Geothermic Fuel Cell process.

FIG. 25 shows the casing 34 lining the inside of the borehole 300 and supporting the hole. The annular space AS between the fuel cell string 9000 and the borehole casing 34 in the Resource section is filled with grout (cement) 35 specifically formulated for thermal conductivity and electrically insulating properties (see FIG. 33). In the Overburden section a thermally insulating grout 36 surrounds the heat exchanger 1500 and acts to conserve heat energy. Schematically shown is fuel in 499, air in 199, exhaust out 299 & 399 and electricity out 255.

Figure 26:
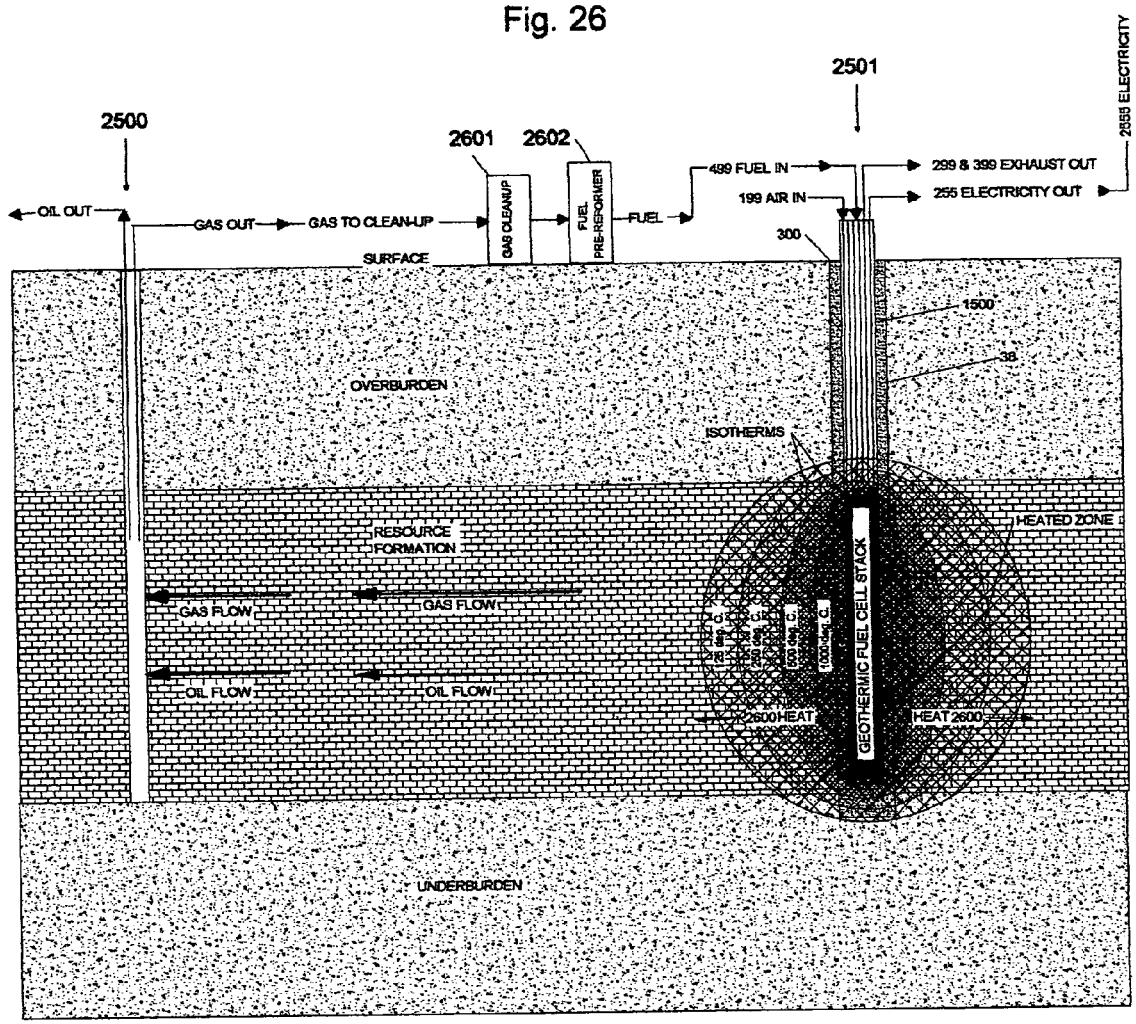
FIG. 26 is a cross sectional view of a borehole and production well with a schematic representation of the Geothermic Fuel Cell process loop.

FIG. 26 shows the geothermic fuel cell (GFC) stack operated on a feed of gaseous fuel produced from the resource formation. As the GFC strings 9000 operate, they produce electricity 2555 and heat 2600. The strings 9000 are configured and operated to produce useful heat at the same rate the formation can absorb it. Heat from the stack is absorbed by the Resource formation, and migrates through the formation at a rate determined by the Resource's thermal conductivity and other factors. As the temperature of the Resource rises, noncondensible gases are evolved and hydrocarbons are liquefied. Rising temperature leads to order of magnitude decreases in viscosity of hydrocarbon liquids. Gasification, liquifaction, and thermal expansion all serve to pressurize the Resource formation. Rising pressure forces the gaseous and liquid products to move away from the heated zones. In non-porous resources like oil shale, pressures are sufficient to create a network of horizontal fractures. According to U.S. Pat. No. 4,886,118 these fractures, or the natural porosity of the formation, allow the establishment of communication between the heated borehole 2501 and a nearby Production Well 2500. Gas and oil are driven into the Production Well 2500 where they are removed to the Surface. On the Surface, the oil is collected for sale, and the gas is cleaned and conditioned and then fed under pressure down the stack to the fuel cells where its energy is released as heat and electricity. Once communication has been established between the Heater Well 2501 and surrounding Production Wells 2500, and sufficient gas has begun to flow to power the fuel cell stack, no further input of outside fuel may be required to operate the process.

Figure 27:
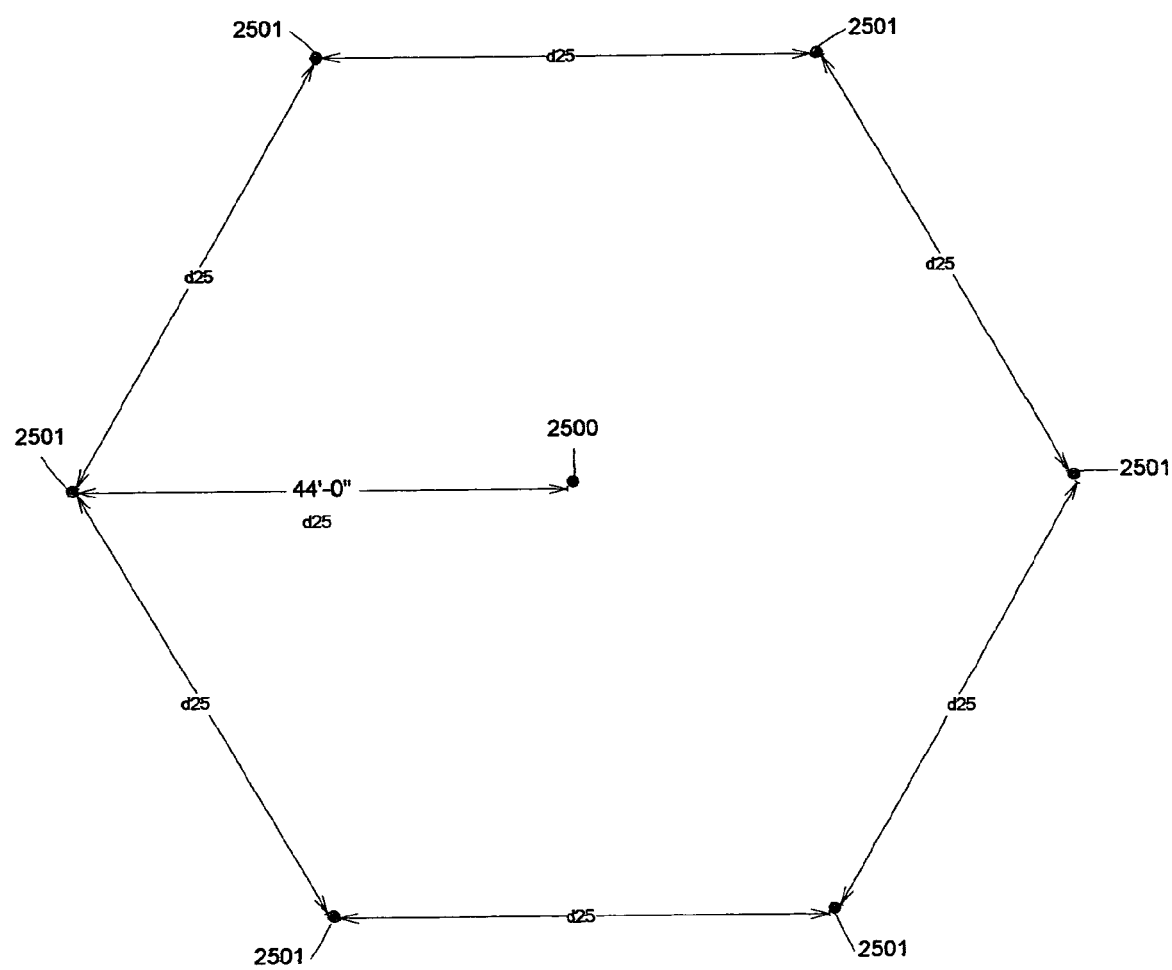
FIG. 27 is a plan view of the layout of GFC heater wells surrounding a production well.

FIG. 27 shows the arrangement of six heater wells 2501, surrounding a single production well 2500. It is known in the art that solid conduction heating of the ground may be accomplished with heaters emplaced 30 to 100 feet from the production wells (see U.S. Pat. No. 4,886,118). Actual spacing of GFC heaters is dependant on the formation being developed and other factors, like the properties of a target hydrocarbon being produced. The embodiment of the invention depicted here shows placement of the heater wells 2501 on 45 foot spacing (45' center to center, 44' casing to casing) $d_{25}=44'$. The wells are a foot in diameter and contain a multiplicity of GFC modules, or "segments" 900, and a number of heat-exchange sections or "manifolds" 1500 spanning the overburden (see FIG. 24). A variety of spacing patterns for the heater wells is known in the art, (see U.S. Pat. No. 2,914,309, FIGS. 1–3) including rectangular, triangular, and hexagonal arrays. The embodiment illustrated here is the hexagonal pattern wherein each well is equidistant from the others. At the 45-foot spacing illustrated here, each production well 2500 would serve an area of 5260 square feet, for a field density of approximately 8.3 producing wells to the acre. If there were only one well 2500 under production, there would be six heater wells 2501 and the ratio of heater wells to producer wells 2500 would be six to one. However, in fields with multiple production wells drilled on this hexagonal grid pattern, the ratio of heater wells to production wells falls as the number of wells increases. The heater to producer ratio approaches 2 to 1 in large fields with more than a thousand production wells.

Figure 28:
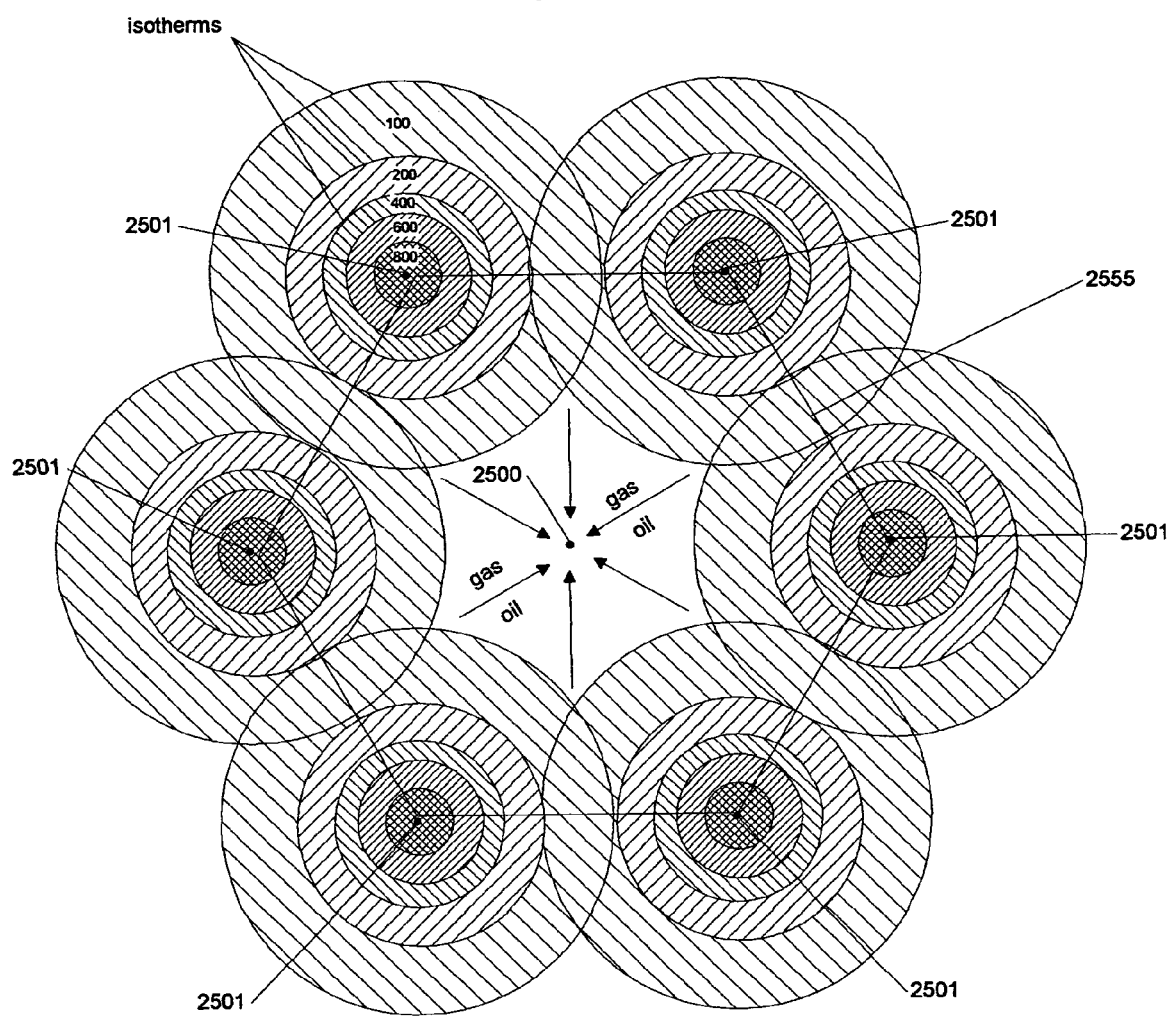
FIG. 28 is a plan view of a GFC production field with six heater wells operating.

FIG. 28 shows the situation after the geothermic fuel cell stacks in the heater wells 2501 have been operated for a period of time. Concentric zones of progressively higher temperature surround each of the heater wells 2501. The zone closest to the heater well has increased in temperature to match the operating temperature of the fuel cell modules, 750–1000° C. From that zone outward, the temperature of the formation falls rapidly with radial distance from the heater well. Here the 100° C. isotherm is shown to have progressed more than half the distance to the next well.

The actual rates at which heat will move through a given formation are influenced by a number of complex and interactive variables, including: the formation's thermal conductivity and heat capacity, the influence of migrating fluids carrying heat and undergoing phase transitions, potential endothermic reactions of various minerals, and a number of other factors. However, a general idea of the time necessary to sufficiently heat a block of resource is known in the art to be around 10 years for heaters like the GFCs embodied here, on 45 foot spacing in an oil shale formation (see U.S. Pat. No. 4,886,118, Pg. 20, ¶ 2). This figure can be reality tested by looking at the raw energy required to heat one such resource block. If we take the resource as oil shale and the thickness as 500 feet, the total mass of the block served by a single production well 2500 will be roughly 350 million pounds. The specific heat of oil shale varies with grade and other factors but can be taken on average as around 0.3 BTU/lb./° F. Raising the temperature of the block by an average 525° F., will require on the order of 55.6 billion BTU. Thermal input to the formation from the GFC heaters will be 750 BTU/ft/hr. One third of the heat from each heater well 2501 is conducted into the resource block, the other two thirds going to heat other blocks. Therefore, each block receives an energy input equivalent to the heat output of two heater wells. Heat input to the block by two 500-foot long GFC heaters will be 750,000 BTU/hr. To add the needed 55 billion BTU of heat to the block at this rate will take around eight and a half years. So we see good agreement between what is taught in the art and what can be deduced as mathematically feasible.

It is well known in the art that heating of underground hydrocarbon formations like oil shales, tar sands, shut-in oil fields, diatomites, etc. has several beneficial effects which lead to increased production of oil and gas from those formations. Heating the hydrocarbons above certain thermal thresholds, 275–350° C. for oil shale, will cause those hydrocarbons to liquefy and or volatilize. This causes both a dramatic decrease in the hydrocarbon's viscosity and an increase in pressure in the formation. According to U.S. Pat. No. 4,886,118, sufficient pressure is created in oil shale formations to create horizontal fractures through the formation that establish communication between the heating wells and the production well. The volatized gases and reduced viscosity oils are driven under pressure away from the heater wells 2501 and toward the production wells 2500. There the products are removed to the surface. On the surface the oil is shipped to market and some or all of the gas stream is utilized to fuel the GFC heaters. (See FIG. 26)

Figure 29:
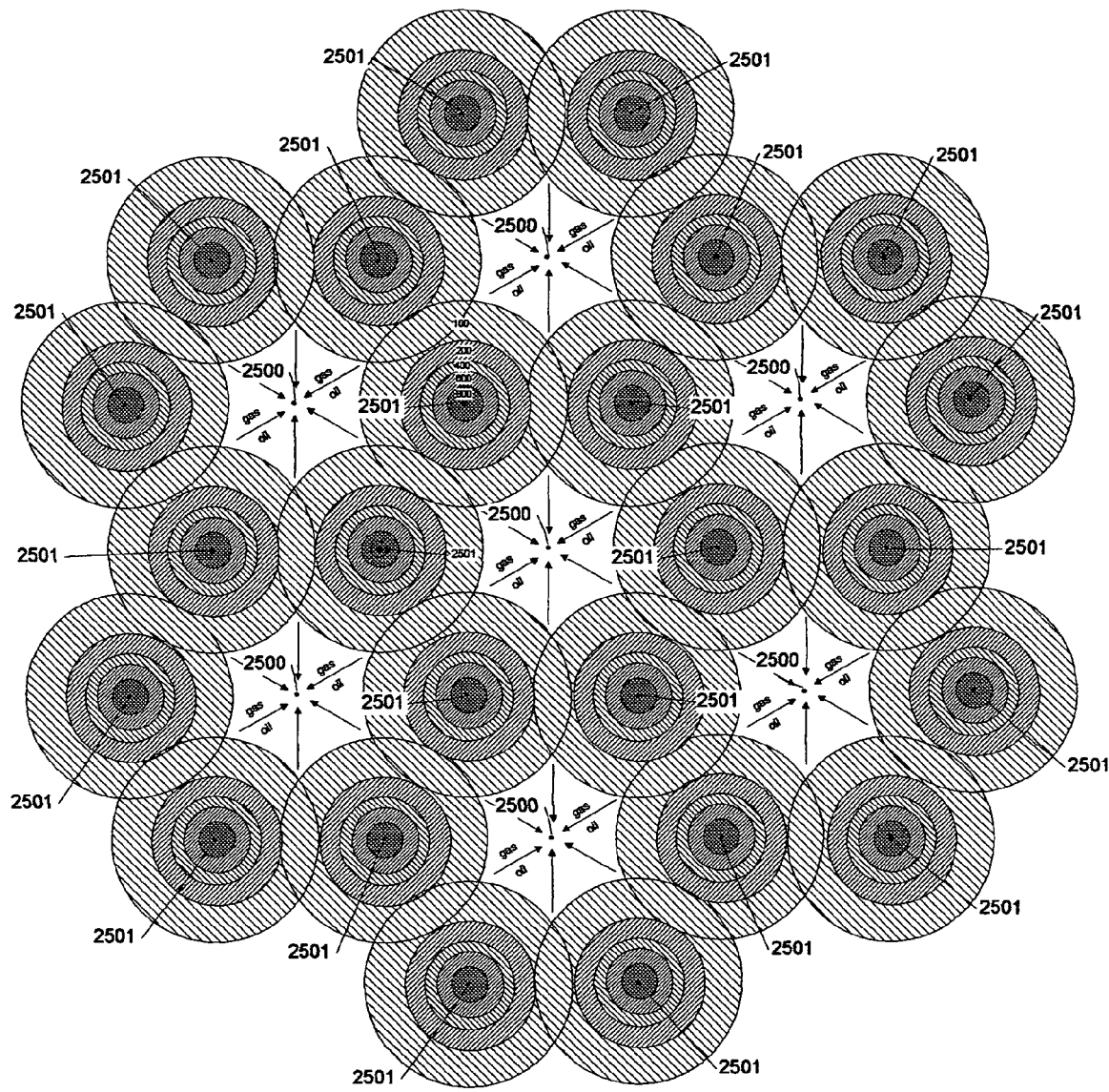
FIG. 29 is a plan view of a GFC production field with 24 heater wells operating.

FIG. 29 shows an array of heater wells 2501 heating a formation, and oil and gas being driven into collector wells 2500. In large fields, the proportion of heat lost to the periphery can be relatively small and can be further reduced if the field is expanded concentrically from the center out.

Figure 30:
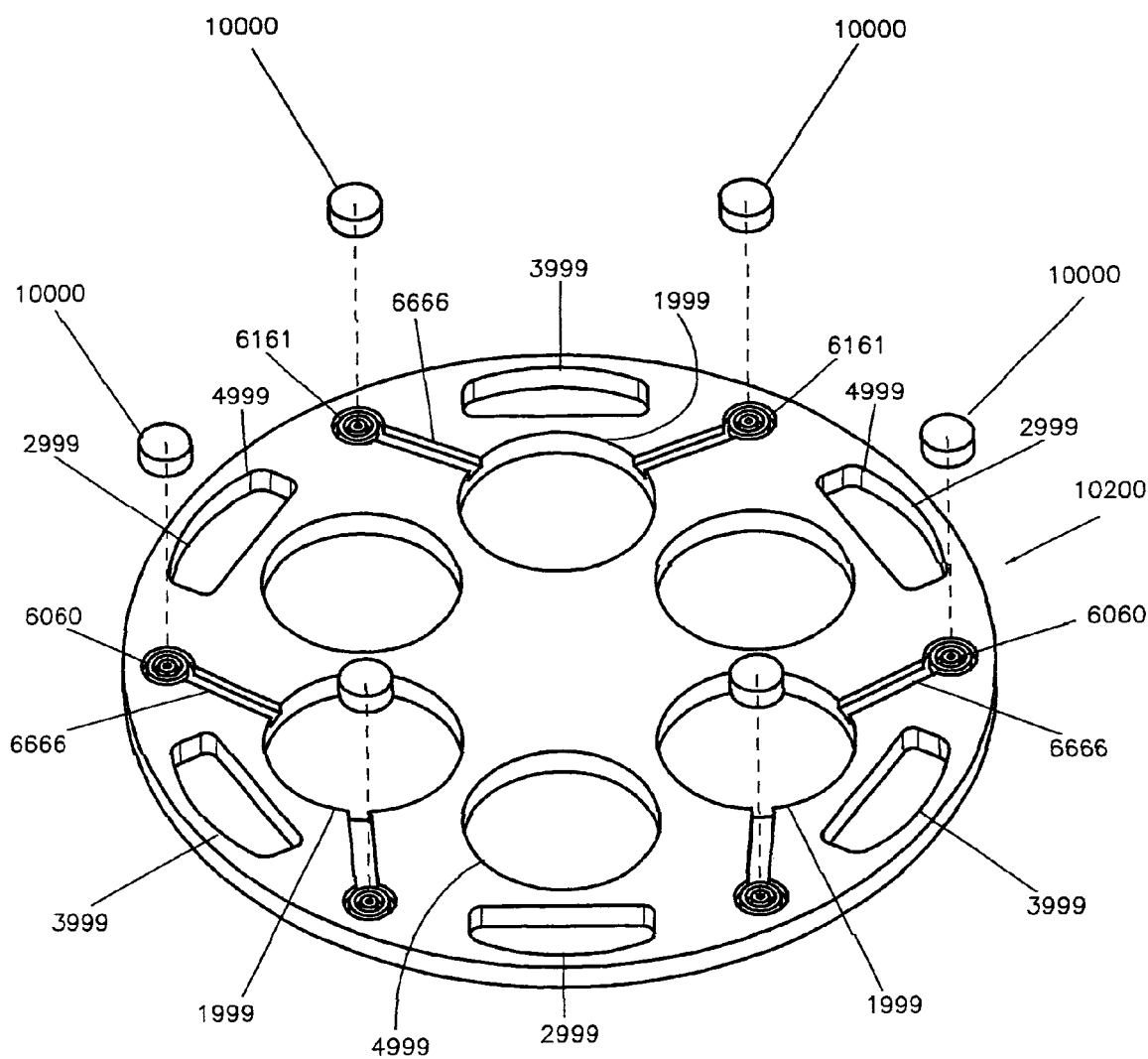
FIG. 30 is a perspective view of an alternative embodiment of the GFC interconnect plate.

FIG. 30 shows an exploded perspective view of an alternative embodiment of the interconnect plate. This alternative plate 10200 is exemplary of the many alternative configurations of the present invention that are contemplated, including: multiple conduits of various shapes, sizes, and configurations; multiple ceramic wafers of various sizes and shapes in various configurations; and other potential configurations which accomplish the same function of heating resource formations with the heat generated from fuel cells. It may be advantageous, for example, to arrange the components of the fuel cells so the heat producing ceramics and the hot exhaust gases are located as closely as possible to the periphery of the cell. This would give the heat produced by the cells a more direct route of conduction into the resource formation. Accordingly the ceramic wafer 1000 of the preferred embodiment (see FIG. 1) has been fragmented into multiple wafers 10000, each of which sits at a separate location around the perimeter of the plate 10200, in contact with the networks of ridges 6161. In aggregate, the multiple wafers might only produce the same amount of electricity and heat and use the same amount of fuel as the single wafer 1000, but multiple wafers 10000 so arranged might have advantages, for example making the heat distribution around the heaters more uniform. The same advantage may be gained by positioning multiple exhaust conduits—3999 for oxidant exhaust and 2999 for fuel exhaust—around the periphery of the plate 10200. Fuel passes through conduits 4999 and oxidant through conduits 1999. These conduits, 1999, 2999, 3999, and 4999 are formed by stacking plates 10200 and aligning holes 1111, 2222, 3333, and 4444, in the same manner as in the preferred embodiment. The Figure shows the cathode side of the plate 10200 which includes multiple passages 6666, and 6060 for the movement of air (or other oxidant) from the conduit 1999 to the ceramics 10000 and out to the exhaust conduit 3999. Note that no bolt holes (5 in the preferred embodiment, see FIG. 2A) are shown in plate 10200. This is because many alternative methods of achieving suitable seals between plates in the fuel cell stacks are contemplated, including: welding, brazing, various adhesives, clamping, threading and other methods.

FIGS. 31 & 31A show one alternative embodiment of the manifold 1555, of the many various embodiments contemplated. The conduits of the manifold 9922, 9911, 9933, and 9944 in this embodiment, and similar embodiments, are arranged concentrically. This arrangement may be desirable in order to increase the heat exchange efficiency of the manifold. This arrangement of conduits increases the surface area along which direct heat exchange can take place. Each of the several process fluids travels in one of the conduits. In the embodiment shown, hot fuel exhaust from the anode will pass through the annular space 992, created between conduits 9922 and 9911. This would have the advantage of moving the hottest gases adjacent to the outermost surface of the manifold, where their thermal energy can be most readily conducted into the resource formation. The next inner annular space 991, formed by conduits 9911 and 9933, will carry the oxidant—usually air. The last annular space 993 will carry exhaust oxidant from the cathodes. This hot exhaust will serve to pre-warm the incoming air traveling through annular space 991, and the fuel traveling through the cylindrical space 994 formed by conduit 9944. Other potential arrangements of the conduits in the manifold are possible and contemplated. For example, a greater multiplicity of concentric conduits might be employed, and/or the conduits might be subdivided into additional conduits by the addition of partitions in longitudinal or other orientations, etc.

Figure 32:
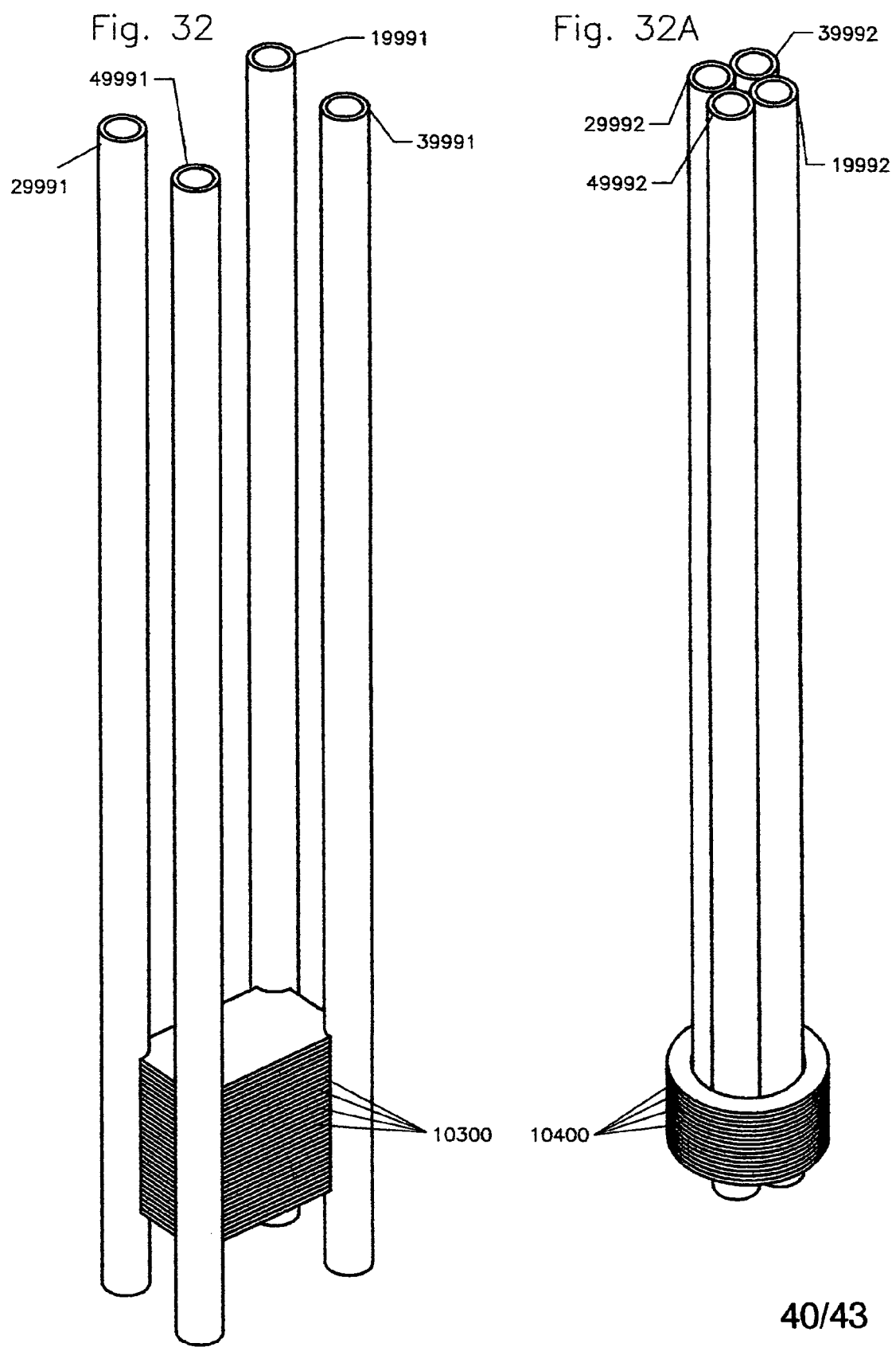
FIG. 32 is a perspective view of an alternative embodiment of the present invention.

FIGS. 32 & 32A show alternative embodiments of the present invention. It is contemplated for example that the system of making conduits by aligning holes in stacked plates as in the preferred embodiment may be dispensed with in favor of an arrangement of tubes or pipes 19991, 29991, 39991, 49991, 19992, 29992, 39992, and 49992 as conduits to carry the necessary fluids to and from the fuel cells. Said conduits could themselves be arranged variously with alternative numbers and configurations of conduits serving fuel cells of various types. For example, in addition to rectangular-shaped planar cells 10300 (see FIG. 34), the conduits might serve ring-shaped cells 10400 (see FIG. 35) surrounding said conduits. It is contemplated that even the planar type fuel cells, 400 (see FIG. 6), 10200 (see FIG. 29), 10300 (see FIG. 34), 10400 (see FIG. 35), or others, might be eventually superceded by monolithic fuel cells of various types (see U.S. Pat. No. 5,770,326).

Figure 33:
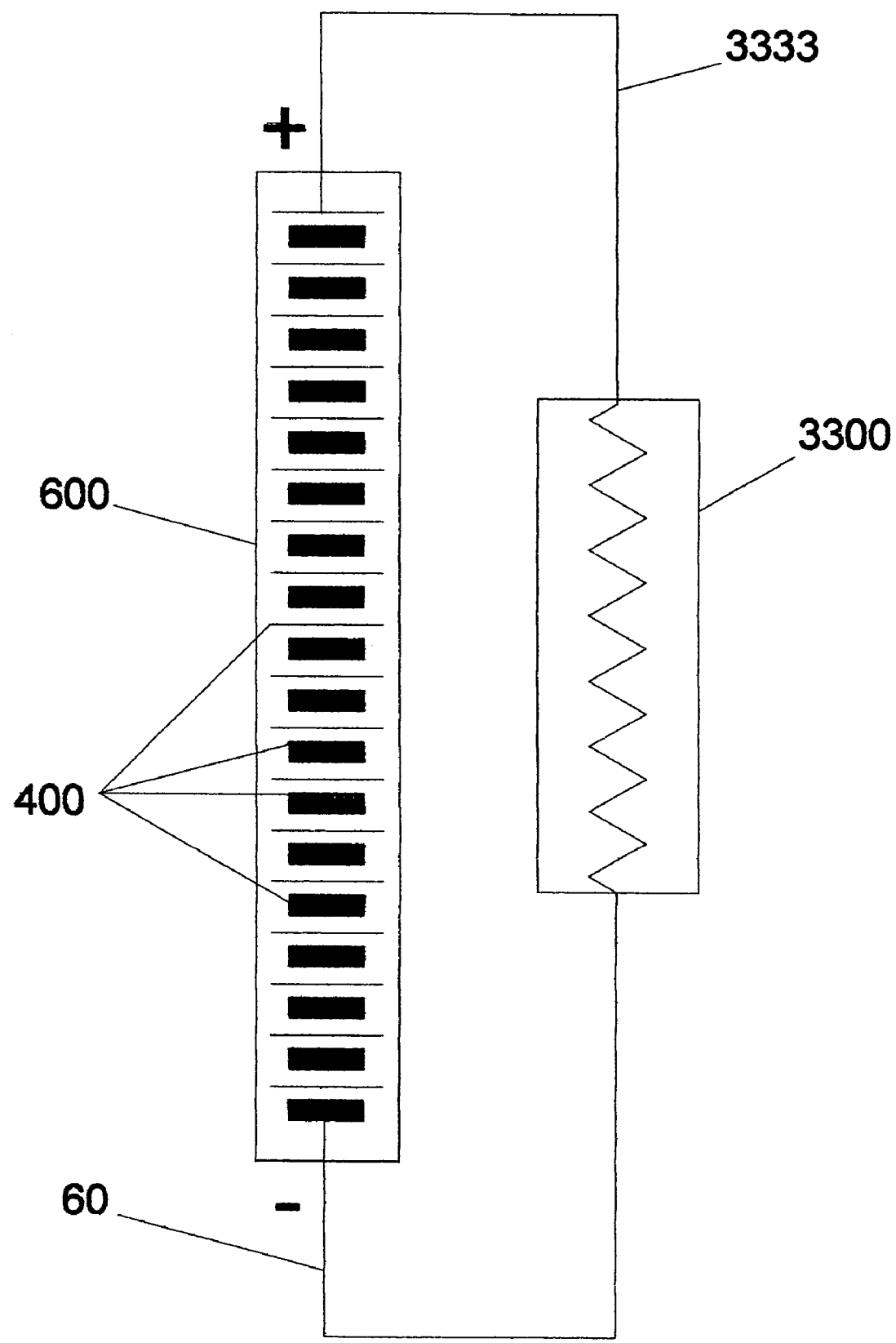
FIG. 33 is a schematic diagram of the simplified electrical circuit of a GFC installation.

FIG. 33 shows a schematic diagram of the simplified electrical circuit of a Geothermic Fuel Cell installation. When supplied with fuel and oxidant, each fuel cell 400 generates an electric charge at a potential of 0.3 to 1 volt per cell. All of the cells in a stack 600 are connected in series. The cells are insulated from each other by the gaskets and from the rest of the stack by nonconductive elements or layers of insulation coating the casing and compression bolts, etc. Electrons, liberated catalytically from the fuel on the anode + side of each cell, are conducted through the interconnect plate to the cathode − side of the next cell. At the cathode, the electrons ionize oxygen atoms in the air or other oxidant. The oxygen ions are then conducted through the electrolyte to the anode side of the next cell where the process is repeated. The electrons follow this chain of conduction up the stack and are removed through the conductor 160 in the manifold (see FIG. 16). The stack is electrically isolated from the ground by a layer of insulating grout (see FIG. 25). When connected to a load 3300, through an external circuit 3333, current will flow. For a typical GFC installation of the exemplary type, cell potential would be 0.7 V/cell, with a series pitch of 40 cells per foot of stack. For a stack length of 100 feet, the series voltage would total 2800 volts. Each cell would produce 5 Watts of electric power, giving the 100 foot stack a total power output of 20 kilowatts. Current flow through this exemplary circuit would then amount to just over 7 Amperes. Current flow would continue around the circuit and return to the bottom, Cathode, −, end of the stack via the current return cable 60 (see FIG. 22).

Figure 34:
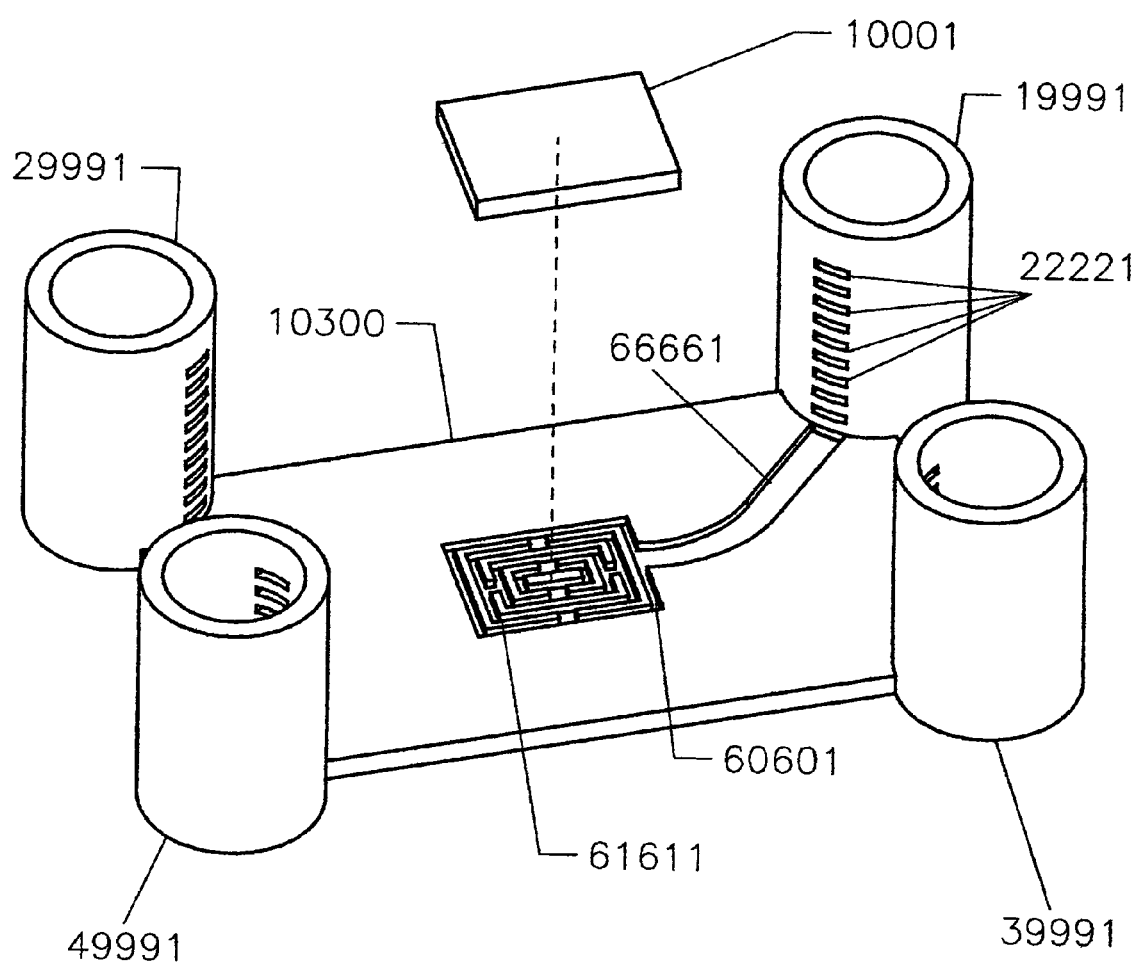
FIG. 34 is a perspective view of an alternative embodiment of a GFC interconnect plate.

FIG. 34 shows an exploded perspective view of an alternative embodiment of a Geothermic Fuel Cell. Here the interconnect plate 10300 is fed with fluids passing through individual conduits 19991, 29991, 39991, and 49991. The cathode side of the interconnect plate 10300 is shown connected to the air conduit 19991 by the etched air passage 66661. Oxidant exits conduit 19991 via a perforation 22221 aligned with passage 66661 and passes through said passage and into the network of air supply channels 60601. The cathode side of the rectangular electrode wafer 10001 sits in contact with ridges 61611. Assembly of a stack of this alternative configuration is accomplished through the addition of gaskets and subsequent plates in a manner similar to that used in the preferred embodiment.

FIG. 35 shows an exploded perspective view of another alternative embodiment of a Geothermic Fuel Cell. Here the interconnect plate 10400 is a circular ring, surrounding the individual fluid conduits 19992, 29992, 39992, and 49992. The cathode side of the interconnect plate 10400 is shown. Oxidant from the surface passes through conduit 19992, and exits the conduit via a perforation 22222; the oxidant then passes through passage 66662 and enters the air channels 60602, where the oxidant gas follows a circuitous route while in contact with the ring-shaped electrode wafer 10002. The wafer ring 10002 sits in contact with the ridges 61612. Construction of a stack of this configuration is accomplished by means similar to those used in the preferred embodiment.

I claim:

1. A method of heating a subterranean formation comprising:
    (a) forming a hole into said formation;
    (b) inserting into said hole a heater comprising a casing and plural fuel cells contained within said casing;
    (c) operating said fuel cells so as to produce heat and electricity; and
    (d) wherein the said formation, when heated, generates a gaseous product, and wherein said gaseous product is provided to and used by said fuel cells as fuel.

2. The heating method of claim 1, wherein, at least after an initial start-up period, said fuel cells are fueled by about 10% or more of the gaseous product generated by the formation.

3. The heating method of claim 1, wherein said casing has an outside diameter, and said hole has an inside diameter at least somewhat greater than said casing outside diameter, thereby defining therebetween a substantially annular gap, and said method further comprises the step of filing said gap with a thermally conductive substance.

4. The heating method of claim 1, wherein said formation is to be heated at a specified rate per heater segment, and wherein said heater segment is adapted to produce a thermal output substantially equal to that specified for the formation.

5. The heating method of claim 4, wherein said heater segment would have greater than desired combined thermal output if said fuel cells were configured continuously within said segment, and said adaptation is achieved by interleaving spacers within said fuel cells.

6. The heating method of claim 4, wherein each of said fuel cells has a thickness and an active component surface area, and wherein said adaptation is achieved by reducing said surface area in proportion to said thickness whereby said fuel cells when arranged continuously produce a combined thermal output substantially equal to that specified.

7. The heating method of claim 1 further comprising inserting additional electricity powered heaters into the formation and using the electrical output of at least some of said fuel cells to power said electrically powered heaters.

8. The heating method of claim 1, wherein said fuel cells generate a relatively warm exhaust gas, and wherein said method further comprises collecting said exhaust gas and using it to heat the formation.

9. A method of heating a subterranean formation comprising:
    (a) forming a hole into said formation;
    (b) inserting into said hole a heater comprising a casing and plural fuel cells contained within said casing;
    (c) operating said fuel cells so as to produce heat and electricity; and
    (d) continuously supplying said fuel cells with an oxidant and fuel via a continuous conduit to a planetary surface.

10. A subterranean formation heater comprising:
    a casing having a plurality of fuel cells;
    wherein the fuel cells have a feedback connection to the subterranean formation for receiving a fuel from the subterranean formation; and
    wherein at least a portion of a total fuel used to power the fuel cells is supplied via the feedback connection.

11. A subterranean formation heater comprising:
    a casing having a plurality of fuel cells;
    an oxidant conduit and a fuel conduit connected directly to or near a planetary surface; and
    wherein the fuel cells run in a continuous and/or intermittent process mode as fed by a continuous and/or intermittent supply of the oxidant and the fuel passing through said conduits.

12. A conduction heater comprising:
    a plurality of fuel cells;
    a plurality of conduits, each conduit being in gaseous communication with at least one of said fuel cells;
    a manifold comprising conduits but no fuel cells;
    wherein at least one of said manifold conduits conducts relatively warmer gas away from said fuel cells, thereby forming a heater for a surrounding formation, and at least one of said conduits conducts relatively cooler gas which contains an oxidant towards said fuel cells, and wherein said manifold is adapted to transfer heat from said warmer gas to said cooler gas.

13. The heater of claim 12, wherein said manifold comprises thermal insulation to inhibit transfer of heat from said manifold to a surrounding environment.

14. A conduction heater for heating a subterranean formation, said conduction heater comprising:
    a plurality of fuel cells;
    a plurality of conduits, each conduit being in gaseous communication with at least one of said fuel cells;
    a casing enclosing said fuel cells;
    each of said fuel cells comprises an anode and a cathode separated by an electrolyte;
    at least some of said fuel cells are electrically coupled in a series;
    wherein each of said fuel cells comprises at least one plate having plural holes formed therein, at least one of said holes in gaseous communication with said fuel cell;
    wherein said conduits are formed by aligning corresponding of said holes in each of said fuel cells to form a continuous passageway;
    wherein said plates are assembled into a stack module; and
    wherein the stack modules are interconnectable in a linearly scalable manner, thereby providing a desired length for the conduction heater.

15. A conductive heater comprising:
    a fuel cell ceramic mounted in a plate;
    a vertical assembly of plates forming a stack which is mounted in a casing;
    each casing having an end connector, thereby forming a geothermic fuel cell module; and
    wherein a plurality of geothermic fuel cell modules are assembled end to end to form a conductive heater of a desired length.

16. The conductive heater of claim 15, wherein each plate has a plurality of holes, thereby forming a plurality of conduits within the casing, at least one of the conduits forming an exhaust conduit, wherein exhaust gases are conveyed in a gaseous state to a planetary surface.

17. A conductive heater comprising:
a fuel cell ceramic mounted in a plate;
a vertical assembly of plates forming a stack which is mounted in a casing;
wherein each plate has a plurality of holes, thereby forming a plurality of conduits within the casing;
at least one of the conduits forming an exhaust conduit; and
wherein exhaust gases are conveyed in a gaseous state to a planetary surface.

18. A conductive heater comprising:
a fuel cell ceramic mounted in plate;
a vertical assembly of plates forming a stack which is mounted in a casing;
wherein a stack is assembled to form a conductive heater of a desired length; and
wherein said stack has a plurality of conduits connected to a planetary surface for feeding fuel to the fuel cells.

19. The conductive heater of claim 18, wherein each plate has a plurality of holes, thereby forming a plurality of conduits within the casing, at least one of the conduits forming an exhaust conduit, wherein exhaust gases are conveyed in a gaseous state to a planetary surface.

20. A conductive heater comprising:
a plurality of conduits in a borehole;
said plurality of conduits communicating from a planetary surface to a plurality of fuel cells in the borehole;
wherein the conduits provide a passageway for at least an oxidant and a fuel for the fuel cells; and
wherein a quantity of the plurality of fuel cells is selected to provide a desired heat output.

21. The conductive heater of claim 20 further comprising a segment of the plurality of conduits which forms a manifold not comprising a fuel cell.

22. The conductive heater of claim 21, wherein the manifold further comprises a heat exchanger.

23. A method to start up a down hole conduction heater, comprising the steps of:
forming a stack of fuel cells in a casing;
inserting the stack down a borehole;
feeding the stack with a plurality of conduits to supply an oxidant and fuel to the stack; and
bringing a temperature of the stack up to an operating temperature in the range of about 750° C. to about 1000° C.

24. The method of claim 23 further comprising the step of circulating a preheated fluid through at least one conduit for bringing the temperature of the stack up.

25. The method of claim 23 further comprising the step of using a voltage applied to the stack for bringing the temperature of the stack up.

26. A conductive heater for heating an underground resource layer to facilitate mining the underground resource layer, the conductive heater comprising:
a plurality of conduits connecting a planetary surface to a plurality of fuel cell assemblies;
wherein each of said fuel cell assemblies has a heat generating wafer;
said plurality of conduits further comprising a fuel conduit, an oxidant conduit, and an exhaust conduit;
and wherein each of said fuel cell assemblies further comprise a network of channels adjacent a cathode side of the wafer, thereby feeding the oxidant to every part of the cathode side of the wafer.

27. The apparatus of claim 26, wherein the network of channels further comprise ridges defining the network of channels, and wherein the ridges support the wafer and provide electrical contact from the cathode side of the wafer to the fuel cell assembly.

28. The apparatus of claim 27, further comprising a network of channels and ridges adjacent an anode side of the wafer, said network of channels adjacent the anode side of the wafer conducting fuel from the fuel conduit to the anode side of the wafer.

29. The apparatus of claim 28, wherein the ridges adjacent the anode side of the wafer provide electrical contact from the anode side of the wafer to the fuel cell assembly.

30. The apparatus of claim 29, wherein the fuel cell assemblies each further comprise a pair of interconnect plates and gaskets all having aligned holes forming the plurality of conduits.

31. The apparatus of claim 30, wherein said interconnect plates and gaskets have interconnect bolts therethrough to form a stack of fuel cell assemblies.

32. The apparatus of claim 31, wherein each stack has a male connector end and a female connector end, and
wherein a plurality of stacks connected end to end form a stick of fuel cell assemblies.

33. The apparatus of claim 32, wherein each stick further comprises an exterior casing, thereby protecting the fuel cell assemblies.

34. The apparatus of claim 33 further comprising a preheater means functioning to bring the stick to an operating temperature.

35. The apparatus of claim 34, wherein the stick has length selected to provide a chosen amount of heat to the underground resource layer.

36. The apparatus of claim 35 further comprising spacer plates having aligned holes with the interconnect plates, said spacer plates selectively reducing a heat output of the stick.

37. The apparatus of claim 35, wherein a plurality of sticks connected end to end form a string of fuel cell assemblies having a length selected to heat all or part of the underground resource layer.

38. The apparatus of claim 37 further comprising an insulated current return cable attached to a bottom of the string, thereby forming a useful electric potential between a top of the string and the cable.

39. The apparatus of claim 33 further comprising a manifold connecting the string to the planetary surface, said manifold having the plurality of conduits in close proximity with each other to transfer heat from the exhaust conduit to the oxidant conduit.

40. A fuel cell assembly comprising: an interconnect plate having a peripheral edge;
said interconnect plate having a heat conductive structure;
a plurality of fuel cells mounted adjacent to the peripheral edge, thereby transmitting heat to the peripheral edge; and
a plurality of channels to the fuel cell to provide fuel and an oxidant and to transport exhaust gases.

41. The apparatus of claim 40, wherein the interconnect plated further comprises a plurality of holes which form a plurality of conduits when a plurality of interconnect plates are stacked.

42. A subterranean conductive heater comprising:
a plurality of conduits arranged wherein at least two conduits are spaced apart and parallel to one another;
a plurality of fuel cell assemblies supported between the at least two conduits which are spaced apart;
and wherein the conduits communicate from a planetary surface to the plurality of fuel cells a fuel and an oxidant.

43. A subterranean conductive heater comprising:
a plurality of parallel conduits, at least two members of the conduits adjacent one another to exchange heat therebetween; and
a plurality of fuel cell assemblies supported outbound of the plurality of parallel conduits so as to receive a fuel and an oxidant from the conduits and to transmit heat to the conduits and to transmit heat outbound.

44. The apparatus of claim 43, wherein the plurality of fuel cell assemblies each further comprise a ring shape.

* * * * *